(12) United States Patent
Nakahara et al.

(10) Patent No.: US 7,756,218 B2
(45) Date of Patent: Jul. 13, 2010

(54) WIRELESS TRANSMISSION SYSTEM AND WIRELESS TRANSMISSION METHOD AND WIRELESS STATION AND TRANSMITTING STATION FOR USE THEREIN

(75) Inventors: Hideki Nakahara, Hyogo (JP); Hitoshi Takai, Osaka (JP); Hidetoshi Yamasaki, Hyogo (JP); Kenji Miyanaga, Osaka (JP); Koichiro Tanaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 1173 days.

(21) Appl. No.: 10/569,491

(22) PCT Filed: Sep. 16, 2005

(86) PCT No.: PCT/JP2005/017568

§ 371 (c)(1),
(2), (4) Date: Feb. 27, 2006

(87) PCT Pub. No.: WO2006/030988

PCT Pub. Date: Mar. 23, 2006

(65) Prior Publication Data

US 2008/0175221 A1    Jul. 24, 2008

(30) Foreign Application Priority Data

Sep. 17, 2004    (JP) .............................. 2004-272489

(51) Int. Cl.
*H04L 27/00* (2006.01)
(52) U.S. Cl. ........................ 375/299; 375/211; 375/267; 455/7
(58) Field of Classification Search .................. 375/219, 375/267, 211, 299; 370/279, 293, 315, 492, 370/501; 455/7–25
See application file for complete search history.

(56) References Cited

U.S. PATENT DOCUMENTS 4,808,008 A * 2/1989 Guerillot ..................... 370/474

(Continued)

FOREIGN PATENT DOCUMENTS

| GB | 1 576 347 A | 10/1980 |
| GB | 2 237 706 A | 5/1991 |
| JP | 2 506 748 | 6/1996 |
| JP | 2 764 150 | 6/1998 |

OTHER PUBLICATIONS

H. Takai, "BER Performance of Anti-Multipath Modulation Scheme PSK-VP and its Optimum Phase-Waveform", IEEE, Trans. Veh. Technol., vol. VT-42, Nov. 1993, pp. 625-640.

(Continued)

*Primary Examiner*—Shuwang Liu
*Assistant Examiner*—David Huang
(74) *Attorney, Agent, or Firm*—Wenderoth, Lind & Ponack L.L.P.

(57) ABSTRACT

A wireless transmission system exerts a maximum path diversity effect even if the maximum number of effective branches is limited to a small number. A transmission timing control section determines a transmission start timing to be a timing obtained by delaying a reference timing by a predetermined delay amount. A modulation section modulates a signal by a modulation scheme such that an anti-multipath property is exerted when the signal is demodulated on a receiver side, and transmits the modulated signal at the transmission start timing. In a receiving station, a demodulation section demodulates the receive signal to obtain receive data. The predetermined delay amount is such that signals are received at the receiving station at a plurality of signal-receiving timings, and the number of signal-receiving timings is less than or equal to a predetermined maximum number of effective branches, a difference between the signal-receiving timings is greater than or equal to a predetermined delay resolution and is less than or equal to a predetermined maximum delay.

24 Claims, 41 Drawing Sheets

U.S. PATENT DOCUMENTS

| | | | |
|---|---|---|---|
| 5,652,765 | A | 7/1997 | Adachi et al. |
| 2001/0019592 | A1 | 9/2001 | Solondz |
| 2001/0024434 | A1 | 9/2001 | Ayyagari et al. |
| 2001/0043156 | A1* | 11/2001 | Matsui et al. ............... 342/417 |
| 2004/0266338 | A1* | 12/2004 | Rowitch ........................ 455/7 |
| 2006/0057958 | A1* | 3/2006 | Ngo et al. ..................... 455/7 |

OTHER PUBLICATIONS

S. Ariyavisitakul, S. Yoshida, F. Ikegami, K. Tanaka, T. Takeuchi, "A Power-efficient linear digital modulator and its application to an anti-multipath modulation PSK-RZ scheme", Proceedings of IEEE Vehicular Technology Conference 1987, Jun. 1987, pp. 66-71.

S. Ariyavisitakul, S. Yoshida, F. Ikegami, T. Takeuchi, "A Novel Anti-Multipath Modulation Technique DSK", IEEE Trans. Communication, vol. COM-35, No. 12, Dec. 1987, pp. 1252-1264.

* cited by examiner

F I G. 4 0 PRIOR ART

WIRELESS TRANSMISSION SYSTEM AND WIRELESS TRANSMISSION METHOD AND WIRELESS STATION AND TRANSMITTING STATION FOR USE THEREIN

BACKGROUND OF THE INVENTION

1. Technical Field

The present invention relates to a wireless transmission system and a wireless transmission method in which data is exchanged between a plurality of wireless transmission units, and to a wireless station and a transmitting station for use therein. More particularly, the present invention relates to a wireless transmission system and a wireless transmission method in which a plurality of wireless transmission units transmit signals using an anti-multipath transmission scheme, and to a wireless station and a transmitting station for use therein.

2. Background Art

In the field of wireless communication, there is a technique using an anti-multipath modulation/demodulation scheme, in which a signal is transmitted simultaneously from a plurality of transmitting stations to deliberately create a plurality of signal paths, and a plurality of arriving signals are combined together on the receiver side, thus obtaining a path diversity effect and thereby improving the transmission characteristics.

For example, modulation/demodulation schemes with an anti-multipath property include those in which an improvement is made to the modulation scheme, including a spread spectrum scheme, an orthogonal frequency division multiplexing (OFDM) scheme in which information is transmitted while being distributed among a large number of subcarriers arranged over a wide frequency range, and a so-called "anti-multipath modulation scheme" in which an anti-multipath property is exerted by providing a phase or amplitude redundancy in the transmitted symbols, e.g., a PSK-VP (phase shift keying with varied phase) scheme (Non-Patent Document 1) in which a convex-shaped phase redundancy is provided or a PSK-RZ (return to zero phase shift keying) scheme (Non-Patent Document 2) in which an amplitude redundancy is provided, and those that use an ordinary modulation scheme but use an equalizer on the receiver side to exert an anti-multipath property.

For example, spread spectrum schemes include a direct sequence spread spectrum (DSSS) scheme in which an original signal is multiplied by a spread signal having a wider band than that of the original signal, a frequency hopping spread spectrum (FHSS) scheme in which the frequency is hopped over a wide band, and a time hopping spread spectrum (THSS) scheme in which a signal is spread with a wideband impulse.

In order to exert an active path diversity effect by using such a modulation/demodulation scheme with an anti-multipath property, there are conditions as follows with respect to the upper and lower limit for the TDOA (time difference of arrival) between signals. Herein, the minimum and maximum TDOAs with which a path diversity effect can be exerted will be referred to as the "delay resolution" and the "maximum delay", respectively. The delay resolution and the maximum delay may be determined based on the principle of the modulation/demodulation scheme used, or based on the parameters and/or limitations on implementation of the modulation/demodulation scheme.

For example, with the DSSS scheme, the delay resolution corresponds to the 1-chip length of the spread code, and the maximum delay corresponds to an amount of time less than the spread code length. Therefore, when communicating with the DSSS scheme, it is possible, on the receiver side, to separate a receive signal into delayed wave components and combine them together (RAKE reception) to obtain a path diversity effect as long as the TDOA is greater than or equal to the 1-chip length and less than the spread code length.

With the OFDM scheme, the delayed wave components are absorbed at the guard interval set for the signal, whereby the maximum delay corresponds to the temporal length of the guard interval. Intersymbol interference does not occur if the TDOA between delayed waves is within the guard interval. Moreover, since an error correction operation is normally performed over a plurality of subcarriers, information can be reproduced even if some subcarriers have errors therein due to a multipath distortion. The delay resolution corresponds to a value around the inverse of the frequency bandwidth. Thus, with the OFDM scheme, it is possible to obtain a path diversity effect based on the effect of the guard interval and on the frequency diversity effect provided by scattering pieces of information over a wide frequency band and collecting the pieces together.

Where the PSK-VP scheme or the PSK-RZ scheme, being an anti-multipath modulation scheme, is used, it is possible to exert a path diversity effect and improve the reception characteristics, as compared with an environment where there is no multipath, as long as the delay resolution is greater than or equal to a value that is several times less than the symbol length while the maximum delay is less than the 1-symbol time. Moreover, even with an ordinary single carrier scheme such as the PSK scheme and the QAM scheme, if an equalizer using a tapped delay line is used on the receiver side, it is possible to separate and combine delayed wave components and to exert a path diversity effect with the delay resolution being greater than or equal to the symbol length and the maximum delay being less than or equal to a temporal length determined by the number of taps.

An example of a wireless transmission system that uses such a modulation/demodulation scheme with anti-multipath capabilities to deliberately produce a path diversity effect and to improve the transmission characteristics will now be described.

Patent Document 1 discloses a wireless transmission system using a modulation/demodulation scheme with an anti-multipath property. FIG. 40 is a block diagram showing the wireless transmission system disclosed in Patent Document 1. FIG. 40 only shows the downstream path in which a signal is transmitted from a base station 310 to a mobile station. In FIG. 40, the base station 310 forms a communication area (wireless zone) 300 and communicates with a mobile station 330 within the area using the CDMA (code division multiple access) scheme.

The signal outputted from a wireless device 311 in the base station 310 is transmitted via a transmission antenna 322 to a relay unit 320 and to the mobile station 330. In the relay unit 320, a signal S1 received by a reception antenna 322 is delayed by a delay element 324 and inputted to a combiner 323. A signal S2 received by an antenna 321 is directly inputted to the combiner 323. The combiner 323 combines the signals S1 and S2 together. The combined signal from the combiner 323 is amplified by an amplifier 325 and transmitted to the mobile station 330 via a transmission antenna 326.

The mobile station 330 is a RAKE receiver and receives three signals: a signal delayed by the relay unit, a signal not delayed by the relay unit, and a signal transmitted from the transmitting station. In the relay unit 320, the delay element 324 gives the signal S1 a delay greater than or equal to the code length of the spread code series (chip length), whereby a delay greater than or equal to the chip length is produced between a plurality of signals. Then, the signals are received on the receiver side in RAKE reception, thereby obtaining a path diversity effect and thus improving the transmission characteristics. The wireless transmission system deliberately provides an additional transmission path/delayed wave as described above, aiming at increasing the path diversity effect and improving the transmission characteristics.

Patent Document 1: Japanese Patent No. 2764150

Patent Document 2: Japanese Patent No-2506748

Non-Patent Document 1: H. Takai, "BER Performance of Anti-Multipath Modulation Scheme PSK-VP and its Optimum Phase-Waveform", IEEE, Trans. Veh. Technol., Vol. VT-42, November 1993, pp. 625-640

Non-Patent Document 2: S. Ariyavisitakul, S. Yoshida, F. Ikegami, K. Tanaka, T. Takeuchi, "A Power-efficient linear digital modulator and its, application to an anti-multipath modulation PSK-RZ scheme", Proceedings of IEEE Vehicular Technology Conference 1987, June 1987, pp. 66-71

Non-Patent Document 3: S. Ariyavisitakul, S. Yoshida, F. Ikegami, T. Takeuchi, "A Novel Anti-Multipath Modulation Technique DSK", IEEE Trans. Communication, Vol. COM-35, No. 12, December 1987, pp. 1252-1264

In an anti-multipath modulation/demodulation scheme as described above, there may be cases where the maximum number of branches being effective (hereinafter referred to as the "the maximum number of effective branches") is limited to a small number, for independent branches that contribute to the path diversity effect, for the following reason. While the maximum number of effective branches that contribute to the path diversity effect is less than or equal to a value obtained by dividing the maximum delay by the delay resolution, this becomes a very small value when the maximum delay is close to the delay resolution.

For example, where the maximum number of effective branches is two, if two waves arrive with a delay therebetween that is equal to the delay resolution with a third wave arriving therebetween, the third wave will be superimposed on both of the first two waves and remain in both waves even after the path separation at the receiver, thereby increasing the inter-branch correlation in path diversity and thus causing deterioration. Where the maximum delay is close to the delay resolution, and the maximum number of effective branches that contribute to the path diversity effect is limited to a small number, the problem is not solved simply by adding a path with a delay. Examples found in the prior art, including Patent Documents 1 and 2, fail to present a method for solving this problem.

A case where the maximum delay is close to the delay resolution and the maximum number of effective branches that contribute to the path diversity effect is limited to a small number will be further described in detail, with respect to various modulation/demodulation schemes.

With the DSSS scheme, where the maximum delay corresponds to a value that is less than the spread code length, if the spread code length becomes short and comes close to the spreading chip length corresponding to the delay resolution, the maximum number of effective branches will be a small number. For example, where the spread code length is a 4-chip length and the spreading factor is four, i.e., one symbol is spread with a 4-chip spread code, the delay resolution is equal to the 1-chip length and the maximum delay is equal to the 3-chip length, whereby the number of branches is about four at best. With the FHSS scheme, the delay resolution corresponds to the spread bandwidth, and the maximum delay is determined by the hop sequence length. Therefore, if the spread bandwidth is narrow and the hop sequence length is short, the maximum number of effective branches is limited to a small number.

Moreover, with the THSS scheme, the delay resolution corresponds to the pulse width and the maximum delay is determined by the pulse sequence length. Therefore, if the pulse width is wide and the pulse sequence length is short, the number of branches is limited to a small number. Similarly, with the OFDM scheme, the delay resolution corresponds to the frequency bandwidth over which subcarriers are distributed, and the maximum delay is determined by the guard interval length. Therefore, if the frequency bandwidth is narrow and the guard interval is short, the maximum number of effective branches is limited to a small number. With the PSK-VP scheme or the PSK-RZ scheme, where the maximum delay cannot in principle exceed the symbol length, the delay resolution is close to the maximum delay in the first place.

This will now be described in detail with respect to the PSK-VP scheme based on the results of a characteristics evaluation.

FIG. 41 shows the bit error rate characteristics relative to the TDOA between two waves in a 2-wave rice model of a quadrature PSK-VP scheme (hereinafter "QPSK-VP scheme"). The horizontal axis represents the TDOA normalized with the symbol length T, and the vertical axis represents the bit error rate. Note that the transmission path is a 2-wave rice fading environment where Eb/No=25 dB. FIG. 41 indicates that in the TDOA range from 0.3 symbol to 0.7 symbol, the path diversity effect provides an active improvement, realizing desirable bit error rates less than or equal to 1E-5. Thus, the delay resolution and the maximum delay with which an active improvement by the path diversity can be obtained are about 0.3 symbol and about 0.7 symbol, respectively.

FIG. 42 shows the bit error rate characteristics for two received waves (two signal-receiving timings) and for three received waves (three signal-receiving timings) in the QPSK-VP scheme, and FIG. 43 shows the temporal relationship between the two waves and the three waves used in FIG. 42. Note that each received wave is a rice fading wave, and the three wave model is a transmission path model where the third wave is inserted at a temporal position in the middle between the two waves. It can be seen from FIG. 42 that the bit error rate deteriorates when the third wave is inserted between the first two waves, as compared with a case where the number of waves to be received is two. This confirms that the third wave in the three-wave model is not separate from the other two waves, thereby giving the same interference or increasing the correlation, thus resulting in a deterioration.

Where an equalizer is used, the delay resolution is determined by the symbol length, and the maximum delay is determined by the tap length of the equalizer filter. Therefore, a case similar to those described above results if the temporal length of the filter tap is shorter than the symbol length. Note that with an equalizer, where the number of taps significantly influences the circuit scale, the maximum delay is in many cases limited due to the circuit scale limitation.

Thus, if the delay resolution, with which delayed wave components can be separated from each other, is significantly close to the maximum delay, the maximum number of effective branches that contribute to the path diversity effect is limited to a small number. Then, carelessly adding a path with a delay will deteriorate the transmission characteristics.

Therefore, an object of the present invention is to provide a wireless transmission system and a wireless transmission method capable of exerting a maximum path diversity effect even if the maximum number of effective branches that contribute to the path diversity effect is limited to a small number, and to provide a wireless station and a transmitting station for use therein.

SUMMARY OF THE INVENTION

The present invention provides a wireless transmission system in which a plurality of wireless stations each transmit a signal to a receiving station, wherein a path diversity system is formed by a transmitter-side wireless station, a multi-path channel and the receiving station, the wireless transmission system including: a transmission timing control section for determining a transmission start timing, at which to start the signal transmission, to be a timing obtained by delaying a reference timing to be a reference for the signal transmission by a predetermined delay amount; a transmitting section for transmitting the signal at the transmission start timing determined by the transmission timing control section; and a receiving section provided in the receiving station for receiving the transmitted signal. The predetermined delay amount is determined so that: signals are received by the receiving section at a plurality of signal-receiving timings; the number of signal-receiving timings is less than or equal to a predetermined maximum number of effective branches; a difference between the signal-receiving timings is greater than or equal to a predetermined delay resolution; and a difference between a maximum value and a minimum value of the signal-receiving timing is less than or equal to a predetermined maximum delay.

According to the present invention, even if the number of wireless stations is larger than the maximum number of effective branches that contribute to a path diversity effect at the receiving station, the number of timings at which the receiving station receives signals can be made equal to the maximum number of effective branches. Thus, even if the maximum number of effective branches of a wireless transmission system is limited, it is possible to obtain a maximum path diversity effect. Therefore, it is possible to improve the transmission characteristics of the wireless transmission system.

Preferably, the predetermined maximum number of effective branches, the predetermined delay resolution and the predetermined maximum delay are set to values such that a plurality of delayed waves can be received with path diversity.

Preferably, the transmission timing control section and the transmitting section are provided in the wireless station; and the reference timing stored in each wireless station is a predetermined timing, and the wireless stations store the same reference timing.

Thus, wireless stations can transmit signals while delaying the signals based on the same timing.

In one embodiment, the wireless transmission system further includes a transmitting station for transmitting, to the wireless stations, a signal to be transmitted to the receiving station; the transmitting station includes a transmitter signal transmitting section for transmitting, to the wireless stations, a signal to be transmitted to the receiving station; the transmission timing control section and the transmitting section are provided in the wireless station; the wireless station includes: a relay receiving section for receiving a signal transmitted by the transmitter signal transmitting section; and a timing detection section for detecting a timing at which the signal is received by the relay receiving section; the transmission timing control section determines the reference timing to be the timing detected by the timing detection section; and the transmitting section transmits a signal received by the relay receiving section to the receiving station.

Thus, the wireless stations do not need to have a common reference timing stored therein in advance.

For example, the timing detection section detects a unique word contained in the signal.

In one embodiment, the wireless transmission system further includes a transmitting station for transmitting, to the wireless stations, a signal to be transmitted to the receiving station; the transmitting station includes: a transmitter signal transmitting section for transmitting, to the wireless stations, a signal to be transmitted to the receiving station; a delay amount selecting section for selecting the predetermined delay amount from among a plurality of candidate values; a re-transmission start timing determining section for determining a re-transmission start timing, at which to transmit the signal to the receiving station, to be a timing obtained by delaying the reference timing by the delay amount selected by the delay amount selecting section; and a re-transmit signal transmitting section for transmitting the signal to the receiving station at the re-transmission start timing determined by the re-transmission start timing determining section; the transmission timing control section and the transmitting section are provided in the wireless station; the wireless station includes a relay receiving section for receiving a signal transmitted by the transmitter signal transmitting section; and the transmitting section transmits a signal received by the relay receiving section to the receiving station.

Thus, as compared with a case where only the wireless stations transmit signals, it is possible to increase the number of arriving waves arriving at the receiving station. For example, in a case where the number of wireless stations in a wireless transmission system is smaller than the maximum number of effective branches of the wireless transmission system, it is possible to further increase the path diversity effect by having the transmitting station re-transmit a signal.

In one embodiment, the wireless transmission system further includes a transmitting station for transmitting, to the wireless stations, a signal to be transmitted to the receiving station; the transmitting station includes: a delay amount selecting section for selecting, from among a plurality of candidate values, a delay amount to be given to a signal transmitted by the wireless station; a delay amount adding section for adding the delay amount selected by the delay amount selecting section to the signal; and a transmitter signal transmitting section for transmitting, to the wireless station, the signal to which the delay amount has been added by the delay amount adding section; and the transmission timing control section is provided in the wireless station. The wireless station includes: a relay receiving section for receiving the signal to which the delay amount has been added, transmitted by the transmitter signal transmitting section; a delay amount extracting section for extracting the delay amount from a signal received from the relay receiving section; the transmission timing control section determines the transmission start timing to be a timing obtained by delaying the reference timing by the delay amount extracted by the delay amount extracting section; and the transmitting section transmits a signal received by the relay receiving section to the receiving station.

Thus, the wireless stations do not need to have delay amounts stored therein in advance. Moreover, since the delay amounts are evenly distributed among the wireless stations, it is possible to effectively distribute the signal-receiving timings.

In one embodiment, the wireless transmission system further includes a transmitting station for transmitting, to the wireless stations, a signal to be transmitted to the receiving station; the transmission timing control section and the transmitting section are provided in the transmitting station; the transmitting station includes a delay amount selecting section for selecting, from among a plurality of candidate values, a delay amount to be given to a signal transmitted to each wireless station; the transmission timing control section determines the transmission start timing to be a timing obtained by delaying the reference timing by the delay amount selected by the delay amount selecting section; the transmitting section transmits the signal to the wireless station at the transmission timing; and the wireless station includes: a relay receiving section for receiving a signal transmitted from the transmitting station; and a relay transmitting section for transmitting the signal received by the relay receiving section to the receiving station.

Thus, since the transmitting station controls the signal transmission timings, it is not necessary to provide, in each wireless station, a section for controlling the signal transmission start timing. Therefore, it is possible to simplify the configuration of the wireless station.

In one embodiment, the plurality of wireless stations are arranged so that wireless stations located within a predetermined distance from each other have communication ranges partially overlapping with each other; the transmitting station further includes a delay amount adjusting section for adjusting the delay amount so that signals transmitted from the wireless stations that are assigned the same delay amount as the delay amount selected by the delay amount selecting section arrive at the receiving station at the same timing; the delay amount adding section produces a delay signal indicating the delay amount adjusted by the delay amount adjusting section; and the receiving section receives signals transmitted from wireless stations that are adjacent to each other at different timings.

Thus, even if the distances between the wireless stations and the receiving station are significantly different from one another, the number of timings at which signals are received by the receiving station can be made less than or equal to the maximum number of effective branches. Therefore, even if the maximum number of effective branches is limited, it impossible to obtain a maximum path diversity effect, irrespective of the distances between the wireless stations and the receiving station.

In one embodiment, the plurality of wireless stations are arranged so that wireless stations located within a predetermined distance from each other have communication ranges partially overlapping with each other; the transmitting station further includes a delay amount adjusting section for adjusting the delay amount so that signals transmitted from the wireless stations that are assigned the same delay amount as the delay amount selected by the delay amount selecting section arrive at the receiving station at the same timing; the transmission timing control section determines the transmission start timing to be a timing obtained by delaying the reference timing by the delay amount adjusted by the delay amount adjusting section; and the receiving section receives signals transmitted from wireless stations that are adjacent to each other at different timings.

Thus, even if the distances between the wireless stations and the receiving station are significantly different from one another, the number of timings at which signals are received by the receiving station can be made less than or equal to the maximum number of effective branches. Therefore, even if the maximum number of effective branches is limited, it is possible to obtain a maximum path diversity effect, irrespective of the distances between the wireless stations and the receiving station. Moreover, signals transmitted from all the wireless stations can be made to contribute to the path diversity effect without causing an interference for the receiving station.

In one embodiment, the wireless stations are arranged in a linear pattern. In one embodiment, there are a plurality of groups of wireless stations, each group including wireless stations arranged in the linear pattern, and the groups of wireless stations are arranged parallel to each other. Thus, it is possible to cover a wider communication area.

In one embodiment, the number of predetermined delay amounts is equal to the maximum number of effective branches, or the number of predetermined delay amounts is two.

In one embodiment, the wireless transmission system further includes a delay amount selecting section for selecting the predetermined delay amount from among a plurality of candidate values; the delay amount to be selected by the delay amount selecting section is determined in advance; and the transmission timing control section determines the transmission start timing based on the delay amount selected by the delay amount selecting section.

Thus, all the candidate values can be stored in each wireless station, and it is not necessary to set a delay amount for each wireless station. Therefore, it is possible to easily set the delay amounts. Moreover, since each wireless station store therein a plurality of candidate values, the delay amount of the wireless station can easily be changed.

In one embodiment, the wireless transmission system further includes a delay amount selecting section for randomly selecting the predetermined delay amount from among a plurality of candidate values; and the transmission timing control section determines the transmission start timing based on the delay amount selected by the delay amount selecting section.

Thus, all the candidate values can be stored in each wireless station, and it is not necessary to set a delay amount for each wireless station.

In one example, an orthogonal frequency division multiplexing scheme is used as the modulation scheme and the demodulation scheme.

In another example, a PSK-VP scheme is used as the modulation scheme.

The present invention provides a wireless station for use in a wireless transmission system in which a plurality of wireless stations each transmit a signal to a receiving station, wherein a path diversity system is formed by a transmitter-side wireless station, a multi-path channel and the receiving station, the wireless station including: a transmission timing control section for determining a transmission start timing, at which to start the signal transmission, to be a timing obtained by delaying a reference timing to be a reference for the signal transmission by a predetermined delay amount; and a transmitting section for transmitting the signal at the transmission start timing determined by the transmission timing control section, wherein the predetermined delay amount is determined so that: signals are received by the receiver side at a plurality of signal-receiving timings; the number of signal-receiving timings is less than or equal to a predetermined maximum number of effective branches; a difference between the signal-receiving timings is greater than or equal to a predetermined delay resolution; and a difference between a maximum value and a minimum value of the signal-receiving timing is less than or equal to a predetermined maximum delay.

The present invention provides a transmitting station for use in a wireless transmission system for transmitting a signal to a receiving station via a plurality of wireless stations, in which a path diversity system is formed by a transmitter-side wireless station, a multi-path channel and the receiving station, the transmitting station including: a delay amount selecting section for selecting, from among a plurality of predetermined delay amounts, a delay amount to be given to a signal transmitted to each wireless station; a transmission timing control section for determining a transmission start timing, at which to start the signal transmission, to be a timing obtained by delaying a reference timing to be a reference for the signal transmission by the delay amount selected by the delay amount selecting section; and a transmitting section for transmitting the signal to the wireless station at the transmission start timing, wherein the predetermined delay amount is determined so that: signals are received by the receiver side at a plurality of signal-receiving timings; the number of signal-receiving timings is less than or equal to a predetermined maximum number of effective branches; a difference between the signal-receiving timings is greater than or equal to a predetermined delay resolution; and a difference between a maximum value and a minimum value of the signal-receiving timing is less than or equal to a predetermined maximum delay.

The present invention provides a method for use in a wireless transmission system, in which a plurality of wireless stations each transmit a signal to a receiving station, for transmitting a signal to the receiving station, wherein a path diversity system is formed by a transmitter-side wireless station, a multi-path channel and the receiving station, the method including the steps of: determining a transmission start timing, at which to start the signal transmission, to be a timing obtained by delaying a reference timing to be a reference for the signal transmission by a predetermined delay amount; transmitting the signal at the transmission start timing determined in the step of determining the transmission start timing; and receiving the transmitted signal at the receiving station, wherein the predetermined delay amount is determined so that: signals are received at the receiving station at a plurality of signal-receiving timings; the number of signal-receiving timings is less than or equal to a predetermined maximum number of effective branches; a difference between the signal-receiving timings is greater than or equal to a predetermined delay resolution; and a difference between a maximum value and a minimum value of the signal-receiving timing is less than or equal to a predetermined maximum delay.

The present invention provides a method for use in a wireless transmission system, in which a plurality of wireless stations each transmit a signal to a receiving station, for transmitting a signal from each wireless station, wherein a path diversity system is formed by a transmitter-side wireless station, a multi-path channel and the receiving station, the method including the steps of: determining a transmission start timing, at which to start the signal transmission, to be a timing obtained by delaying a reference timing to be a reference for the signal transmission by a predetermined delay amount; and transmitting the signal at the transmission start timing determined in the step of determining the transmission start timing, wherein the predetermined delay amount is determined so that: signals are received by the receiver side at a plurality of signal-receiving timings; the number of signal-receiving timings is less than or equal to a predetermined maximum number of effective branches; a difference between the signal-receiving timings is greater than or equal to a predetermined delay resolution; and a difference between a maximum value and a minimum value of the signal-receiving timing is less than or equal to a predetermined maximum delay.

The present invention provides a method for transmitting a signal from a transmitting station to a receiving station via a plurality of wireless stations, wherein a path diversity system is formed by a transmitter-side wireless station, a multi-path channel and the receiving station, the method including the steps of: selecting, from among a plurality of predetermined delay amounts, a delay amount to be given to a signal transmitted to each wireless station; determining a transmission start timing, at which to start the signal transmission, to be a timing obtained by delaying a reference timing to be a reference for the signal transmission by the delay amount selected in the step of selecting a delay amount; and transmitting the signal to the wireless station at the transmission start timing, wherein the predetermined delay amount is determined so that: signals are received by the receiver side at a plurality of signal-receiving timings; the number of signal-receiving timings is less than or equal to a predetermined maximum number of effective branches; a difference between the signal-receiving timings is greater than or equal to a predetermined delay resolution; and a difference between a maximum value and a minimum value of the signal-receiving timing is less than or equal to a predetermined maximum delay.

Thus, the present invention provides a wireless communication system capable of exerting a maximum path diversity effect even if the number of branches contributing to the path diversity effect is limited to a small number.

Figure 1:
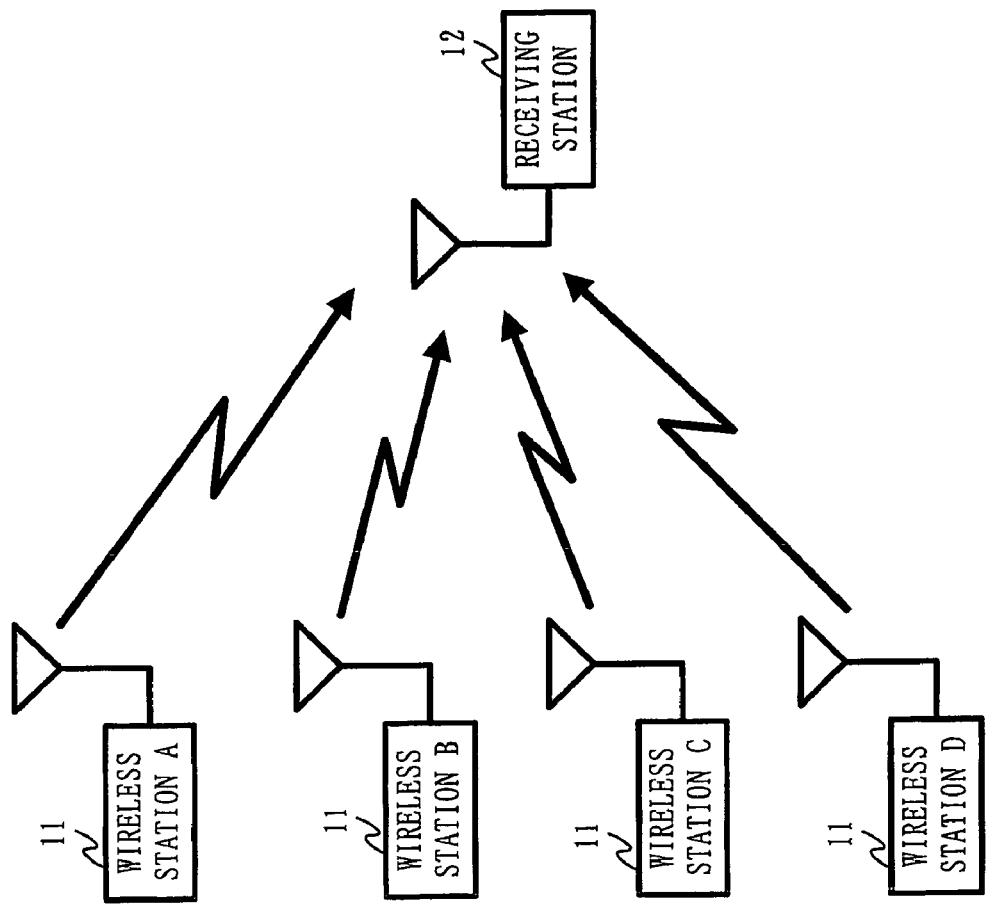
FIG. 1 shows a configuration of a wireless transmission system according to a first embodiment of the present invention.

DESCRIPTION OF THE REFERENCE CHARACTERS 11, 14, 17, 19, 20 Wireless station
12 Receiving station
13, 15, 16, 18 Transmitting station
21, 152 Modulation section
22 Data storage section
23 Transmission timing control section
24, 32, 153 RF section
25 Antenna
27 UW detection section
28, 155 Delay amount setting section
29 Delay amount extracting section
33 Demodulation section
151 Re-transmission timing control section
161 Delay amount determining section
162 Delay amount adding section

BEST MODE FOR CARRYING OUT THE INVENTION

Embodiments of the present invention will now be described with reference to the drawings. In this specification, a wireless transmission system wherein a path diversity system is formed by a transmitter-side wireless station, a multi-path channel and a receiving station is defined as a system capable of transmitting/receiving data using an anti-multipath modulation/demodulation scheme. Examples of path diversity systems include: (1) a system in which data is modulated by a transmitter-side wireless station by using a spread spectrum scheme (e.g., a DSS scheme, an FHSS scheme or a THSS scheme) and is demodulated by a receiving station by using a spread spectrum scheme; (2) a system in which data is modulated by a transmitter-side wireless station by using an OFDM scheme and is demodulated by a receiving station by using an OFDM scheme; (3) a system in which data is modulated by a transmitter-side wireless station by using an anti-multipath modulation scheme (e.g., a PSK-VP scheme, a PSK-RZ scheme or a DSK scheme) and is demodulated by a receiving station by using a demodulation scheme corresponding to the anti-multipath modulation scheme; and (4) a system in which data is modulated by a transmitter-side wireless station by using a single carrier modulation scheme (a PSK scheme or a QAM scheme) and is demodulated by a receiving station by using an equalizer. Note that the present invention is not limited to those particular path diversity systems as set forth above, but encompasses any path diversity systems to be devised in the future.

First Embodiment

FIG. 1 shows a configuration of a wireless transmission system according to a first embodiment of the present invention. Referring to FIG. 1, the wireless transmission system includes a plurality of wireless stations 11, and a receiving station 12. Each wireless station 11 is connected to the receiving station 12 via a wireless connection. In the present embodiment, there are four wireless stations 11 in the wireless transmission system. Wherever the four wireless stations 11 need to be distinguished from one another, they will be referred to as wireless stations A to D. Where the four wireless stations A to D do not need to be distinguished from one another, they will be referred to as the wireless stations 11.

Each wireless station 11 stores transmit data, which is to be transmitted to the receiving station 12, and a reference timing signal indicating a reference timing for transmitting the transmit data (hereinafter referred to as the "reference timing"). All the wireless stations 11 have the same transmit data and the same reference timing signal. Note that the term "timing" as used herein may refer to "a point in time".

The wireless stations A to D also store delay amounts tA to tD, respectively. Each of the delay amounts tA to tD is a value equal to either one of delay amount candidate values T1 and T2. The wireless stations A to D transmit data after adding the delay amounts tA to tD, respectively, to the reference timing indicated by the reference timing signal.

The receiving station 12 receives the four signals transmitted from the wireless stations A to D.

Figure 2:
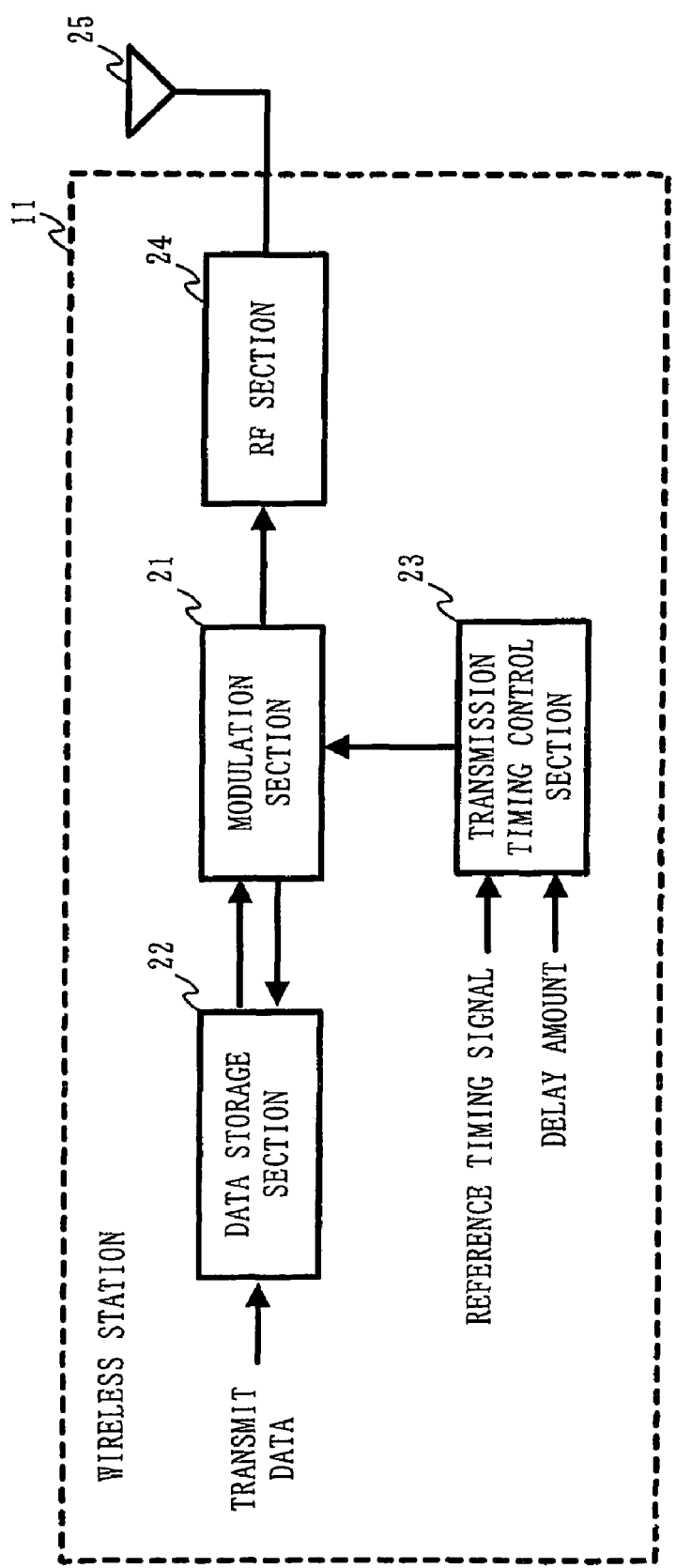
FIG. 2 is a block diagram showing a configuration of a wireless station 11 shown in FIG. 1.

FIG. 2 is a block diagram showing a configuration of the wireless station 11 shown in FIG. 1. The wireless station 11 includes a modulation section 21, a data storage section 22, a transmission timing control section 23, an RF section 24, and an antenna 25.

The transmission timing control section 23 controls the transmission timing of the signal transmitted to the receiving station 12 based on the reference timing signal and a predetermined delay amount. Specifically, the transmission timing control section 23 determines the transmission start timing to be a timing obtained by delaying the reference timing indicated by the reference timing signal by the delay amount. At the transmission start timing, the transmission timing control section 23 produces a transmission start signal for instructing the start of a transmission, and passes it to the modulation section 21.

In response to a request from the modulation section 21, the data storage section 22 reads out transmit data that is stored therein in advance, and passes it to the modulation section 21.

Figure 3:
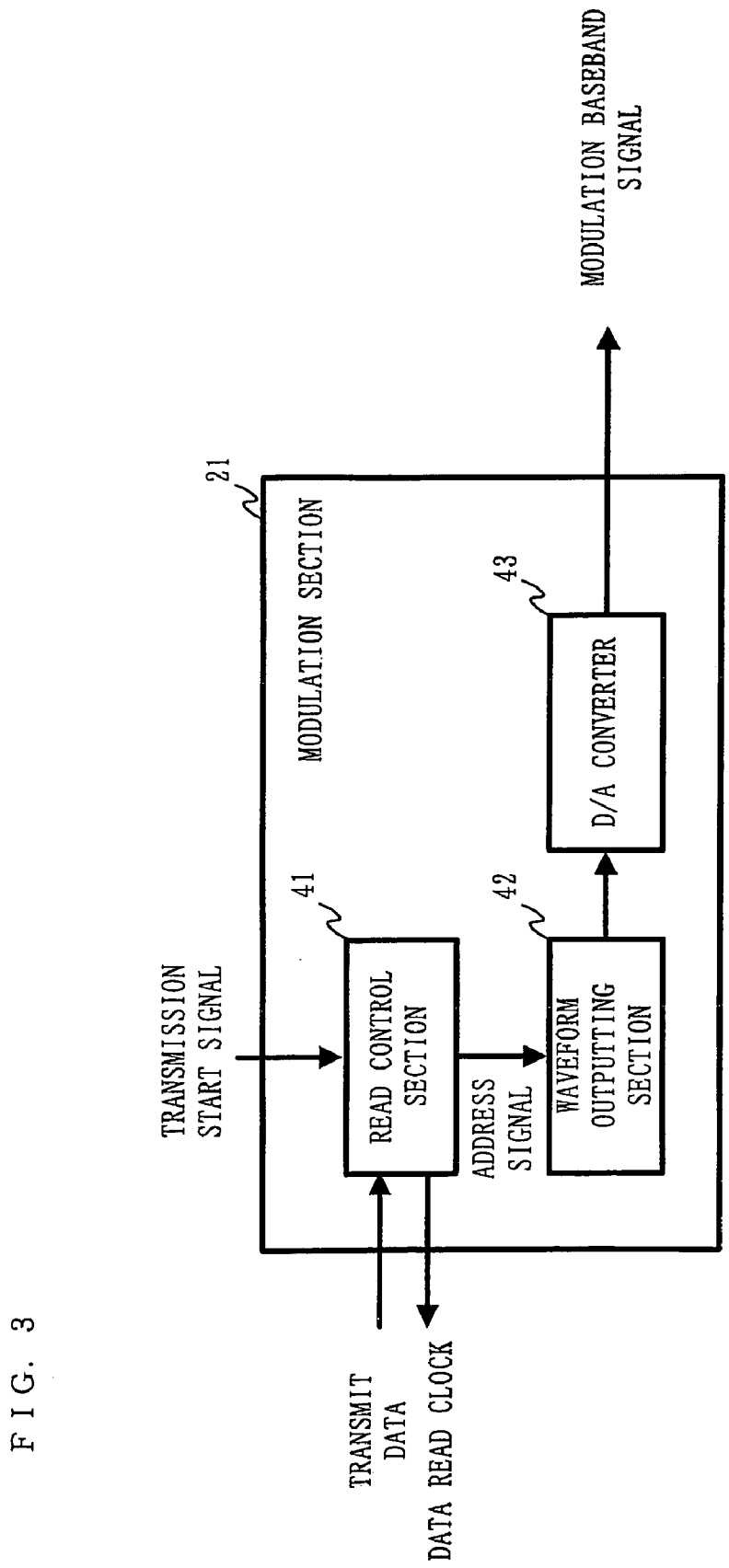
FIG. 3 is a block diagram showing a configuration of a modulation section 21 in a case where the PSK-VP scheme is used.

FIG. 3 is a block diagram showing a configuration of the modulation section 21 in a case where the PSK-VP scheme is used. Referring to FIG. 3, the modulation section 21 includes a read control section 41, a waveform outputting section 42, and a D/A converter 43.

The read control section 41 is formed by a counter that operates based on the base clock. Upon receiving the transmission start signal, the read control section 41 produces, based on the counter value, a data read clock based on which transmit data is read out and an address signal indicating an address based on which modulated waveform data is read out. The read control section 41 passes the produced data read clock to the data storage section 22, and the address signal to the waveform outputting section 42.

The data storage section 22 passes the transmit data to the read control section 41 of the modulation section 21 in synchronization with the data read clock.

The waveform outputting section 42 reads out modulation waveform data according to the transmit data from a waveform memory (not shown) based on the received address signal.

The D/A converter 43 converts the signal obtained from the waveform outputting section 42 into an analog signal, and outputs the analog signal as the modulation baseband signal.

As described above, when the modulation section 21 receives the transmission start signal, the modulation section 21 produces an address signal for reading out a modulation waveform from the waveform memory. Thus, the timing at which the modulation baseband signal is outputted varies by the unit of base clocks according to the timing at which the transmission start signal is received. Typically, the base clock has a frequency that is several or ten-odd times higher than the symbol frequency (the inverse of the symbol length). Therefore, the timing at which the modulation baseband signal is outputted can be adjusted by the unit of a time period that is several or ten-odd times less than the symbol length.

While FIG. 3 shows a case where the PSK-VP scheme is used, the signal can be modulated by other modulation schemes (e.g., the PSK-RZ scheme or the DSK scheme) only by changing the modulation waveform data stored in the waveform memory. In a case where the PSK-VP scheme or the PSK-RZ scheme is used, the delay resolution is several times less than the symbol length while the maximum delay is less than the 1-symbol time.

When the modulation section 21 receives the transmission start signal, the modulation section 21 modulates the transmit data into the modulation baseband signal. The RF section 24 performs a frequency conversion on the modulation baseband signal to obtain an RF-band signal, and transmits the converted signal from the antenna 25.

Figure 4:
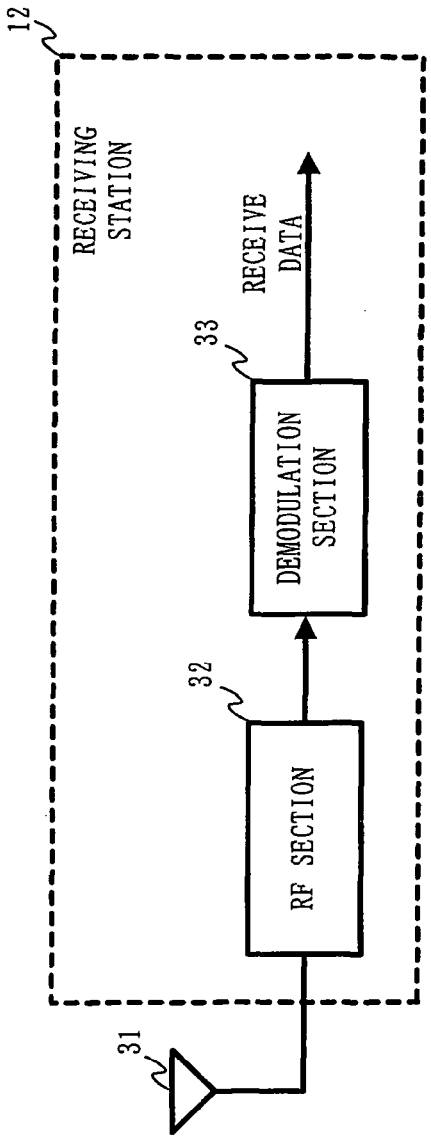
FIG. 4 is a block diagram showing a configuration of a receiving station 12 shown in FIG. 1.

FIG. 4 is a block diagram showing a configuration of the receiving station 12 shown in FIG. 1. Referring to FIG. 4, the receiving station 12 includes an antenna 31, an RF section 32, and a demodulation section 33.

The RF section 32 converts the RF-band receive signal received by the antenna 31 into a receive baseband signal. The demodulation section 33 demodulates the receive baseband signal, which has been converted by the RF section 32, to obtain receive data.

Figure 5:
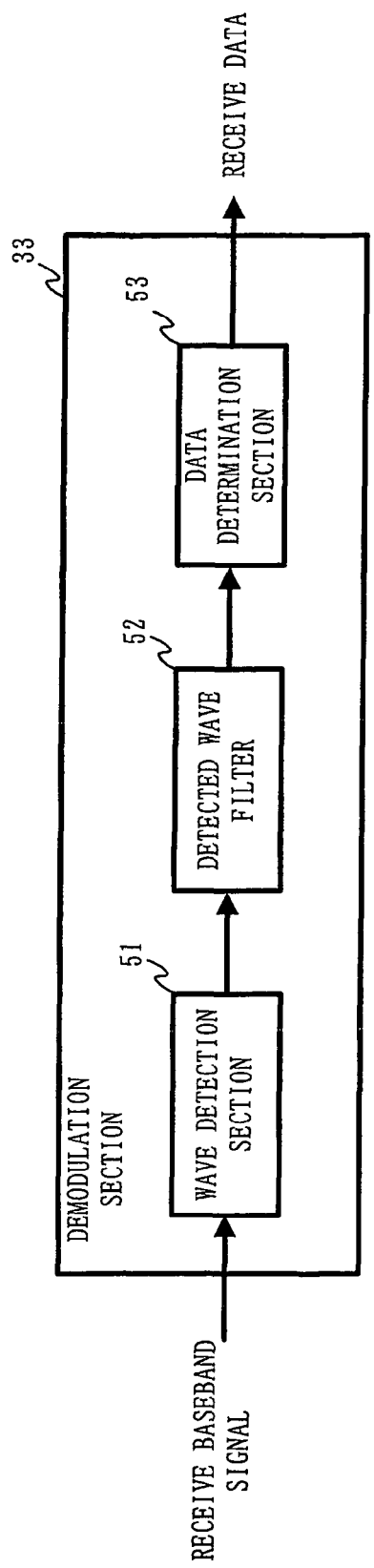
FIG. 5 is a block diagram showing a configuration of a demodulation section 33 in a case where the PSK-VP scheme is used.

FIG. 5 is a block diagram showing a configuration of the demodulation section 33 in a case where the PSK-VP scheme is used. The demodulation section 33 includes a wave detection section 51, a detected wave filter 52, and a data determination section 53.

The wave detection section 51 detects the receive baseband signal outputted from the RF section 32 of the receiving station 12. The detected wave filter 52 is a low-pass filter for filtering the detected signal. The data determination section 53 determines the signal outputted from the detected wave filter 52 to obtain demodulated data.

Figure 6:
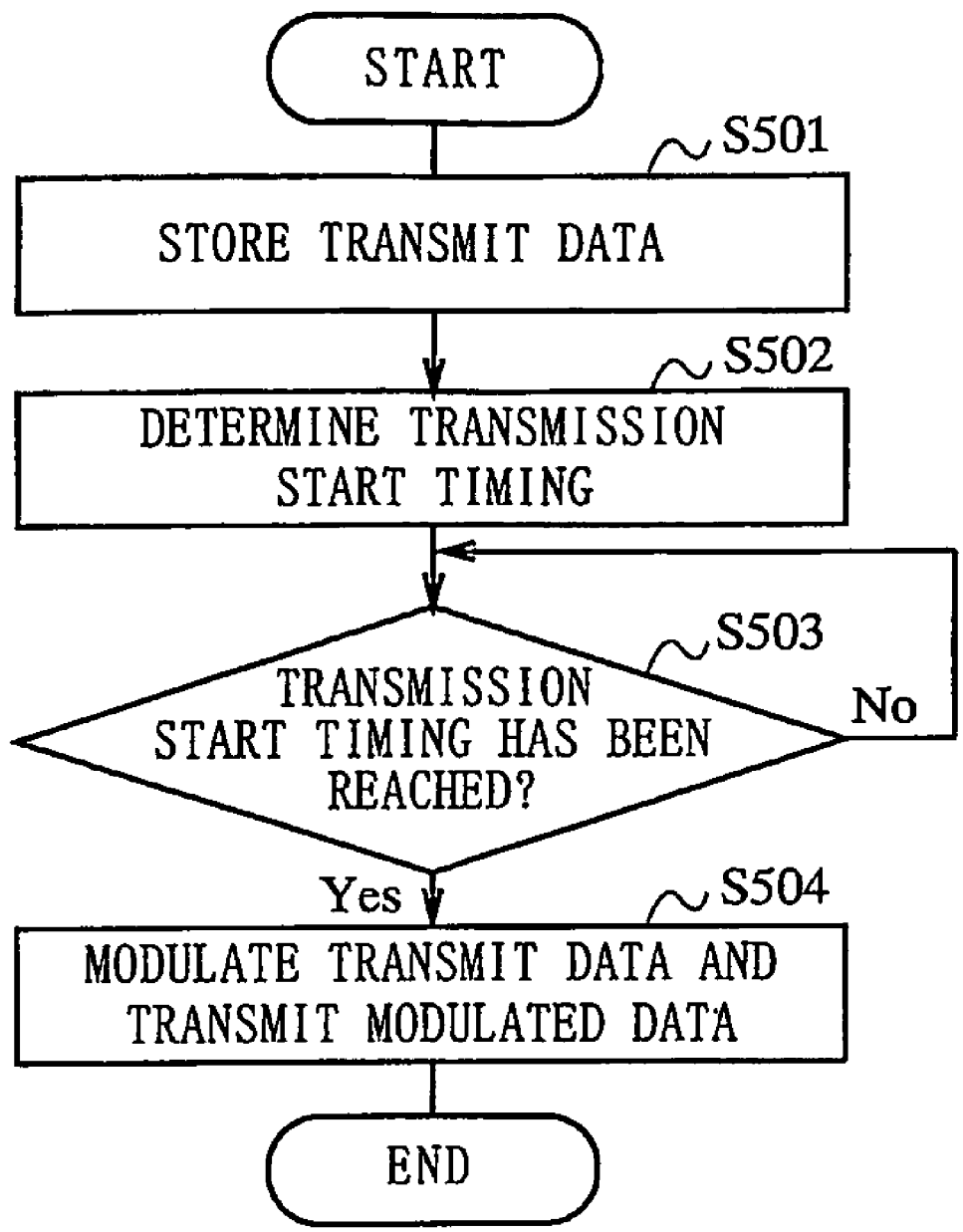
FIG. 6 is a flow chart showing an operation of the wireless station 11.

FIG. 6 is a flow chart showing an operation of the wireless station 11 having such a configuration. First, in the wireless station 11, the data storage section 22 stores transmit data (step S501). The transmission timing control section 23 determines the transmission start timing to be a timing obtained by delaying the reference timing by a predetermined delay amount (step S502).

Then, the transmission timing control section 23 determines whether or not the transmission start timing has been reached (step S503), and if so, the transmission timing control section 23 produces the transmission start signal and passes it to the modulation section 21. The transmit data is modulated by the modulation section 21, and then transmitted to the receiving station 12 via the RF section 24 and the antenna 25 (step S504).

Figure 41:
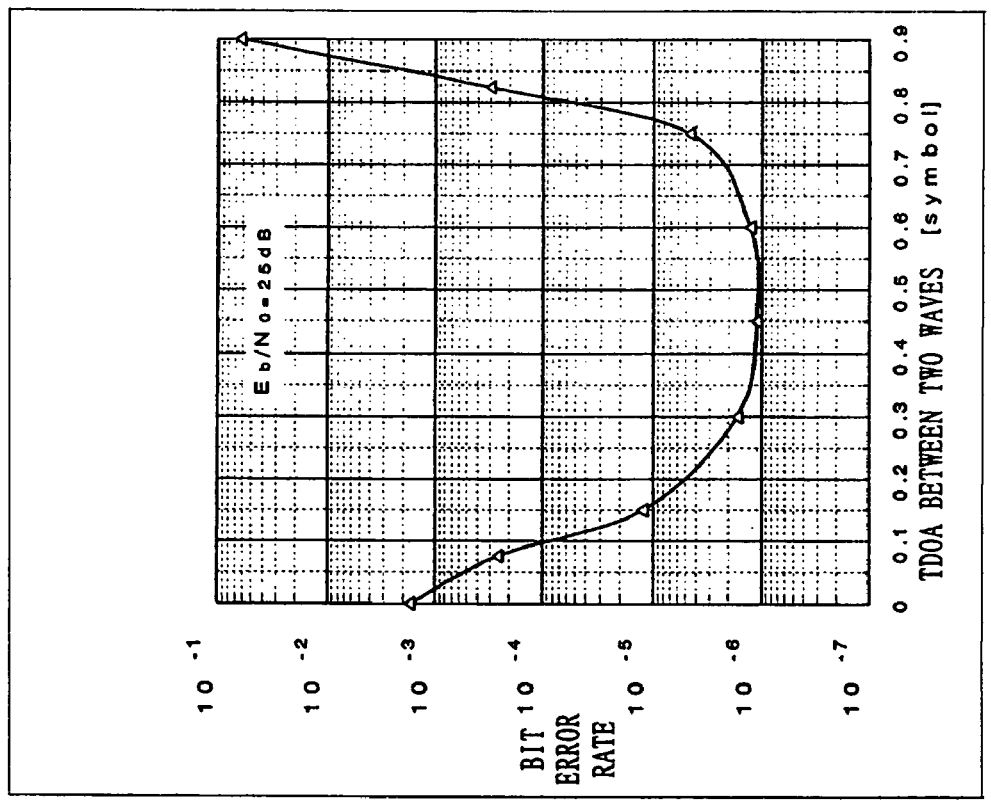
FIG. 41 shows the bit error rate characteristics relative to the TDOA between two waves in a case where the QPSK-VP scheme is used.

Next, a method for determining the delay amounts T1 and T2 stored in the wireless stations will be described. The delay amount difference tr which is unique to a modulation scheme and with which it is possible to effectively obtain the path diversity needs to satisfy $T_{min} \leq t_r \leq T_{max}$. Specifically, a predetermined delay amount is determined so that the difference between the signal-receiving timings is greater than or equal to a predetermined delay resolution (Tmin) and the difference between the maximum value and the minimum value of the signal-receiving timing is less than or equal to a predetermined maximum delay (Tmax). As an example, a case where the QPSK-VP scheme is used for communication will be described. As described above in the BACKGROUND ART section, FIG. 41 shows the bit error rate characteristics where the QPSK-VP scheme is used.

Figure 42:
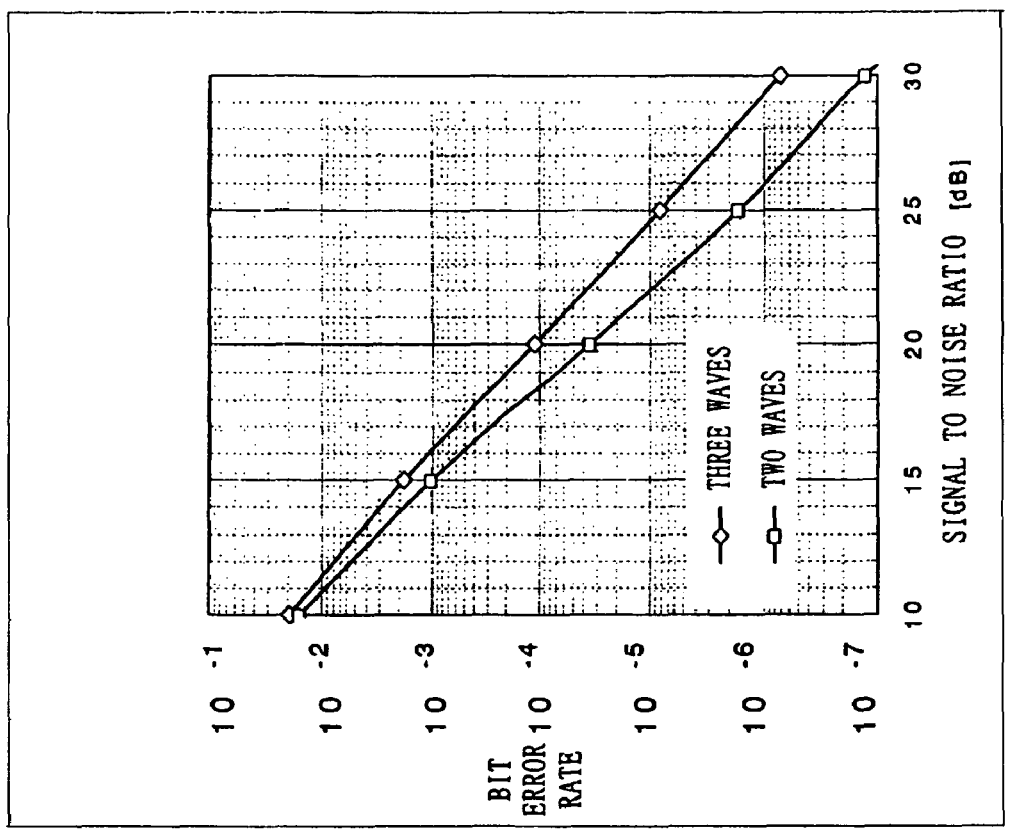
FIG. 42 shows the bit error rate characteristics for two received waves and for three received waves in the QPSK-VP scheme.
Figure 43:
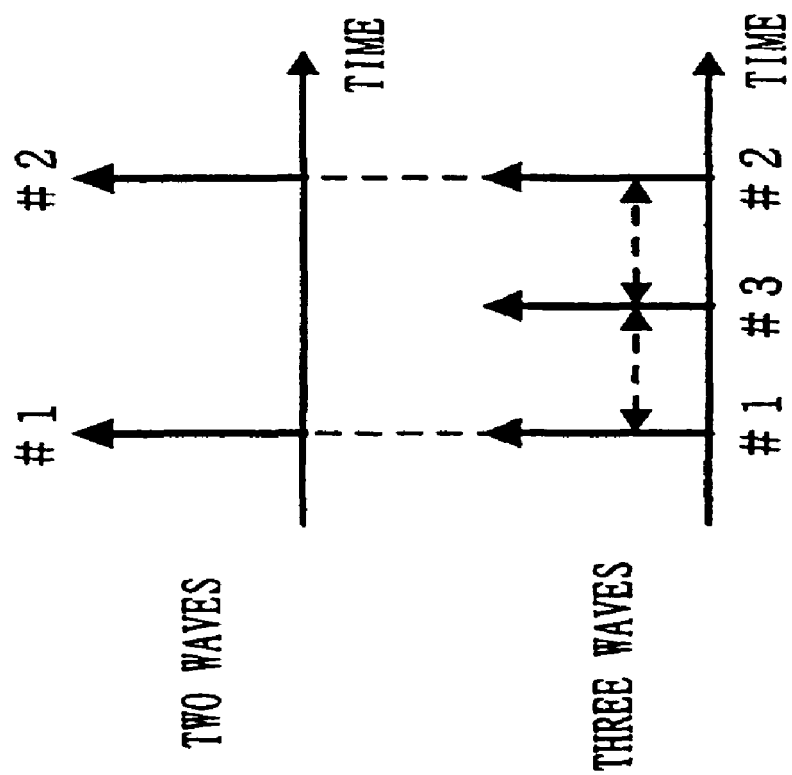
FIG. 43 shows the temporal relationship between the two waves and the three waves used in FIG. 42.

As described above with reference to FIG. 41, the optimal bit error rate is obtained when the delay resolution (Tmin) is about 0.3 symbol and the maximum delay (Tmax) is about 0.7 symbol. Then, the maximum number of effective branches can be calculated as 0.7/0.3≈2. If the receiving station 12 attempts to receive three arriving waves with no limitations on the arrival time, the maximum number of effective branches will be exceeded, whereby the transmission characteristics can be deteriorated as shown in FIG. 42.

Figure 7:
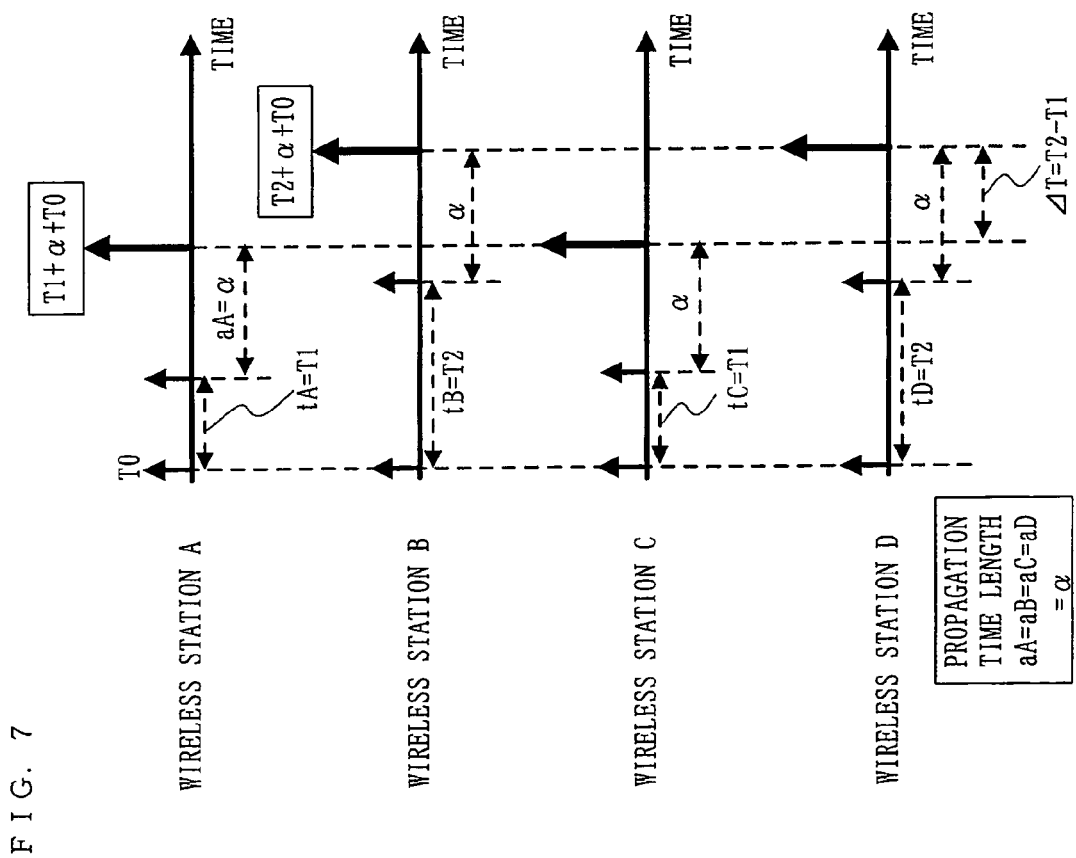
FIG. 7 is a timing diagram showing wireless stations A to D transmitting signals.

FIG. 7 is a timing diagram showing the wireless stations A to D transmitting signals. As described above, each of the delay amounts tA to tD stored in the wireless stations A to D is either T1 or T2. The values T1 and T2 satisfy Tmin≦T2−T1≦Tmax. As shown in FIG. 7, each of the four wireless stations A to D transmits a signal at a timing obtained by adding the delay amount T1 or T2 to the reference timing T0, i.e., either at (T1+T0) or (T2+T0). The delay amounts tA to tD to be given to signals by the wireless stations A to D are determined so that tA=tC=T1 and tB=tD=T2, for example.

Note that it is assumed in the present embodiment that propagation time lengths aA to aD between the wireless stations A to D and the receiving station 12 are all negligible or equal to one another. In FIG. 7; the propagation time lengths aA to aD are designated as α.

The receiving station 12 receives signals transmitted from the wireless stations A to D at two timings (T1+α+T0) and (T2+α+T0). There is a time difference (T2−T1) between the two timings. Therefore, it is possible to exert a path diversity effect and to improve the transmission characteristics in the wireless transmission system.

As described above, according to the present embodiment, even if the number of wireless stations is larger than the maximum number of effective branches that the receiving station can receive, the number of timings at which the receiving station receives signals can be made equal to the maximum number of effective branches. Therefore, even if the maximum number of effective branches that contribute to the path diversity effect is limited, it is possible to obtain the maximum path diversity effect. Thus, it is possible to improve the transmission characteristics in the wireless transmission system. Specifically, in a case where signals are received by the receiver side at a plurality of signal-receiving timings, the predetermined delay amount needs to be determined so that the number of signal-receiving timings is less than or equal to a predetermined maximum number of effective branches. The predetermined maximum number of effective branches, the predetermined delay resolution and the predetermined maximum delay are set to values such that a plurality of delayed waves can be received with path diversity on the receiver side.

Note that the present embodiment has been described above with respect to a case where there are four wireless stations. The number of wireless stations belonging to one of the two transmission timings is preferably the same or about the same as the number of wireless stations belonging to the other one of the two transmission timings. For example, where there are five wireless stations, two wireless stations may have the delay amount T1 stored therein with the other three wireless stations having the delay amount T2 stored therein.

In the present embodiment, the four wireless stations have the delay amount T1 or T2 stored therein in advance. Alternatively, each wireless station may have both the delay amounts T1 and T2. Then, the wireless station may always select the same delay amount or may randomly select one of the delay amounts. Moreover, it is preferred that the delay amount candidate values T1 and T2 are determined so as to also satisfy T2−T1=(Tmin+Tmax)/2. Then, the receiving station can receive signals within an acceptable TDOA range.

The reference timing signal shared by the wireless stations may alternatively be a timing based on a beacon signal received from a station other than the wireless station (e.g., a key station or a transmitting station), or a timing based on the time information contained in a GPS (global positioning system) signal or a timing obtained from a radio-controlled clock.

In the present embodiment, the wireless stations communicate with the receiving station using the QPSK-VP scheme. The modulation scheme may alternatively be the PSK-RZ scheme as described in Non-Patent Document 2 or the DSK scheme as described in Non-Patent Document 3 where the maximum delay is about 0.5 symbol. Also in such a case, T1 and T2 can be determined as in the first embodiment so as to satisfy Tmin≦T2−T1≦Tmax based on Tmin and Tmax, which are determined according to the modulation scheme.

Also in a case where the OFDM scheme is used as the modulation scheme, it is possible to obtain a similar effect to that of the wireless transmission system of the present invention.

Figure 8:
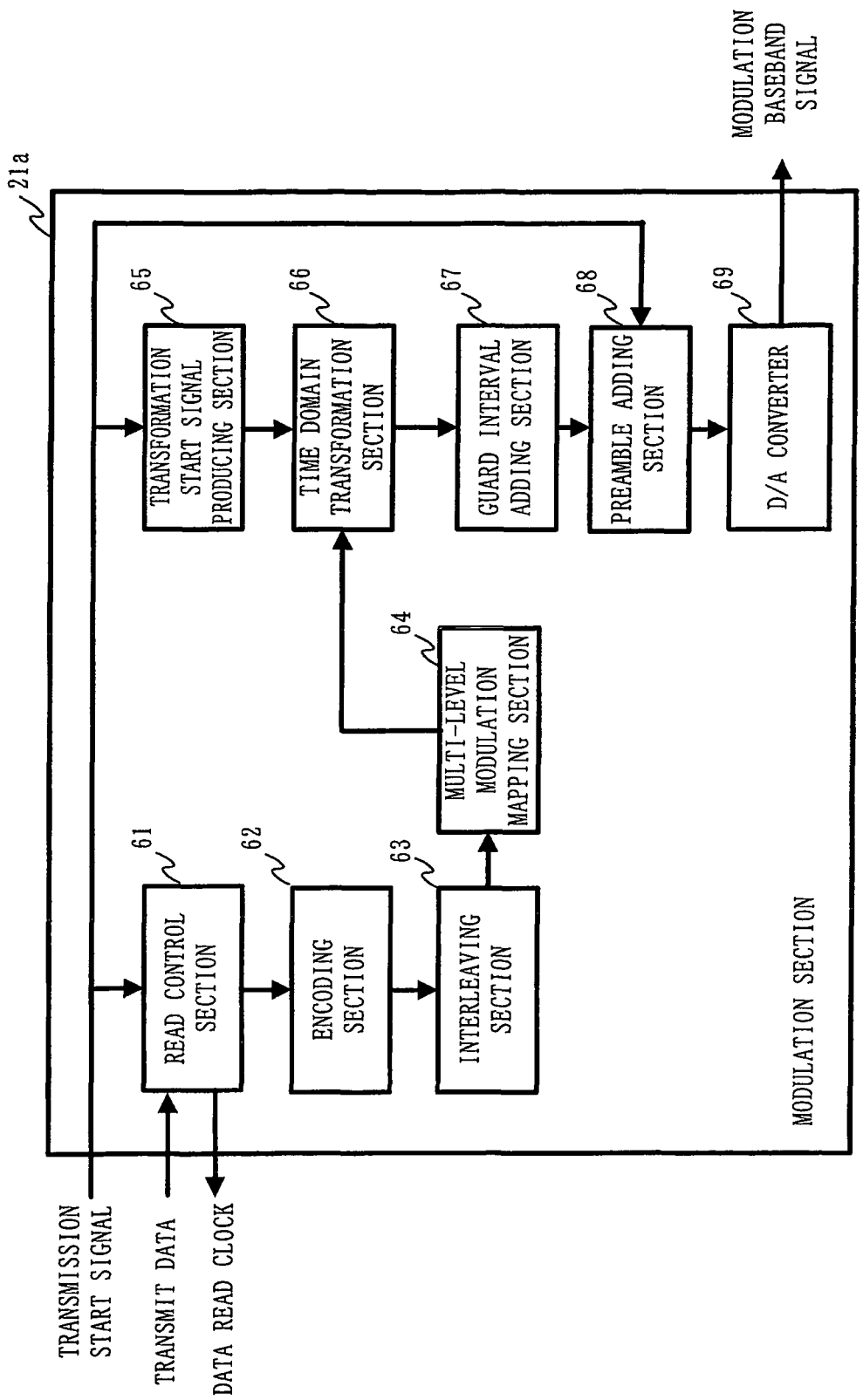
FIG. 8 is a block diagram showing a configuration of a modulation section 21a in a case where the OFDM scheme is used for communication.

FIG. 8 is a block diagram showing a configuration of a modulation section 21a in a case where the OFDM scheme is used for communication. Referring to FIG. 8, the modulation section 21a includes a read control section 61, an encoding section 62, an interleaving section 63, a multi-level modulation mapping section 64, a modulation start signal producing section 65, a time domain transformation section 66, a guard interval adding section 67, a preamble adding section 68, and a D/A converter 69.

The operation of the read control section 61 is similar to that of the read control section 41 shown in FIG. 3. The read control section 61 outputs the produced read clock to the data storage section 22 and receives the transmit data, and the read control section 61 outputs it to the encoding section 62.

The encoding section 62 performs an encoding operation for error correction by using convolution encoding, for example. The interleaving section 63 performs an interleave operation on the signal encoded by the encoding section 62. The multi-level modulation mapping section 64 performs a symbol mapping operation using a digital modulation scheme such as PSK or QAM on the interleaved signal to produce a frequency domain signal.

When the transformation start signal producing section 65 receives a transmission start signal from the transmission timing control section 23, the transformation start signal producing section 65 produces a transformation start signal indicating the timing at which the frequency domain signal is transformed into a time domain signal and passes it to the time domain transformation section 66.

When the time domain transformation section 66 receives the transformation start signal on the receiver side, the time domain transformation section 66 transforms the frequency domain signal into a time domain signal being an OFDM signal. The guard interval adding section 67 adds a guard interval to each symbol of the OFDM signal to output an OFDM modulated signal.

The preamble adding section 68 adds, to a signal, a preamble to be used in the synchronization operation. The D/A converter 69 converts the digital OFDM signal with the preamble added thereto into an analog signal, and outputs it as a modulation baseband signal.

Figure 9:
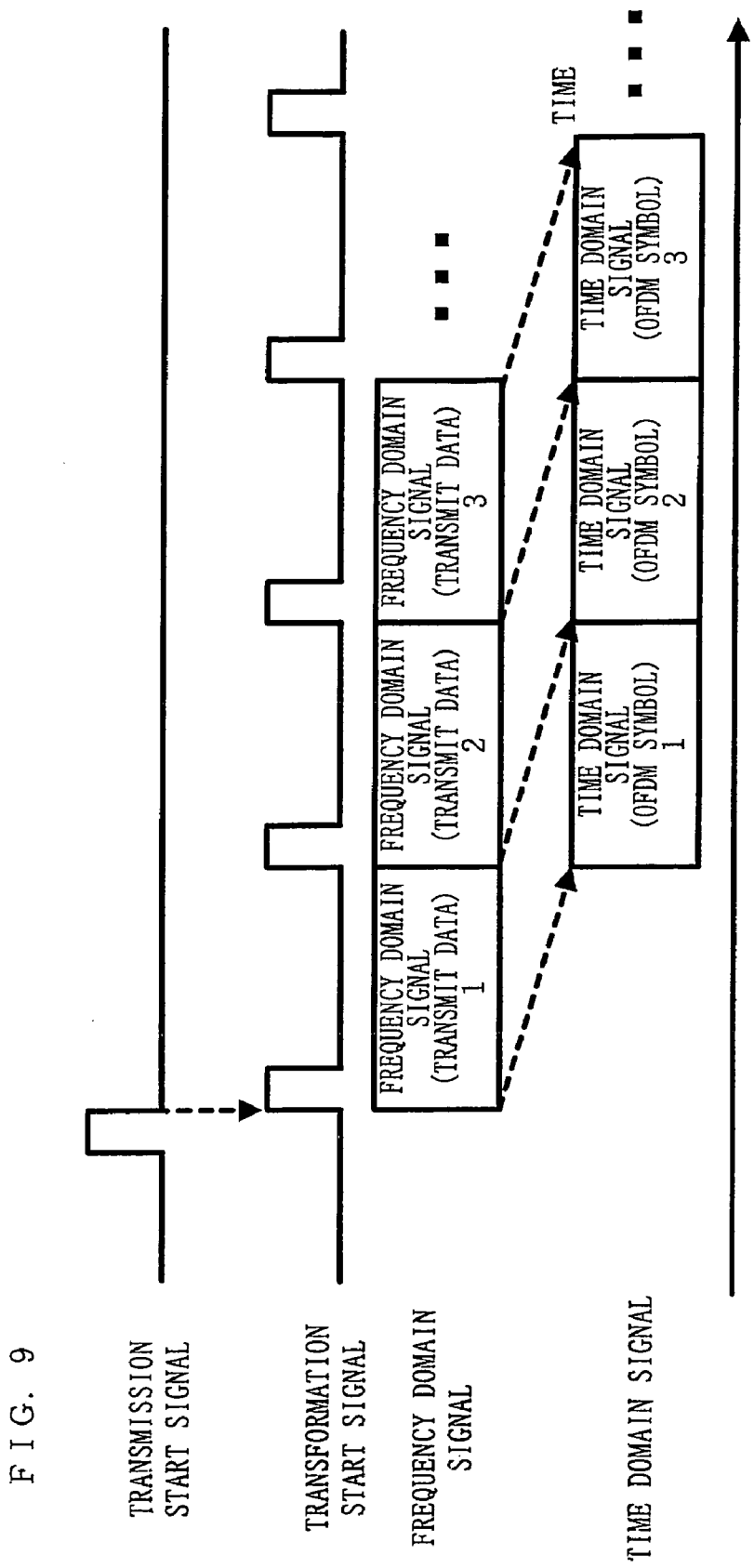
FIG. 9 is a timing diagram showing a signal produced in an important part of the modulation section 21a shown in FIG. 8 and a transmission start signal.

FIG. 9 is a timing diagram showing a signal produced in an important part of the modulation section 21a shown in FIG. 8 and a transmission start signal.

In the modulation section 21a, when the transformation start signal producing section 65 receives a transmission start signal from the transmission timing control section 23, the transformation start signal producing section 65 produces a transformation start signal. The time domain transformation section 66 transforms the frequency domain signal into a time domain signal, thus producing an OFDM symbol, according to the timing indicated by the transformation start signal. Thus, the modulation section 21a modulates the transmit data when a transmission start signal is received.

Figure 10:
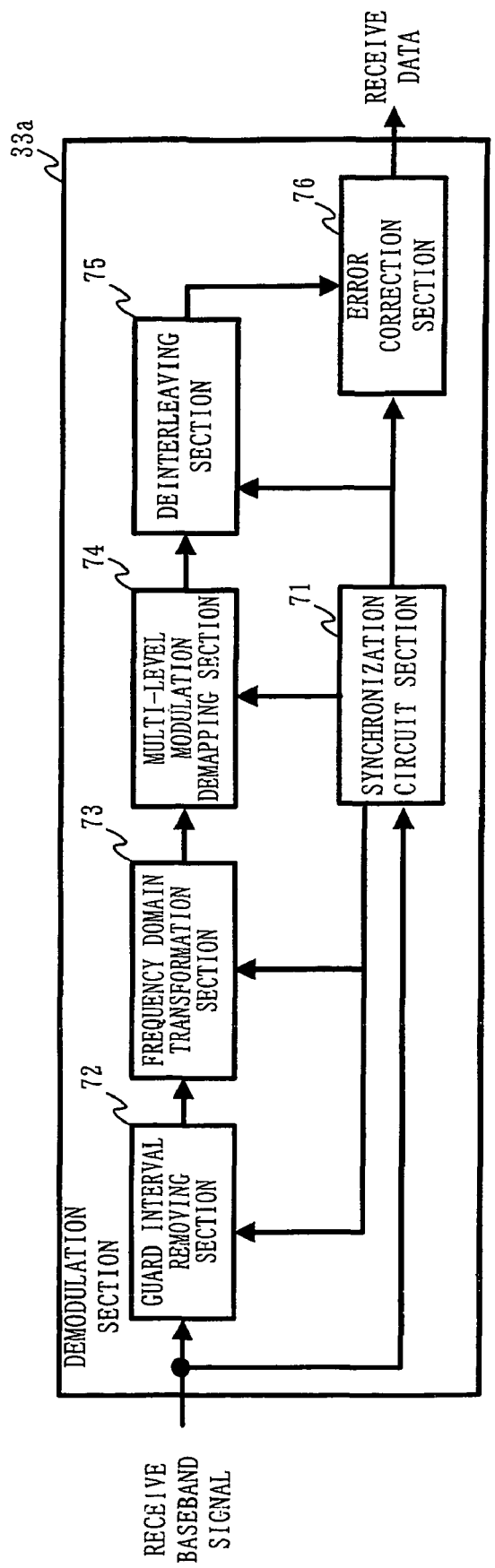
FIG. 10 is a block diagram showing a configuration of a demodulation section 33a in a case where the OFDM scheme is used for communication.

FIG. 10 is a block diagram showing a configuration of a demodulation section 33a in a case where the OFDM scheme is used for communication. Referring to FIG. 10, the demodulation section 33a includes a synchronization circuit section 71, a guard interval removing section 72, a frequency domain transformation section 73, a multi-level modulation demapping section 74, a deinterleaving section 75, and an error correction section 76.

The synchronization circuit section 71 produces a symbol synchronization signal for the OFDM symbol, and outputs the symbol synchronization signal to other sections belonging to the demodulation section 33a. The symbol synchronization signal is used as a timing signal for internal operations of various sections. The guard interval removing section 72 removes the guard interval included in each OFDM symbol of the receive baseband signal.

The frequency domain transformation section 73 transforms a time domain signal into a frequency domain signal. The multi-level modulation demapping section 74 obtains determination data from the frequency domain signal through a demapping operation on the multi-level modulation constellation. The deinterleaving section 75 performs a deinterleave operation on the determination data. The error correction section 76 performs an error correction operation on the deinterleaved data to obtain receive data. For example, a viterbi decoding operation is performed where convolution encoding is used in the error correction operation.

With the OFDM scheme, if the TDOA is within the guard interval, there will be no intersymbol interference and thus no error. Moreover, an error correction is typically performed over a plurality of carriers. Thus, it is possible to better exert the path diversity effect with frequency-selective fading where a plurality of notches occur in the spectrum, than with flat fading where the overall spectrum drops down. Moreover, with the OFDM scheme, the delay resolution Tmin corresponds to the inverse of the frequency bandwidth, and the maximum delay Tmax corresponds to the guard interval length. Therefore, when using the modulation section 21a shown in FIG. 8 and the demodulation section 33a shown in FIG. 10, the delay amount candidate values T1 and T2 can be determined so as to satisfy $Tmin \leq T2-T1 \leq Tmax$.

Moreover, effects similar to those of the first embodiment can be obtained also when a single carrier scheme is used as the modulation scheme and an equalizer compensating for the transmission path distortion is used as the demodulation scheme. In such a case, the modulation section is similar to the modulation section 21 of the PSK scheme except that a different modulation waveform is stored in the waveform memory (see FIG. 3).

Figure 11:
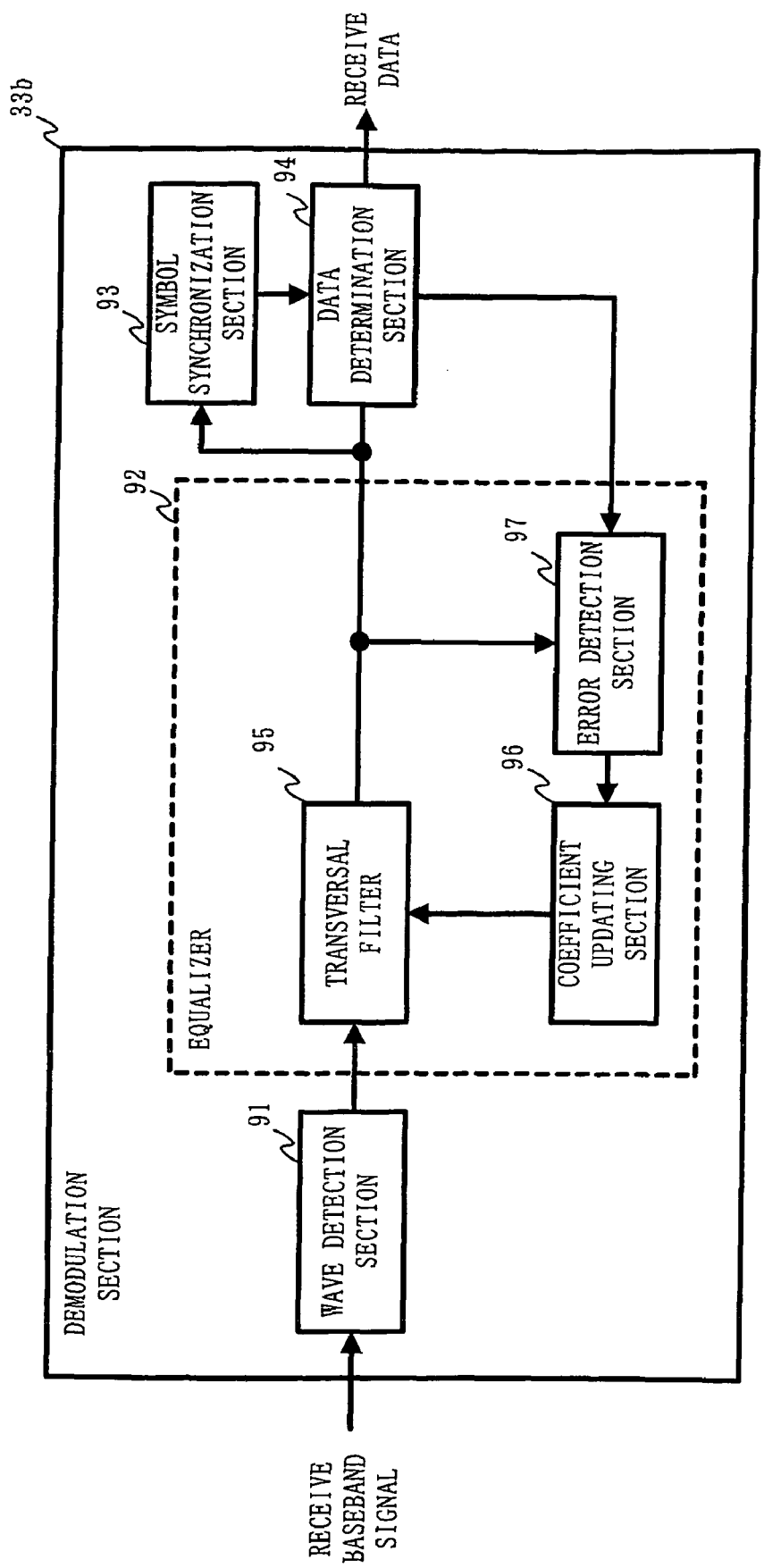
FIG. 11 is a block diagram showing a configuration of a demodulation section 33b where a single carrier scheme is used for communication.

FIG. 11 is a block diagram showing a configuration of a demodulation section 33b where a single carrier scheme is used for communication. Referring to FIG. 11, the demodulation section 33b includes a wave detection section 91, an equalizer 92, a symbol synchronization section 93, and a data determination section 94. The equalizer 92 includes a transversal filter 95, an error detection section 97, and a coefficient updating section 96.

The wave detection section 91 detects a receive baseband signal. In the equalizer 92, the transversal filter 95 equalizes the receive baseband signal according to the filter coefficient outputted from the coefficient updating section 96, and outputs the obtained signal as an equalized signal. The error detection section 97 detects an error between the equalized signal and the demodulated data. The coefficient updating section 96 updates the filter coefficient for the transversal filter based on the error detected by the error detection section 97.

The symbol synchronization section 93 reproduces the symbol timing by reproducing the signal outputted from the transversal filter 95 based on a clock signal. The data determination section 94 samples the equalized signal according to the symbol timing to obtain demodulated data.

Where an equalizer is used, the delay resolution Tmin corresponds to the symbol length, and the maximum delay Tmax corresponds to a temporal length determined by the number of taps. Therefore, where the modulation section 21 shown in FIG. 3 and the demodulation section 33b shown in FIG. 11 are used, the delay amount candidate values T1 and T2 can be determined so as to satisfy $Tmin \leq T2-T1 \leq Tmax$.

Note that in the present embodiment, the transmission start timing of the wireless station is determined by the transmission timing control section. The transmission timing control section determines the transmission start timing to be a timing obtained by delaying, by a delay amount, the reference timing indicated by the reference timing signal. Thus, an intended delay can be added to the transmission timing of each wireless station. However, the method of adding a delay is not limited to this. Another method of adding a delay may be, for example, adding a delay to the modulation baseband signal outputted from the modulation section.

Figure 12:
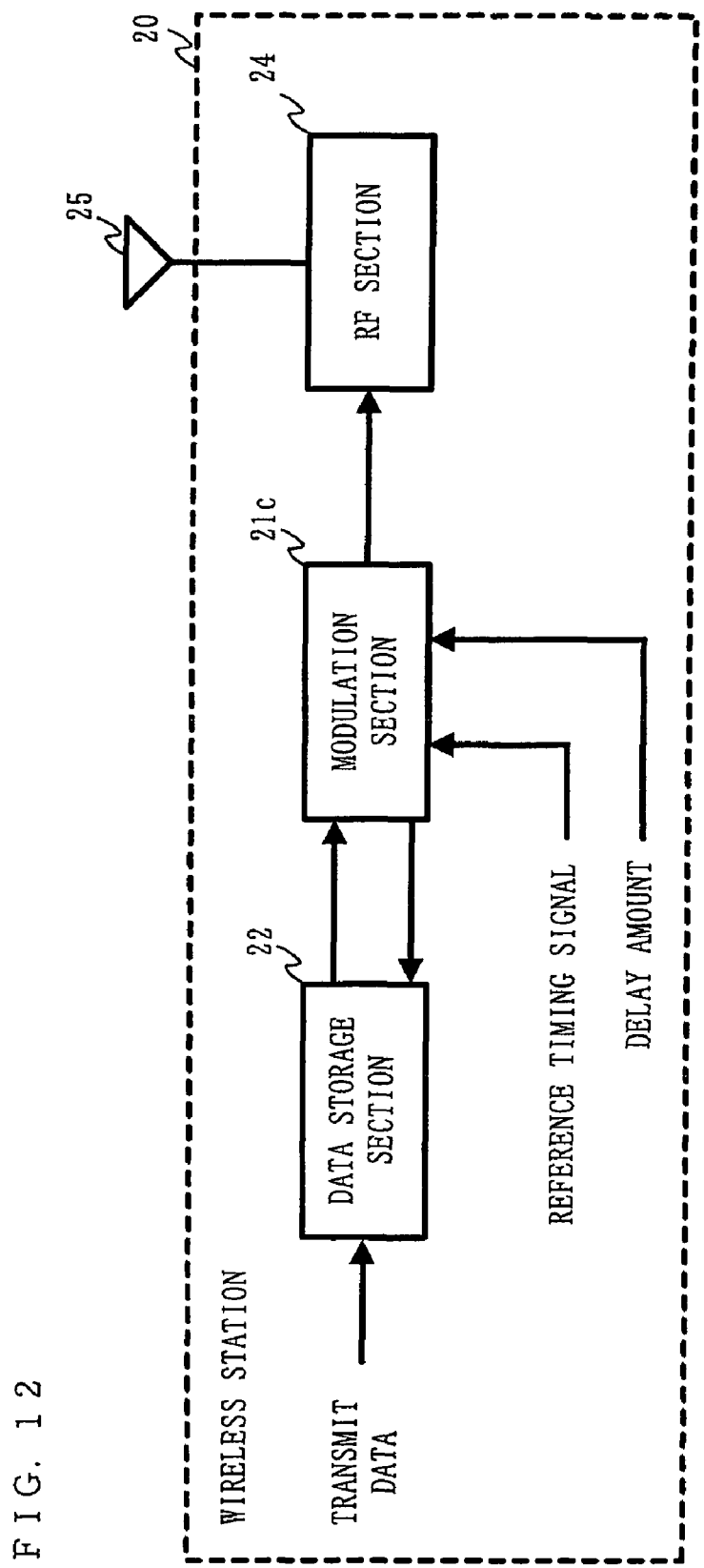
FIG. 12 is a block diagram showing a configuration of a wireless station 20 where a modulation section gives a delay to a modulation baseband signal.

FIG. 12 is a block diagram showing a configuration of a wireless station 20 where a delay is added to the modulation baseband signal outputted from the modulation section. The wireless station 20 shown in FIG. 12 is similar to the wireless station 11 shown in FIG. 2 except that the transmission timing control section 23 is absent. Otherwise, the configuration of the wireless station 20 is similar to that of the wireless station 11 shown in FIG. 2. Therefore, the same reference numerals are used, and the configuration will not be further described below.

Figure 13:
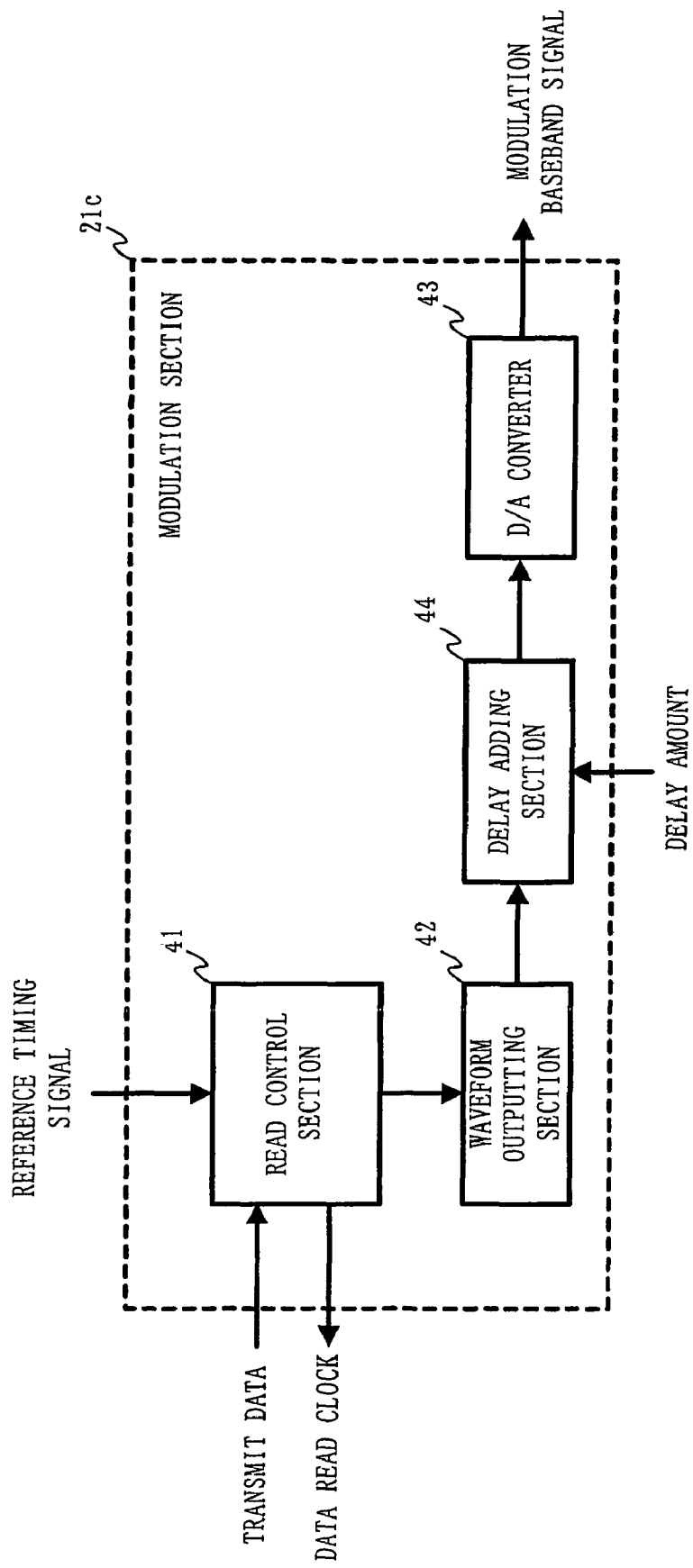
FIG. 13 is a block diagram showing a configuration of a modulation section 21c shown in FIG. 12.

FIG. 13 is a block diagram showing a configuration of a modulation section 21c shown in FIG. 12. The modulation section 21c shown in FIG. 13 differs from the modulation section 21 shown in FIG. 3 in that the modulation section 21c further includes a delay adding section 44. Otherwise, the configuration of the modulation section 21c is similar to that shown in FIG. 3. Therefore, the same reference numerals are used, and the configuration will not be further described below.

The delay adding section 44 is formed by a shift register, and delays the input signal by a predetermined delay amount to output the delayed signal to the D/A converter 43. Thus, it is possible to delay the signal obtained from the waveform outputting section 42 by a predetermined delay amount.

Note that while a case where a signal is delayed on a digital circuit has been described above with reference to FIG. 13, a signal may alternatively be delayed on an analog circuit. In such a case, the delay adding section 44 may be provided subsequent to the D/A converter 43.

Figure 14:
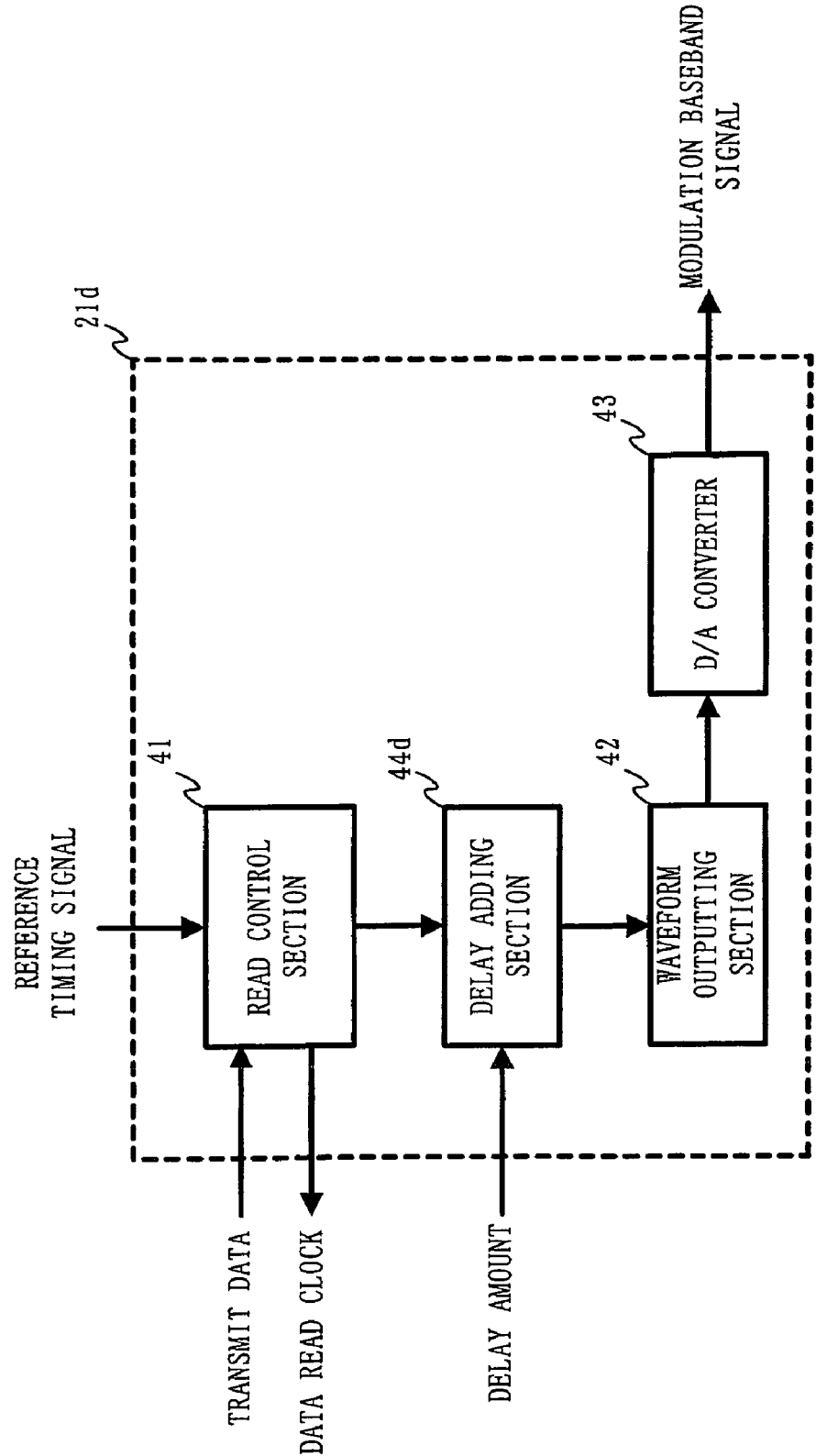
FIG. 14 is a block diagram showing a configuration of a modulation section 21d in a case where a delay adding section is provided between a read control section and a waveform outputting section.

Alternatively, a delay adding section may be provided between a read control section and a waveform outputting section. FIG. 14 is a block diagram showing a configuration of a modulation section 21*d* in a case where a delay adding section is provided between a read control section and a waveform outputting section. The modulation section 21*d* includes a delay adding section 44*d* for delaying an address signal by a predetermined delay amount to output the delayed signal to the waveform outputting section 42. Note that the configuration and the operation of the delay adding section 44*d* are similar to those of the delay adding section 44 shown in FIG. 13, and will not be further described below. Thus, a predetermined delay can be added to the modulation baseband signal. The present invention is not limited to the examples described above as long as a plurality of wireless stations can each transmit data at a timing obtained by adding a predetermined delay amount to the reference timing.

Where the modulation section of the OFDM scheme shown in FIG. 8 is used, the specific method of controlling the transmission timing may be similar to that described above, or may be any other suitable method.

Second Embodiment

The first embodiment has been directed to a case where the PSK-VP scheme, the OFDM scheme and the signal carrier scheme are used for communication. A second embodiment of the present invention is directed to a case where the DSSS scheme is used for communication. The wireless transmission system of the second embodiment is similar to that of the first embodiment except for the configuration of the modulation section and the demodulation section (see FIG. 1). In the present embodiment, it is assumed that there are five wireless stations in the wireless transmission system. The fifth wireless station will be referred to as the wireless station E distinguished from the wireless stations A to D.

Figure 15:
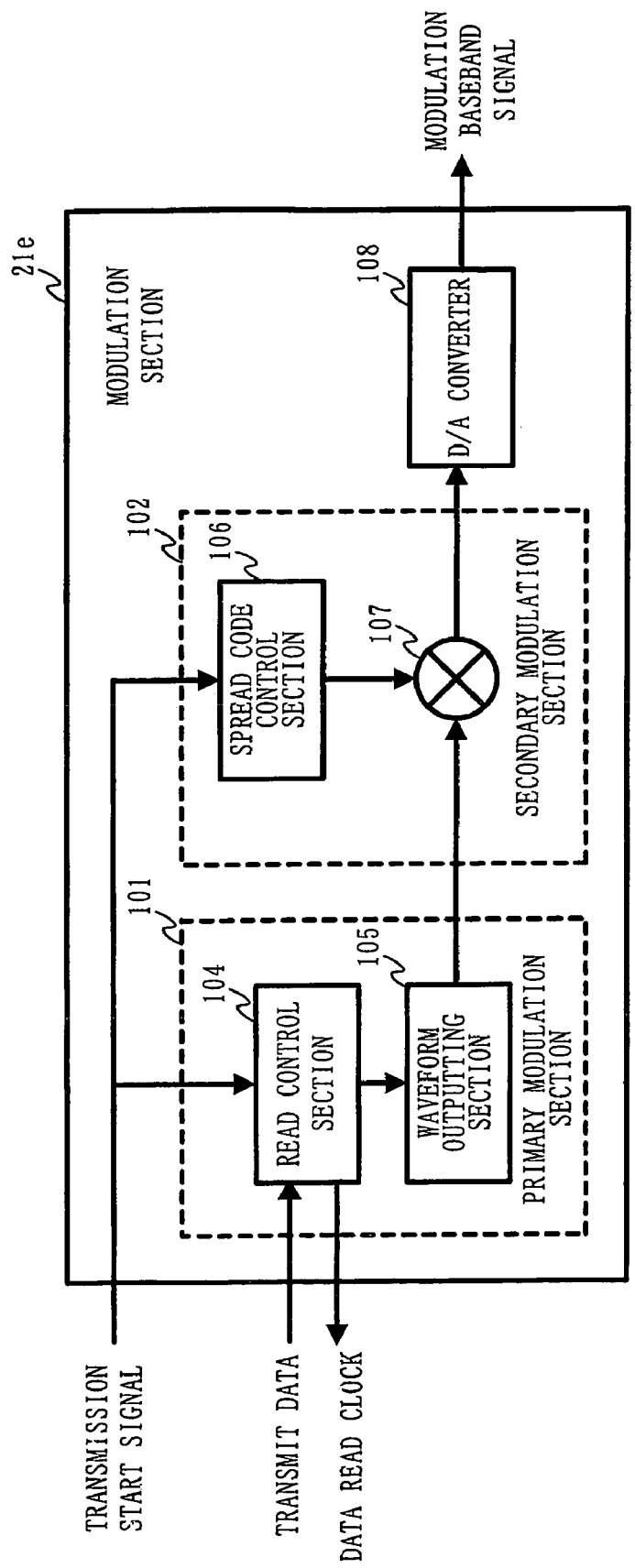
FIG. 15 is a block diagram showing a configuration of a modulation section 21e according to a second embodiment of the present invention.

FIG. 15 is a block diagram showing a configuration of a modulation section 21*e* in a case where the DSSS scheme is used for communication. Referring to FIG. 15, the modulation section 21*e* includes a primary modulation section 101 and a secondary modulation section 102. The primary modulation section 101 includes a read control section 104 and a waveform outputting section 105. The secondary modulation section 102 includes a spread code control section 106 and a multiplier 107.

In the primary modulation section 101, the read control section 104 produces a read clock in response to the generation of the transmission start signal. Then, the read control section 104 outputs the produced read clock to the data storage section 22, receives transmit data, and passes an address signal based on the transmit data to the waveform outputting section 105. The waveform outputting section 105 has modulation waveform data stored in the waveform memory in advance, and reads out the modulation waveform data according to the address signal to output it as a primary modulation signal.

In the secondary modulation section 102, the spread code control section 106 outputs a spread signal to the multiplier 107 in response to the transmission start signal. The multiplier 107 spreads the primary modulation signal with the spread signal. A D/A converter 108 converts the spread digital signal into an analog signal, and outputs it as a modulation baseband signal. Thus, in response to the transmission start signal, the modulation section 21*e* starts the signal spreading operation. Therefore, it is possible to transmit data while adding a predetermined delay amount. Note that the present embodiment is directed to a case where a spread code of a 4-chip length is used.

Figure 16:
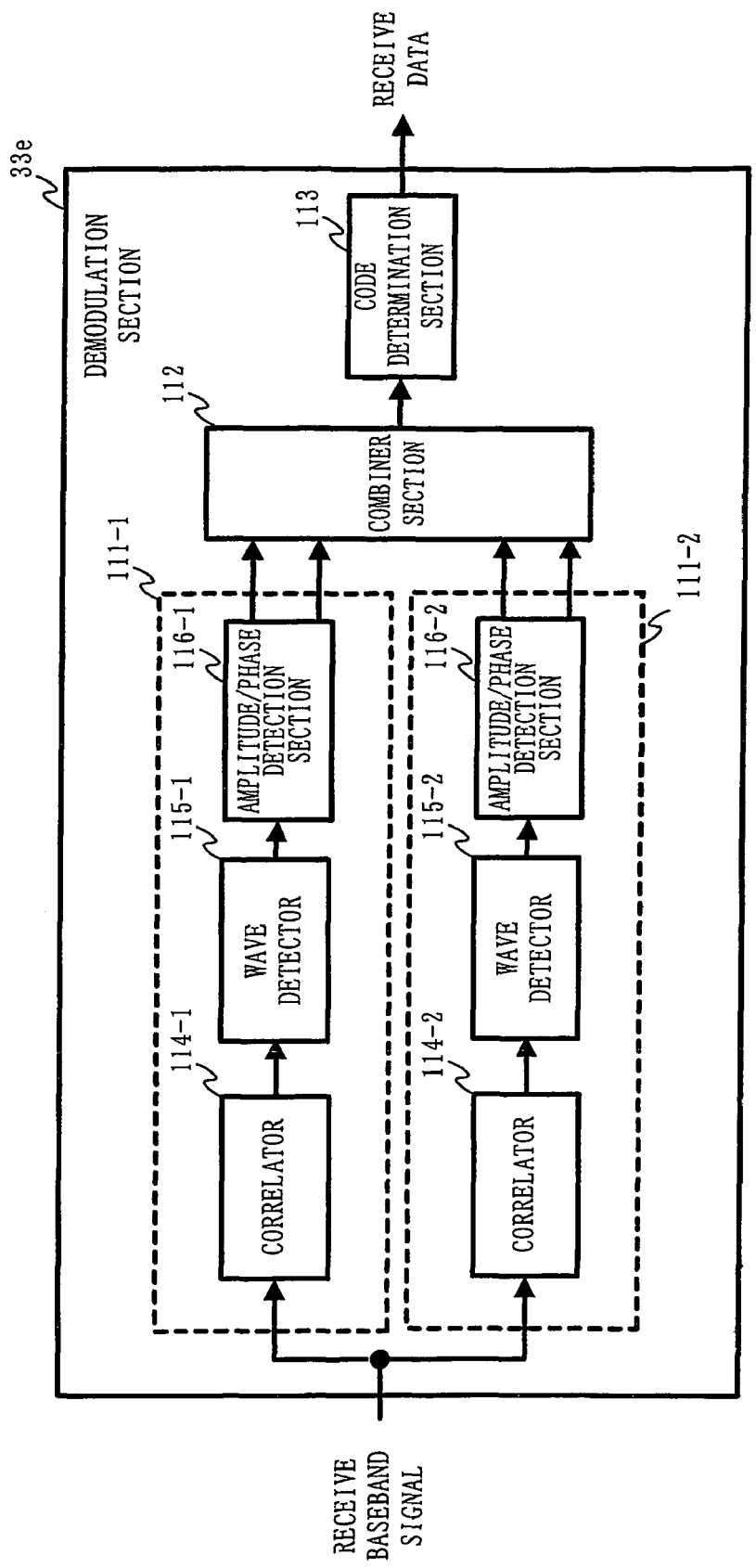
FIG. 16 is a block diagram showing a configuration of a demodulation section 33e according to the second embodiment of the present invention.

FIG. 16 is a block diagram showing a configuration of a demodulation section 33*e* in a case where the DSSS scheme is used for communication. Referring to FIG. 16, the demodulation section 33*e* includes two fingers 111-1 and 111-2, a combiner section 112, and a code determination section 113. The fingers 111-1 and 111-2 include correlators 114-1 and 114-2, wave detectors 115-1 and 115-2 and amplitude/phase detection sections 116-1 and 116-2, respectively.

Each of the correlators 114-1 and 114-2 despreads the received spread signal to produce a despread signal. Each of the wave detectors 115-1 and 115-2 detects the despread signal to produce a detection signal. Each of the amplitude/phase detection sections 116-1 and 116-2 detects the amplitude and the phase of the detection signal, and outputs them as amplitude information and phase information, respectively.

The combiner section 112 combines the two detection signals together based on the amplitude information and the phase information thereof, thus producing a combined signal. The code determination section 113 performs a code determination operation on the combined signal to obtain receive data.

A predetermined delay amount is determined so that the difference between the signal-receiving timings is greater than or equal to a predetermined delay resolution (Tmin) and the difference between the maximum value and the minimum value of the signal-receiving timing is less than or equal to a predetermined maximum delay (Tmax). In a case where signals are received by the receiver side at a plurality of signal-receiving timings, the predetermined delay amount needs to be determined so that the number of signal-receiving timings is less than or equal to a predetermined maximum number of effective branches. The predetermined maximum number of effective branches, the predetermined delay resolution and the predetermined maximum delay are set to values such that a plurality of delayed waves can be received with path diversity on the receiver side. Specifically, the minimum delay amount Tmin and the maximum delay amount Tmax, with which it is possible to effectively obtain the path diversity; are Tmin=Tc and Tmax=3×Tc, where the spread code length is 4 chips and the chip length is Tc. Therefore, the maximum number of effective branches for obtaining the path diversity is about four at best. Typically, the diversity effect can be improved by increasing the number of fingers provided in the receiving station, which however will increase the circuit scale. A case where the demodulation section 33*e* has two fingers (2-finger) will be described. In a case where the DSSS scheme is used, the delay resolution is equal to the 1-chip length of the spread code, and the maximum delay is equal to the spread code length.

The operation of the transmission timing control section 23 is similar to that of the first embodiment. For example, where the delay amounts of the wireless stations A to E are tA=tC=tE=T1 and tB=tD=T2, the receiving station 12 receives signals at either (T1+α+T0) or (T2+α+T0). There is a time difference (T2−T1) between the two signal-receiving timings.

Thus, even if the receiving station 12 receives signals transmitted from three or more wireless stations, the number of signal-receiving timings is reduced down to two. Moreover, the time difference between the two signal-receiving timings is such that the receiving station 12 can separate arriving waves from one another. Therefore, it is possible with two fingers to obtain non-correlative detection outputs for signals from all wireless stations, whereby it is possible to exert the maximum path diversity effect at the receiving station and to improve the transmission characteristics.

The number of candidate values may be equal to the maximum number of effective branches (four), and the candidate values may be set to T1=Tc, T2=2Tc, T3=3Tc and T4=4Tc, so that signals are transmitted with delay amounts of tA=tE=T1, tB=T2, tC=T3 and tD=T4. Thus, even under a signal-receiving environment where a signal from one of the transmitting stations is blocked, the receiving station can receive delayed waves of different arrival times with a higher probability than in a case where the number of candidate values is two. Specifically, in a case where the number of candidate values is two (tA=tE=T1, tB=T2, tC=T1 and tD=T2), if signals from the wireless stations B and D are blocked, the receiving station will receive signals at one signal-receiving timing. In contrast, where the number of candidate values is four (tA=tE=T1, tB=T2, tC=T3 and tD=T4), signals from the wireless stations A, C and E can be received with a TDOA greater than or equal to the chip time difference and at two different signal-receiving timings.

As described above, according to the present embodiment, even in a case where the DSSS scheme is used for communication, the number of timings at which the receiving station receives signals can be less than or equal to the maximum number of effective branches, and the time difference between the signal-receiving timings can be greater than or equal to the delay resolution and less than or equal to the maximum delay, whereby it is possible to exert a maximum path diversity effect.

In the present embodiment, as in the first embodiment, the modulation section may include the delay adding section to add a predetermined delay amount to the outputted modulation baseband signal. The configuration of the delay adding section in this case is similar to the first embodiment (see FIG. 14), and will not be further described below. Also when a modulation section of the DSSS scheme as shown in FIG. 15 is used, the specific method of controlling the transmission timing may be similar to that described above, or may be any other suitable method.

The wireless transmission system of the present invention will now be described with respect to various forms of signal transmission. In the following description, the QPSK-VP scheme is used as the modulation scheme. Note that the delay amount tr for effectively exerting the path diversity satisfies Tmin≦tr≦Tmax.

Third Embodiment

A wireless transmission system according to a third embodiment of the present invention differs from that of the first embodiment in that the wireless transmission system of the third embodiment further includes a transmitting station for transmitting, to a wireless station, a signal to be transmitted to the receiving station.

Figure 17:
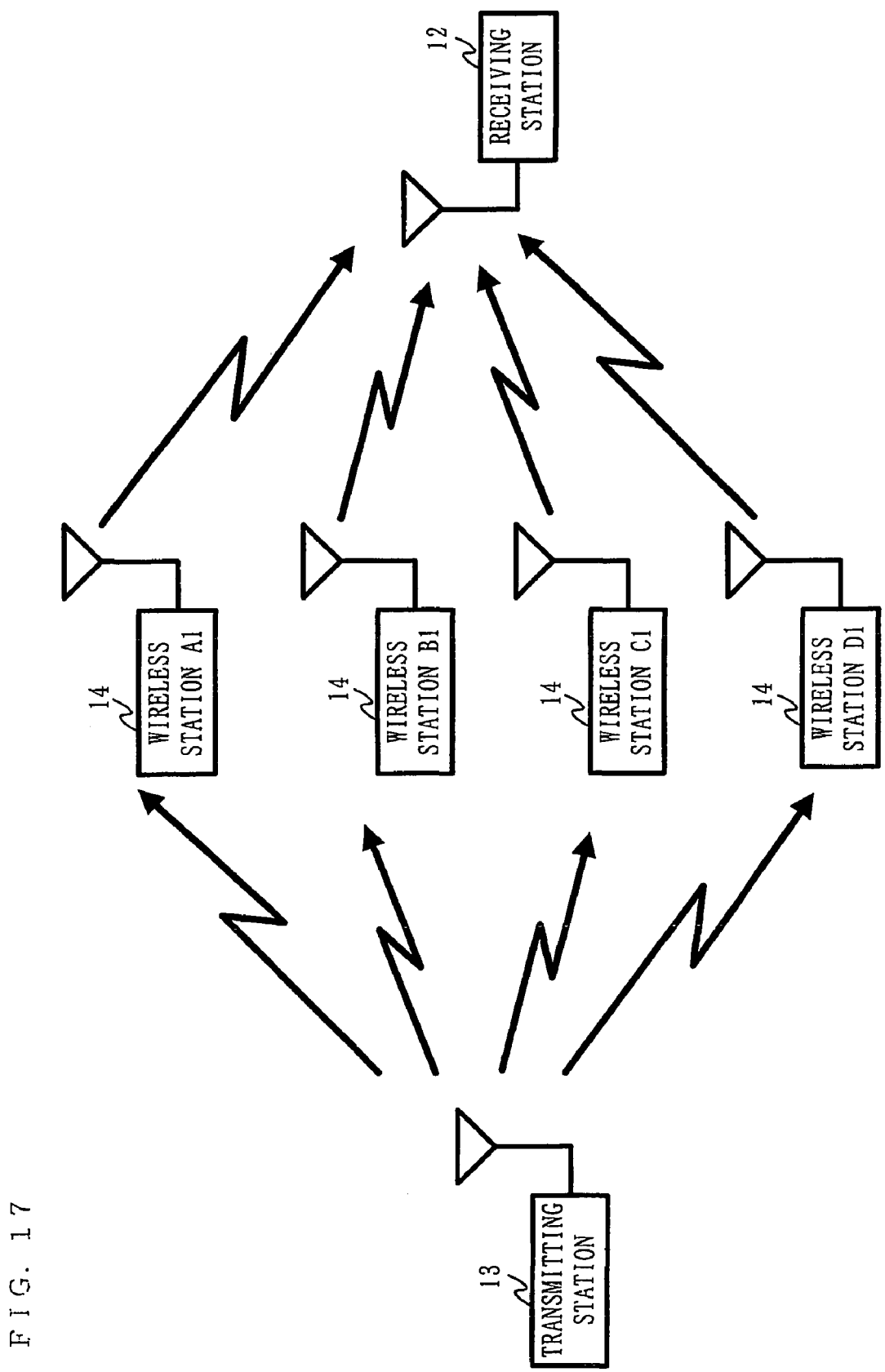
FIG. 17 shows a configuration of a wireless transmission system according to a third embodiment of the present invention.

FIG. 17 shows a configuration of a wireless transmission system according to a third embodiment of the present invention. Referring to FIG. 17, the wireless transmission system includes a transmitting station 13, a plurality of wireless stations 14, and the receiving station 12. The transmitting station 13 and the wireless stations 14 are connected to each other via a wireless connection, and the wireless stations 14 and the receiving station 12 are also connected to each other via a wireless connection. The configuration of the transmitting station 13 is similar to that of the wireless station 11 shown in FIG. 2 except that the transmission timing control section 23 is absent. The configuration of the receiving station 12 is similar to that shown in FIG. 1, and will not be further described below.

In the present embodiment, the wireless transmission system includes four wireless stations 14. As in the first embodiment, the four wireless stations may be referred to as wireless stations A1 to D1 to distinguish them from one another. Where the wireless stations A1 to D1 do not need to be distinguished from one another, they will be referred to as the wireless stations 14.

Figure 18:
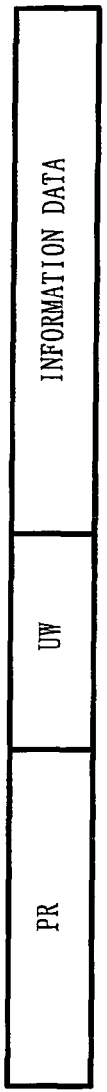
FIG. 18 shows a structure of a frame used for signals transmitted by a transmitting station 13 and a wireless station 14.

FIG. 18 shows a structure of a frame used for signals transmitted by the transmitting station 13 and the wireless stations 14. Referring to FIG. 18, a frame includes a preamble (hereinafter referred to as "PR"), a unique word (hereinafter referred to as "UW"), and information data. PR is used for purposes such as gain control, symbol synchronization, and frequency synchronization. UW is used for frame type determination and frame synchronization. The information data contains data to be sent from the transmitter side.

Figure 19:
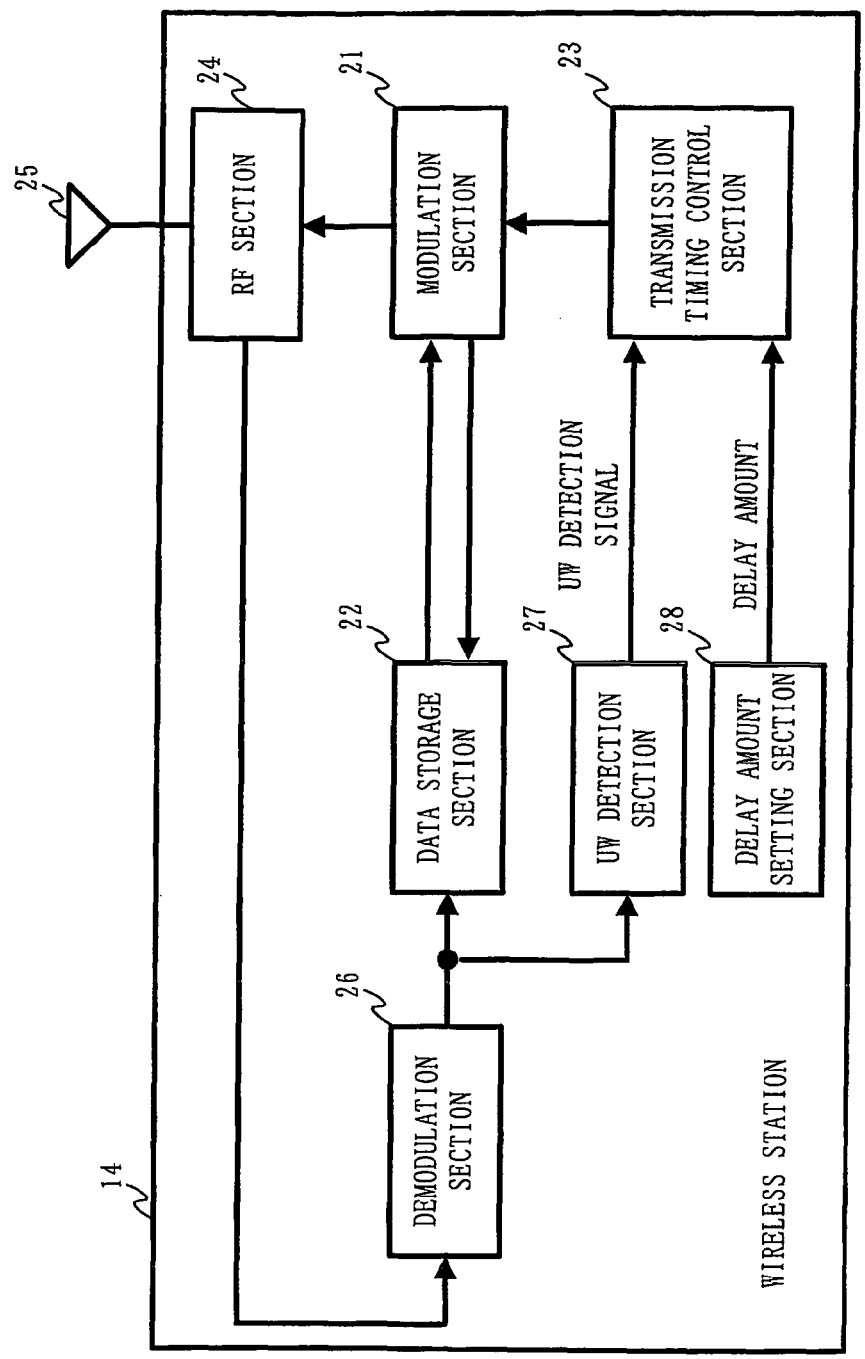
FIG. 19 is a block diagram showing a configuration of the wireless station 14 shown in FIG. 17.

FIG. 19 is a block diagram showing a configuration of the wireless station 14 shown in FIG. 17. The configuration of the wireless station 14 shown in FIG. 19 is similar to that of the wireless station 11 of the first embodiment shown in FIG. 1, except that the wireless station 14 further includes a demodulation section 26, a UW detection section 27, and a delay amount setting section 28. Like components to those shown in FIG. 1 will be denoted by like reference numerals and will not be further described below.

The transmit signal transmitted from the transmitting station 13 is received by the antenna 25 of the wireless station 14, and it is subjected to a frequency conversion in the RF section 24 and then inputted to the demodulation section 26. The demodulation section 26 demodulates the input signal to obtain transmit data.

When detecting the UW contained in the transmit data outputted from the demodulation section 26, the UW detection section 27 produces a UW detection signal and passes it to the transmission timing control section 23.

The delay amount setting section 28 selects the delay amount from among a plurality of delay amount candidate values, and passes it to the transmission timing control section 23. It is assumed in the following description that there are two delay amount candidate values of T1 and T2. The delay amount setting section 28 selects the delay amount to be either T1 or T2, as determined in advance for each wireless station.

The transmission timing control section 23 determines the reference timing to be the timing at which the UW detection signal is received. Note that the reference timing may alternatively be a timing after passage of a predetermined amount of time since the UW detection signal is received. The transmission timing control section 23 controls the modulated signal transmission timing based on the reference timing and the delay amount set by the delay amount setting section 28. The method of determining the transmission timing based on the reference timing and the delay amount is similar to that of the first embodiment, and will not be further described below.

Figure 20:
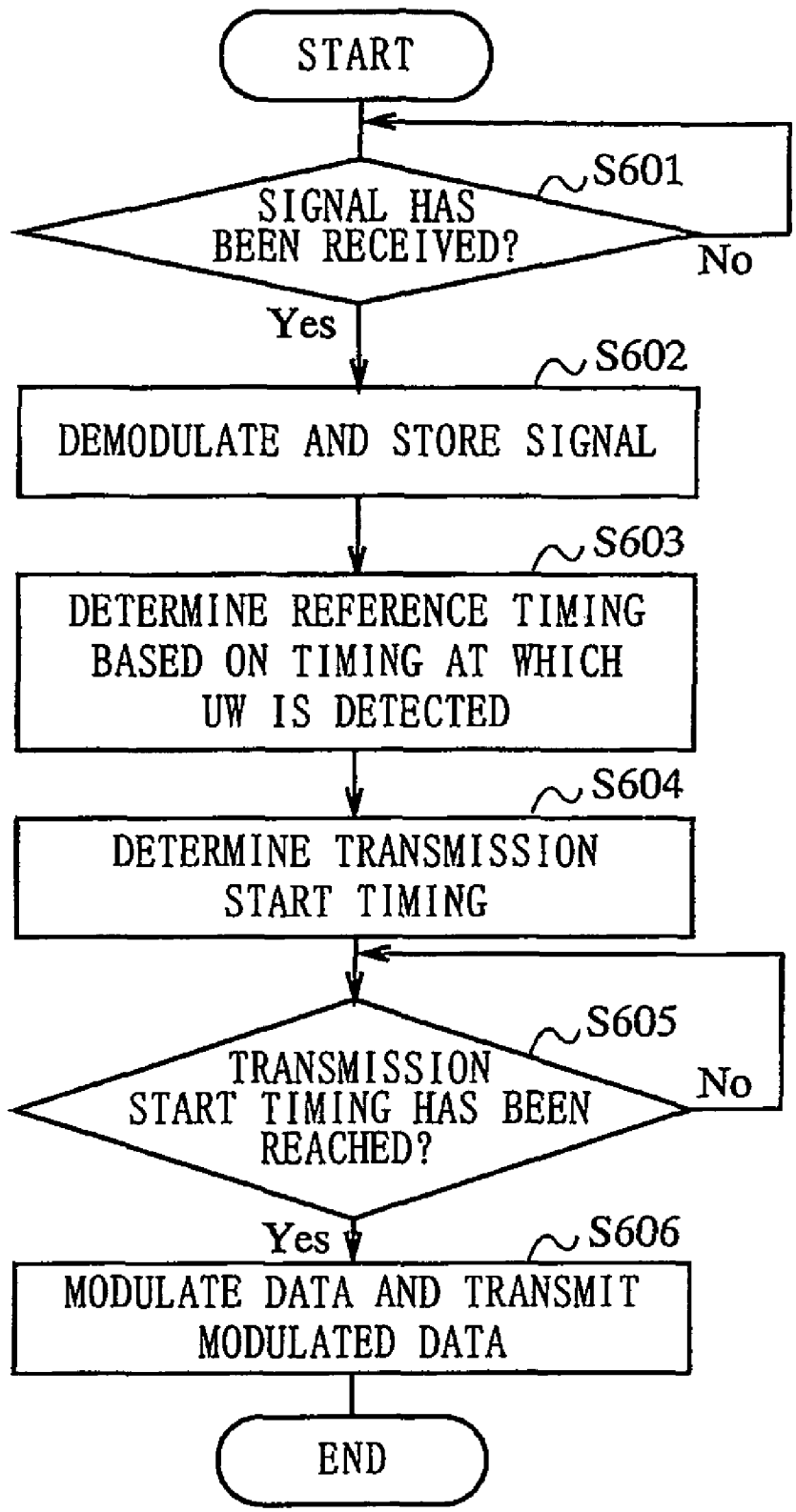
FIG. 20 is a flow chart showing an operation of the wireless station 14.

FIG. 20 is a flow chart showing an operation of the wireless station 14 having such a configuration. First, the wireless station 14 determines whether or not a signal transmitted from the transmitting station 13 has been received (step S601). When the signal has been received, the demodulation section 26 demodulates the signal outputted from the RF section 24 to obtain demodulated data (step S602). The data storage section 22 stores, as transmit data, the data demodulated by the demodulation section 26.

The UW detection section 27 detects the UW from the demodulated data to produce a UW detection signal, and passes it to the transmission timing control section 23. The transmission timing control section 23 determines the reference timing to be the timing at which the UW detection signal is received (step S603), and determines the transmission start timing based on the reference timing and the delay amount (step S604).

When the transmission start timing is reached (Yes in step S605), the transmission timing control section 23 passes the transmission start signal to the modulation section 21. The transmit data is modulated by the modulation section 21, and then transmitted to the receiving station 12 via the RF section 24 and the antenna 25 (step S606).

Figure 21:
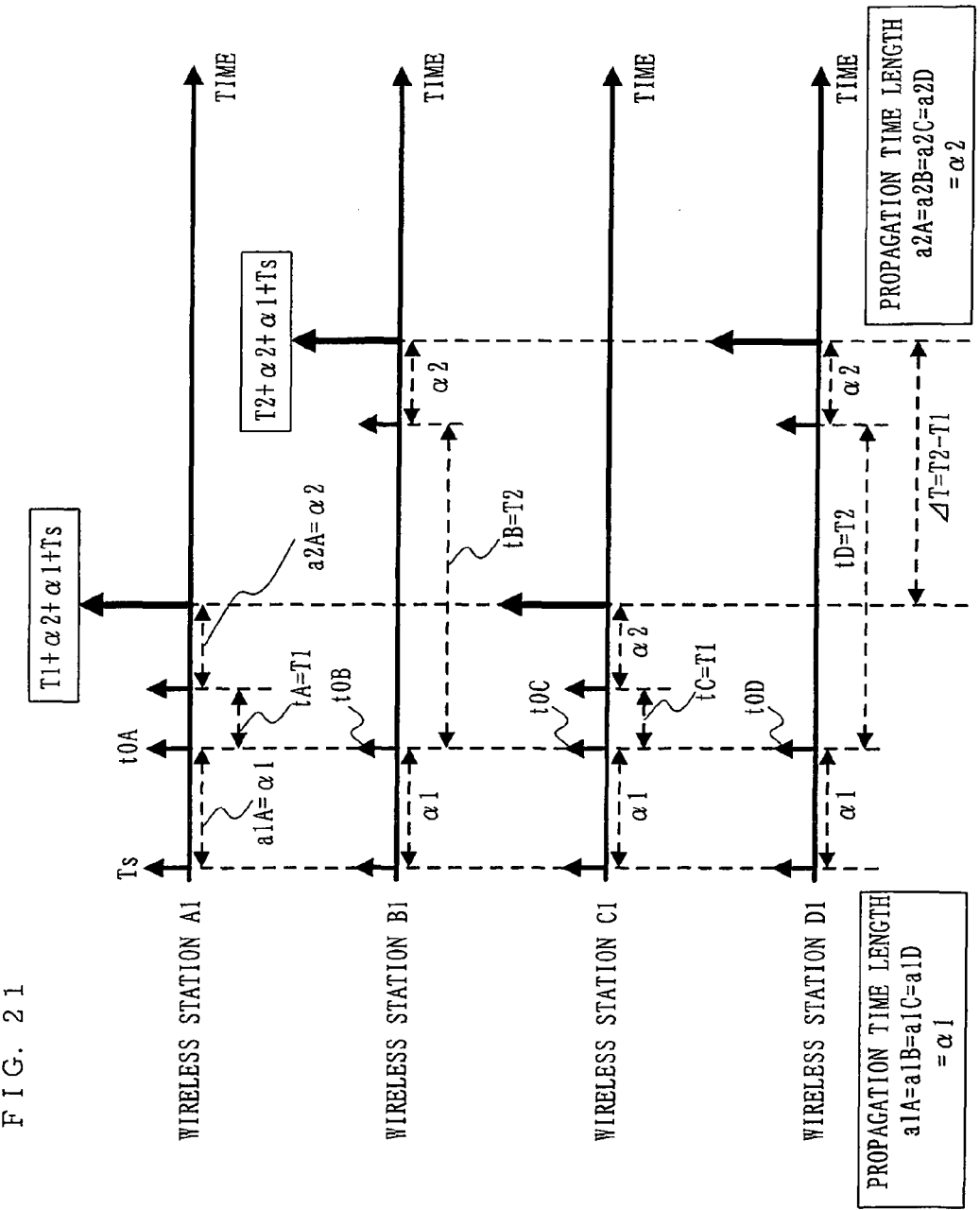
FIG. 21 is a timing chart showing the wireless stations A1 to D1 transmitting signals A1 to D1.

FIG. 21 is a timing chart showing the wireless stations A1 to D1 transmitting signals A1 to D1. First, the transmitting station 13 transmits a signal to the surrounding wireless stations A1 to D1 at a predetermined timing Ts. The wireless stations A1 to D1 receive the signal from the transmitting station 13 at the following timings.

Wireless station A1: Ts+a1A
Wireless station B1: Ts+a1B
Wireless station C1: Ts+a1C
Wireless station D1: Ts+a1D Herein, a1A to a1D are the propagation time lengths between the transmitting station 13 and the wireless stations A1 to D1, respectively.

It is assumed herein that the propagation time lengths a1A to a1D are all negligible or equal to one another. Moreover, $\alpha 1$ denotes the amount of time obtained by adding together the propagation time length (one of a1A to a1D) and the amount of time required before the UW detection signal is outputted in the wireless station (corresponding one of A1 to D1). Therefore, in the wireless stations A1 to D1, the UW detection signal is generated at the same timing (Ts+$\alpha 1$).

Then, the wireless stations A1 to D1 determines the reference timing t0 to be the UW detection timing (Ts+$\alpha 1$) indicated by the UW detection signal. Then, the wireless stations A1 to D1 transmit signals while adding the delay amounts tA to tD, respectively, to the reference timing t0. For example, the wireless station A1 transmits a signal after passage of tA since the reference timing t0. As in the first embodiment, each of the delay amounts tA to tD is selected from among the delay amount candidate values T1 and T2 so that the wireless stations A1 to D1 transmit signals at two separate transmission timings. T1 and T2 are determined so as to satisfy $Tmin \leq T2-T1 \leq Tmax$.

As an example, a case where tA=tC=T1 and tB=tD=T2 will be described below. The wireless stations A1 to D1 transmit signals either at (T1+$\alpha 1$+Ts) or (T2+$\alpha 1$+Ts).

The receiving station 12 receives the signals A1 to D1 transmitted from the wireless stations A1 to D1. It is assumed herein that the propagation time lengths a2A to a2D between the receiving station 12 and the wireless stations A1 to D1, respectively, are negligible or equal to one another, and are denoted as $\alpha 2$. Thus, the receiving station 12 receives the signals A1 to D1 at either (T1+$\alpha 2$+$\alpha 1$+Ts) or (T2+$\alpha 2$+$\alpha 1$+Ts). There is a time difference (T2-T1) between the two timings. Thus, it is possible to exert a path diversity effect. Therefore, it is possible to improve the transmission characteristics.

As described above, according to the present embodiment, a signal is transmitted from the transmitting station to the receiving station via a plurality of wireless stations, where a predetermined delay amount is given to the signal at each wireless station. Therefore, the number of signal-receiving timings at which the receiving station receives arriving waves can be made equal to the maximum number of effective branches. Moreover, each wireless station determines the reference timing to be the timing at which the UW is detected. Thus, it is no necessary to have a reference timing signal stored in advance.

Note that while the UW detection signal is used as the reference timing signal in the present embodiment, it is not limited to any particular signal as long as the signal indicates that a signal has been received from the transmitting station, and may be a timing signal that indicates a frame has been received completely. For example, in a case where a CRC (cyclic redundancy check) code, used for checking whether the transmit data is received normally, is added at the end of a frame, the determination output signal outputted based on the code may be used as the reference timing signal. Then, if it is determined at a wireless station that a signal from the transmitting station has been received in error, it is possible to prevent the signal from being transmitted to the receiving station. As a result, the receiving station can only receive correct transmit data.

Fourth Embodiment

A wireless transmission system according to a fourth embodiment of the present invention differs from that of the third embodiment in that the transmitting station transmits the same signal twice.

Figure 22:
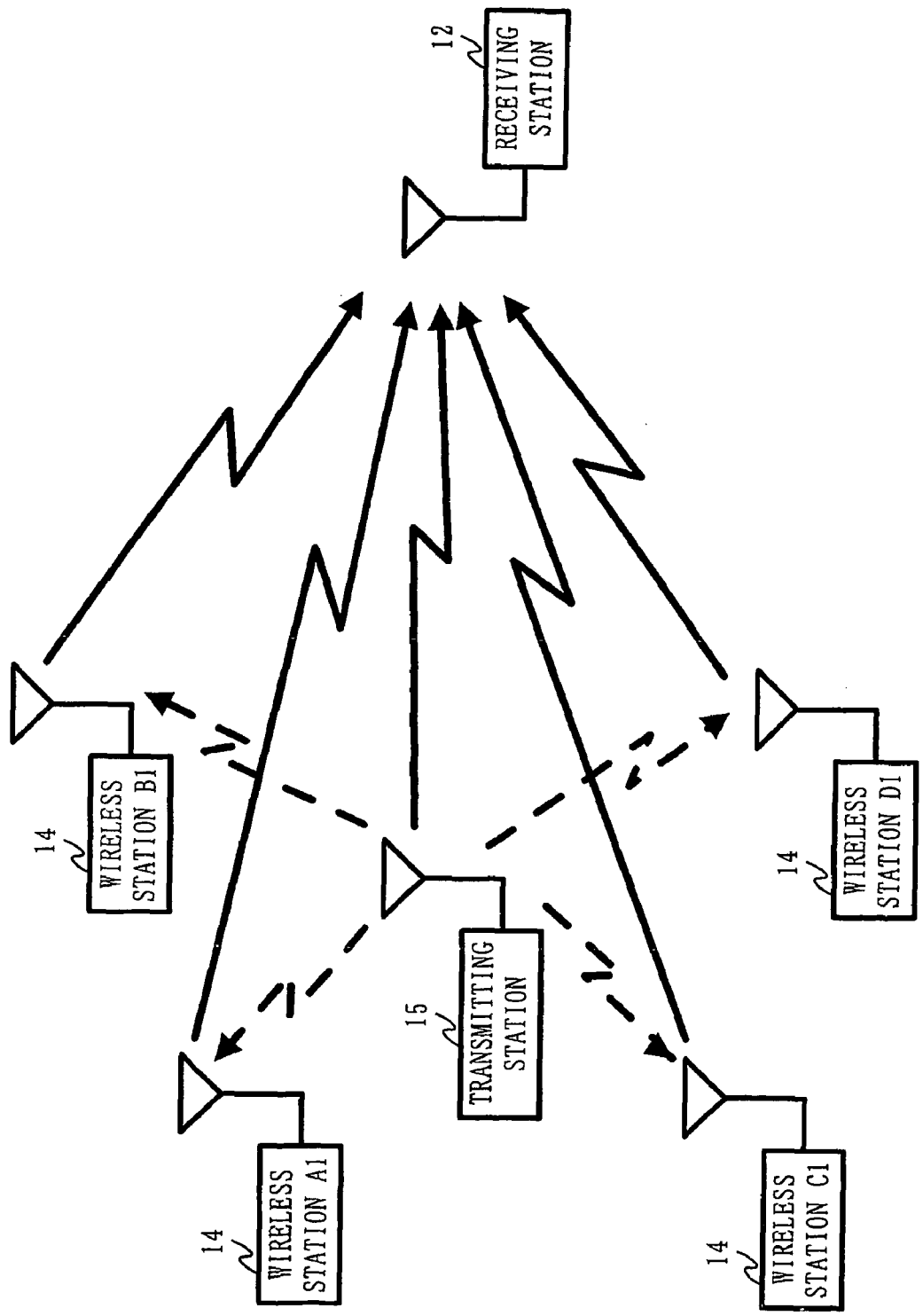
FIG. 22 shows a configuration of a wireless transmission system according to a fourth embodiment of the present invention.

FIG. 22 shows a configuration of the wireless transmission system according to the fourth embodiment of the present invention. The configuration of the wireless stations 14 (the wireless stations A1 to D1) and that of the receiving station 12 are similar to those of the third embodiment, and will not be further described below while using the same reference numerals as those used in FIG. 17. Moreover, the frame structure of signals transmitted from a transmitting station 15 and the wireless station 14 is similar to that of the third embodiment (see FIG. 18). Moreover, the operation of the wireless station 14 and that of the receiving station 12 are similar to those of the third embodiment. Therefore, the following description will focus on the operation of the transmitting station.

The transmitting station 15 transmits stored transmit data twice. The transmitting station 15 transmits the signal to the wireless stations 14 in the first transmission and to the receiving station 12 in the second transmission. The transmitting station 15 transmits the signal with a predetermined delay amount so that the signal transmitted in the second transmission arrives at the receiving station 12 at the same timing as any of the signals transmitted from the wireless stations 14.

Figure 23:
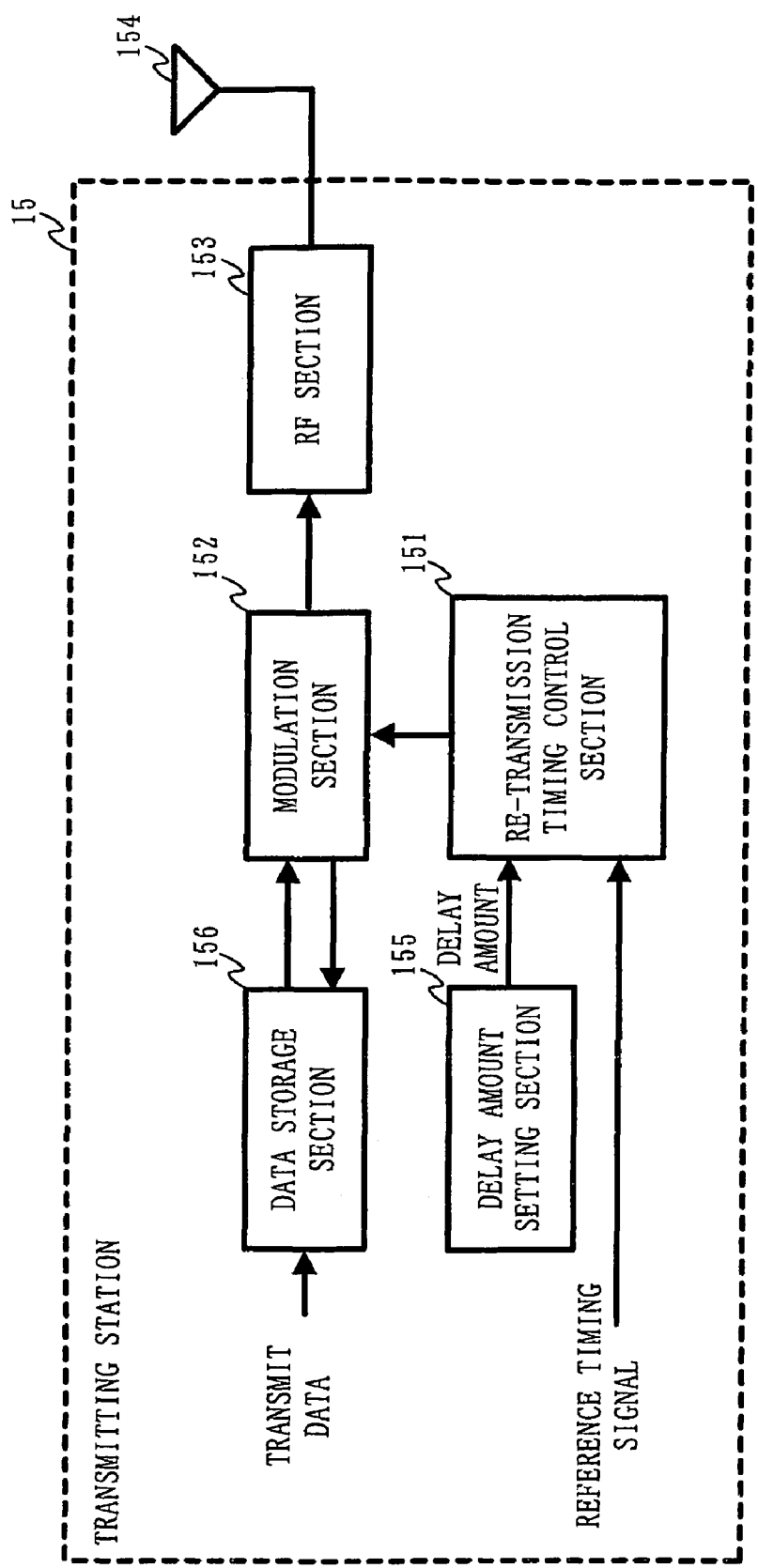
FIG. 23 is a block diagram showing a configuration of a transmitting station 15 shown in FIG. 21.

FIG. 23 is a block diagram showing a configuration of the transmitting station 15 shown in FIG. 22. Referring to FIG. 22, the transmitting station 15 includes a re-transmission timing control section 151, a modulation section 152, an RF section 153, an antenna 154, a delay amount setting section 155, and a data storage section 156.

The configurations of the modulation section 152, the RF section 153, the antenna 154 and the data storage section 156 are similar to those of the wireless station 14 shown in FIG. 19, and will not be further described below.

The delay amount setting section 155 selects the delay amount from among a plurality of delay amount candidate values, and passes it to the re-transmission timing control section 151. It is assumed in the following description that there are two delay amount candidate values of T1 and T2.

The re-transmission timing control section 151 controls the re-transmission timing at which a signal is transmitted for the second time after the signal is once transmitted. The re-transmission timing control section 151 determines the re-transmission start timing based on the reference timing indicated by the reference timing signal and the delay amount received from the delay amount setting section 155. Note that this is a method of calculating the re-transmission start timing in a case where the propagation time length between the transmitting station 15 and the wireless station 14 is negligible. If the propagation time length between the transmitting station 15 and the wireless station 14 is larger, the re-transmission start timing can be obtained by adding the delay amount and the propagation time length to the reference timing. Then, when the re-transmission start timing is reached, the re-transmission timing control section 151 produces a re-transmission start signal and passes it to the modulation section 152.

Figure 24:
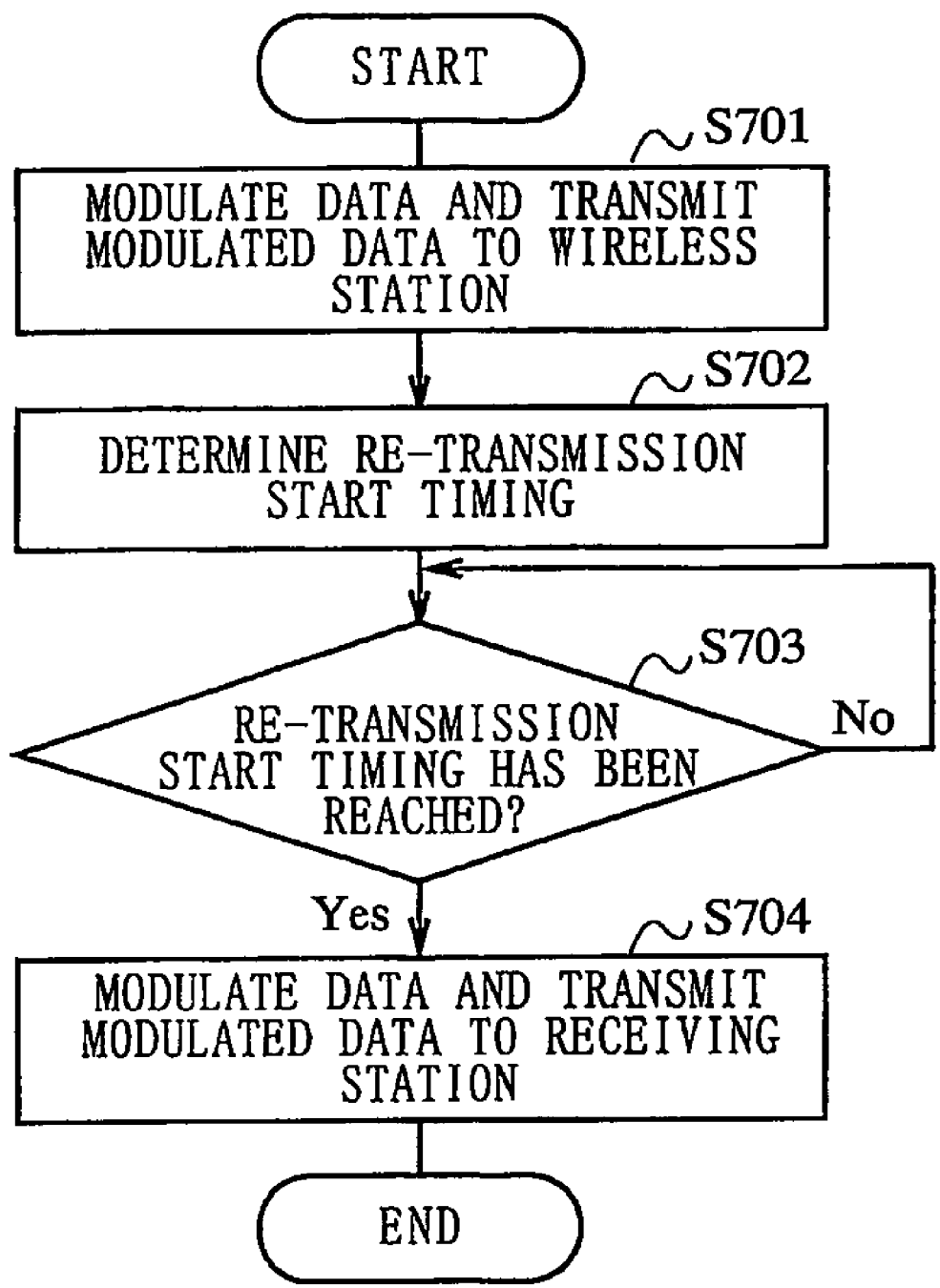
FIG. 24 is a flow chart showing an operation of the transmitting station 15.

FIG. 24 is a flow chart showing an operation of the transmitting station 15 having such a configuration. First, the transmitting station 15 modulates data and transmits it to the wireless stations 14 (step S701). Then, in the transmitting station 15, the re-transmission timing control section 151 determines the re-transmission start timing based on the reference timing and the delay amount setting section 155 (step S702). Specifically, the re-transmission timing control section 151 determines the re-transmission start timing to be a timing obtained by delaying the reference timing by the delay amount selected by the delay amount setting section 155.

Then, the re-transmission timing control section 151 determines whether or not the re-transmission start timing has been reached (step S703), and if so, the re-transmission timing control section 151 produces the re-transmission start signal and passes it to the modulation section 152. The transmit data is modulated by the modulation section 152, and then transmitted to the receiving station 12 via the RF section 153 and the antenna 154 (step S704).

Figure 25:
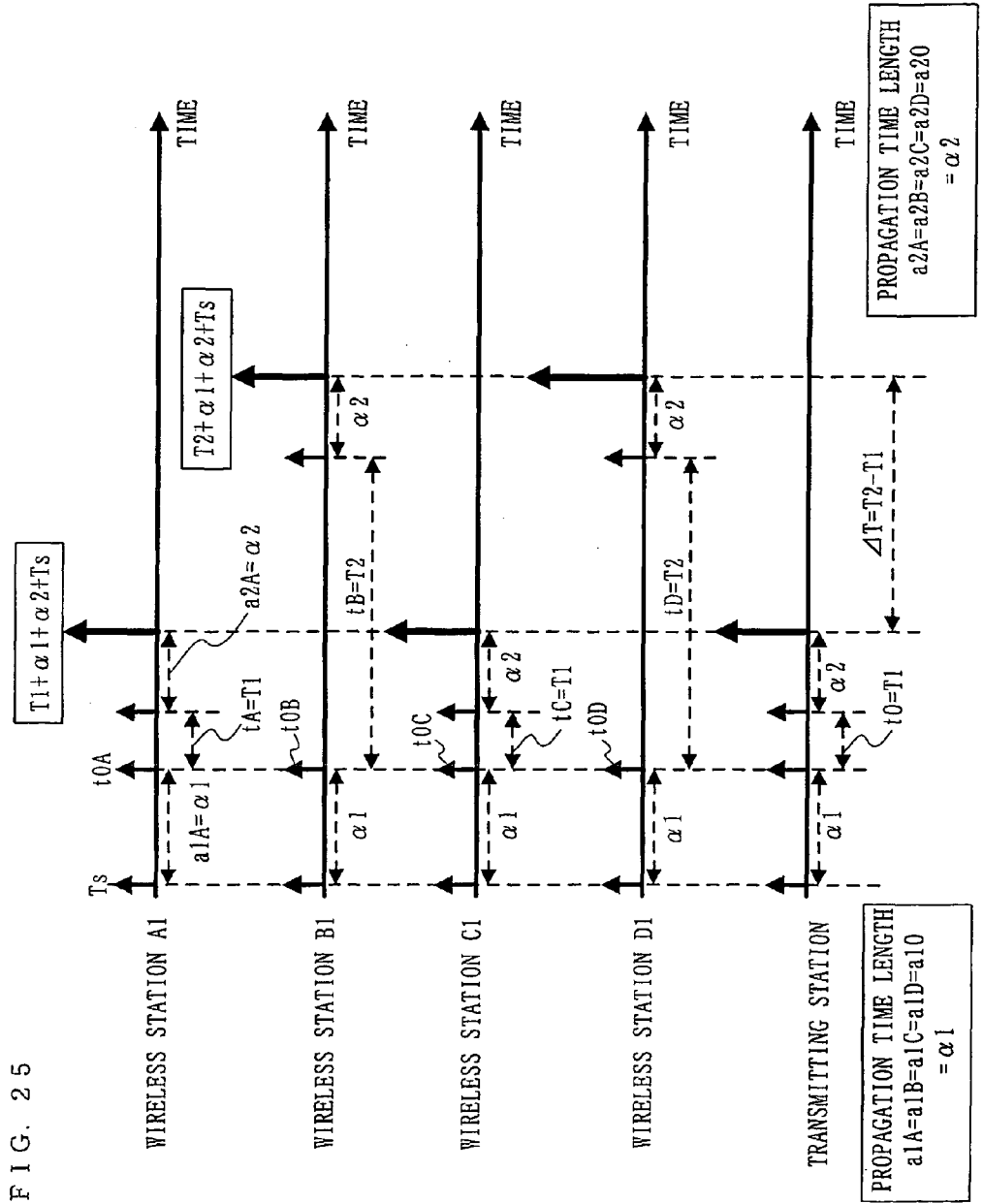
FIG. 25 is a timing diagram showing signals transmitted by the transmitting station 15 and the wireless stations A1 to D1 of the fourth embodiment.

FIG. 25 is a timing diagram showing signals transmitted by the transmitting station 15 and the wireless stations A1 to D1 in the present embodiment. FIG. 25 shows the timing of the signal transmitted by the transmitting station 15, in addition to the timings of the modulated signals transmitted by the wireless stations A1 to D1 shown in FIG. 22.

First, when the transmitting station 15 transmits a signal at a predetermined timing Ts, the wireless stations A1 to D1 receive the signal from the transmitting station 15 at the following timings:

Wireless station A1: Ts+a1A
Wireless station B1: Ts+a1B
Wireless station C1: Ts+a1C
Wireless station D1: Ts+a1D Herein, it is assumed that the propagation time lengths a1A to a1D between the transmitting station 15 and the wireless stations A1 to D1, respectively, are all negligible or equal to one another. Moreover, $\alpha 1$ denotes the amount of time obtained by adding together the propagation time length (one of a1A to a1D) and the amount of time required before the UW detection signal is outputted in the wireless station (corresponding one of A1 to D1). Therefore, the signal-receiving timing at which the wireless stations A1 to D1 receive the signal transmitted from the transmitting station 15 can be expressed as (Ts+$\alpha 1$). Then, the wireless stations A1 to D1 transmit signals while adding the delay amounts tA to tD, respectively, to the reference timing t0 being the signal-receiving timing (Ts+$\alpha 1$).

If the wireless stations A1 to D1 give delay amounts of tA=tC=T1 and tB=tD=T2 to the signals A1 to D1, the wireless stations A1 and C1 transmit the signals A1 and C1, respectively, at (T1+$\alpha 1$+Ts). The wireless stations B1 and D1 transmit the signals B1 and D1, respectively, at (T2+$\alpha 1$+Ts). Note that it is assumed that the propagation time lengths a2A to a2D between the receiving station 12 and the wireless stations A1 to D1, respectively, are all negligible or equal to one another, and are denoted as a2.

Moreover, the transmitting station 15 transmits the signal while giving a delay amount tO based on the reference timing Ts. Then, the transmitting station 15 re-transmits the signal. When the transmitting station 15 transmits the signal while giving the delay amount, the delay amount selected from among the delay amount candidate values T1 and T2 is used as tO. In FIG. 25, the transmitting station 15 selects T1 from among the delay amount candidate values, and transmits the signal to the receiving station 12 while giving a delay amount of tO=T1.

The receiving station 12 receives signals transmitted from the wireless stations 14 and the transmitting station 15. The receiving station 12 receives these five signals at one of two timings (T1+$\alpha 2$+$\alpha 1$+Ts) and (T2+$\alpha 2$+$\alpha 1$+Ts). There is a time difference (T2−T1) between the two timings. Therefore, the number of signal-receiving timings is two as is the maximum number of effective branches, where by it is possible to exert a path diversity effect. Thus, it is possible to improve the transmission characteristics in the wireless transmission system.

As described above, according to the present embodiment, after the transmitting station transmits a signal to the wireless stations, the transmitting station transmits the same signal to the receiving station while giving a predetermined delay amount. This increases the number of signals received by the receiving station, whereby it is possible to stabilize the signal reception level. Moreover, the signal transmitted from the transmitting station in the second transmission arrives at the receiving station 12 at the same timing as at least one of the signals transmitted from the wireless stations 14. Thus, the number of signal-receiving timings can be made less than or equal to the maximum number of effective branches, thereby exerting a maximum path diversity effect.

Note that in the third and fourth embodiments, the transmitting station selects the delay amount candidate value T1 or T2 as determined in advance. Alternatively, each wireless station may randomly select one of the delay amount candidate values to be the delay amount.

Moreover, in the third and fourth embodiments, the reference timing t0 for the wireless stations is the timing at which the wireless stations 14 receive the signal from the transmitting station. Alternatively the reference timing t0 used by the wireless stations may be the time information contained in a GPS signal or the timing obtained from a radio-controlled clock, which is shared by the transmitting station and the wireless stations.

Fifth Embodiment

A wireless transmission system according to a fifth embodiment of the present invention differs from that of the fourth embodiment in that the transmitting station and each wireless station are connected to each other via a wired transmission path.

Figure 26:
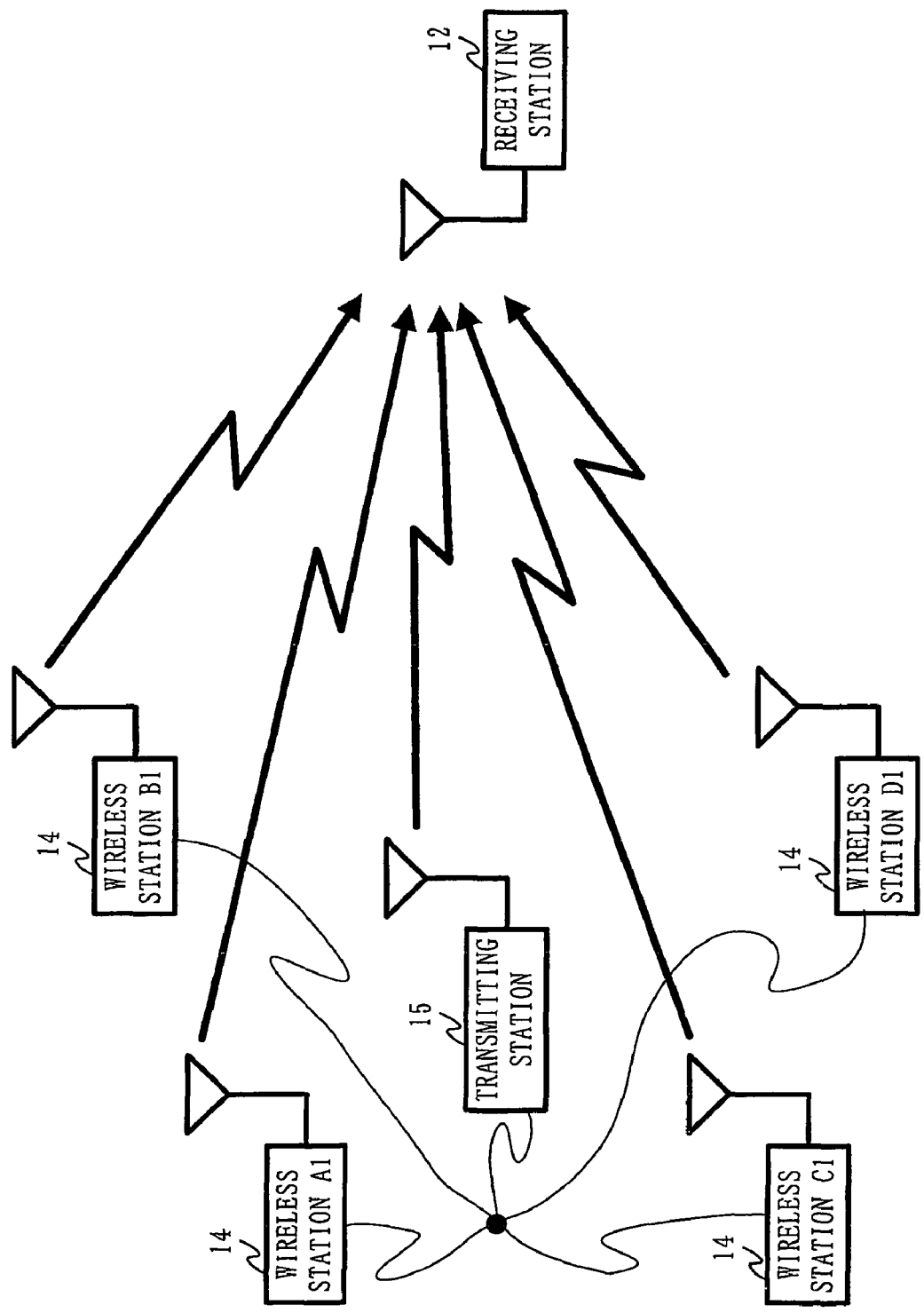
FIG. 26 shows a configuration of a wireless transmission system according to a fifth embodiment of the present invention.

FIG. 26 shows a configuration of the wireless transmission system according to the fifth embodiment of the present invention. The wireless transmission system shown in FIG. 26 differs from that of the fourth embodiment shown in FIG. 22 in that the transmitting station 15 is connected to each of the wireless stations A1 to D1 via a wired transmission path.

Otherwise, the configuration is similar to that of the third embodiment, and will not be further described below while using the same reference numerals as those used in FIG. 22. Moreover, the signal transmitted from the transmitting station 15 and the wireless stations 14 is similar to that of the third embodiment (see FIG. 18).

Moreover, the timings of the signals transmitted from the transmitting station 15 and the wireless stations 14 are similar to those of the fourth embodiment (see FIG. 25).

As described above, according to the present embodiment, even if the transmitting station and each wireless station are connected to each other via a wired transmission path, it is possible to obtain a maximum path diversity effect at the receiving station.

Sixth Embodiment

A wireless transmission system according to a sixth embodiment of the present invention differs from that of the third embodiment in that the transmitting station and each wireless station is connected to each other via a wired transmission path, and that the transmitting station, instead of the wireless stations, controls the delay amount.

Figure 27:
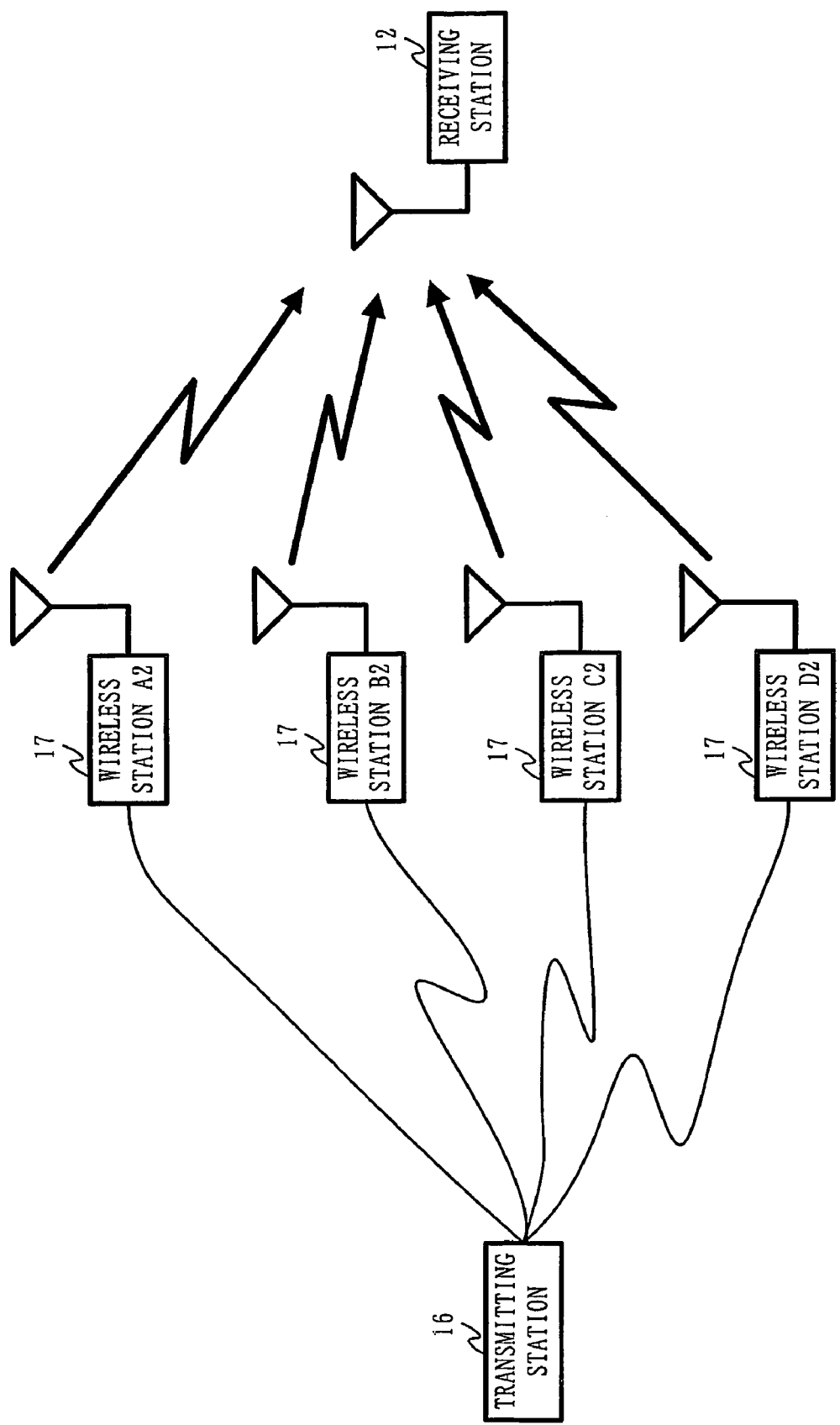
FIG. 27 shows a configuration of a wireless transmission system according to a sixth embodiment of the present invention.

FIG. 27 shows a configuration of the wireless transmission system according to the sixth embodiment of the present invention. Referring to FIG. 27, the wireless transmission system includes a transmitting station 16, a plurality of wireless stations 17, and the receiving station 12. The transmitting station 16 is connected to wireless stations 17 via wired transmission paths, and the wireless stations 17 are connected to the receiving station 12 via a wireless connection. In the present embodiment, there are four wireless stations 17 in the wireless transmission system. The four wireless stations 17 will be referred to as wireless stations A2 to D2 to distinguish them from one another. Where the four wireless stations A2 to D2 do not need to be distinguished from one another, they will be referred to as the wireless stations 17. Moreover, the configuration of the receiving station 12 is similar to that of the first embodiment, and will not be further described below.

The transmitting station 16 specifies the delay amount that should be given to a signal transmitted by the wireless station 17. The wireless station 17 transmits a signal while giving it the delay amount specified by the transmitting station 16.

Figure 28:
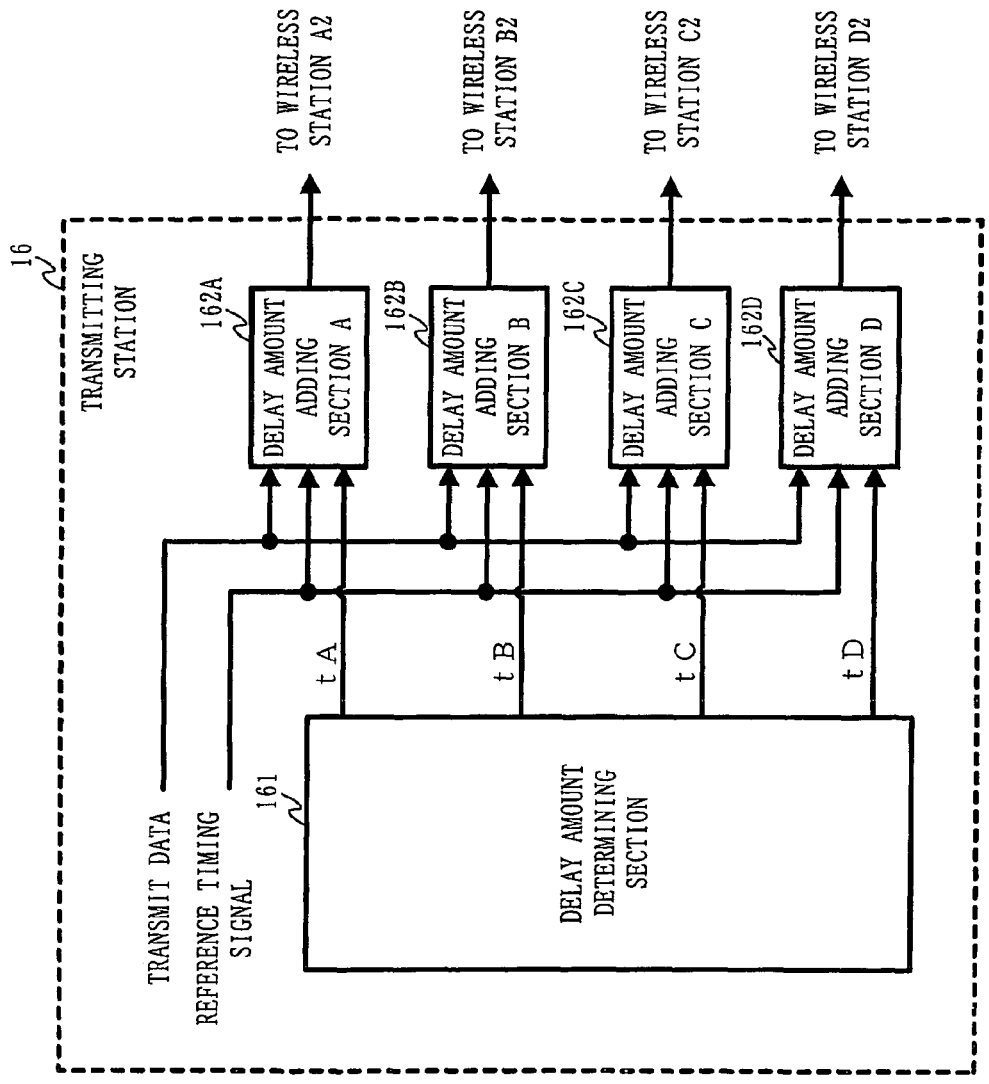
FIG. 28 is a block diagram showing a configuration of a transmitting station 16.

FIG. 28 is a block diagram showing a configuration of the transmitting station 16. Referring to FIG. 28, the transmitting station 16 includes a delay amount determining section 161, and four delay amount adding sections 162A to 162D. Note that the modulation section, the RF section and the antenna section are not shown in the figure.

The delay amount determining section 161 determines each of the delay amounts tA to tD that should be given to signals transmitted to the wireless stations A2 to D2, respectively, by selecting one of a plurality of candidate values (e.g., T1 and T2). The number of candidate values is equal to the maximum number of effective branches that are allowed in the wireless transmission system. The delay amount determining section 161 passes the determined delay amounts tA to tD to the delay amount adding sections 162A to 162D, respectively. Note that the delay amount selected by the delay amount determining section 161 may be determined in advance or may be selected randomly. Since the wireless stations are connected to the transmitting station, it is preferred that the transmitting station determines the delay amounts for the wireless stations so that the delay amounts are equally distributed among the wireless stations.

The delay amount adding sections 162A to 162D add delay amount information, indicating the determined delay amounts tA to tD, at the end of transmit data being in a frame format as shown in FIG. 18. Thus, by adding the delay amount information to each signal, the transmitting station 16 specifies the delay amount that should be given to the signal transmitted by the wireless station 17.

Figure 29:
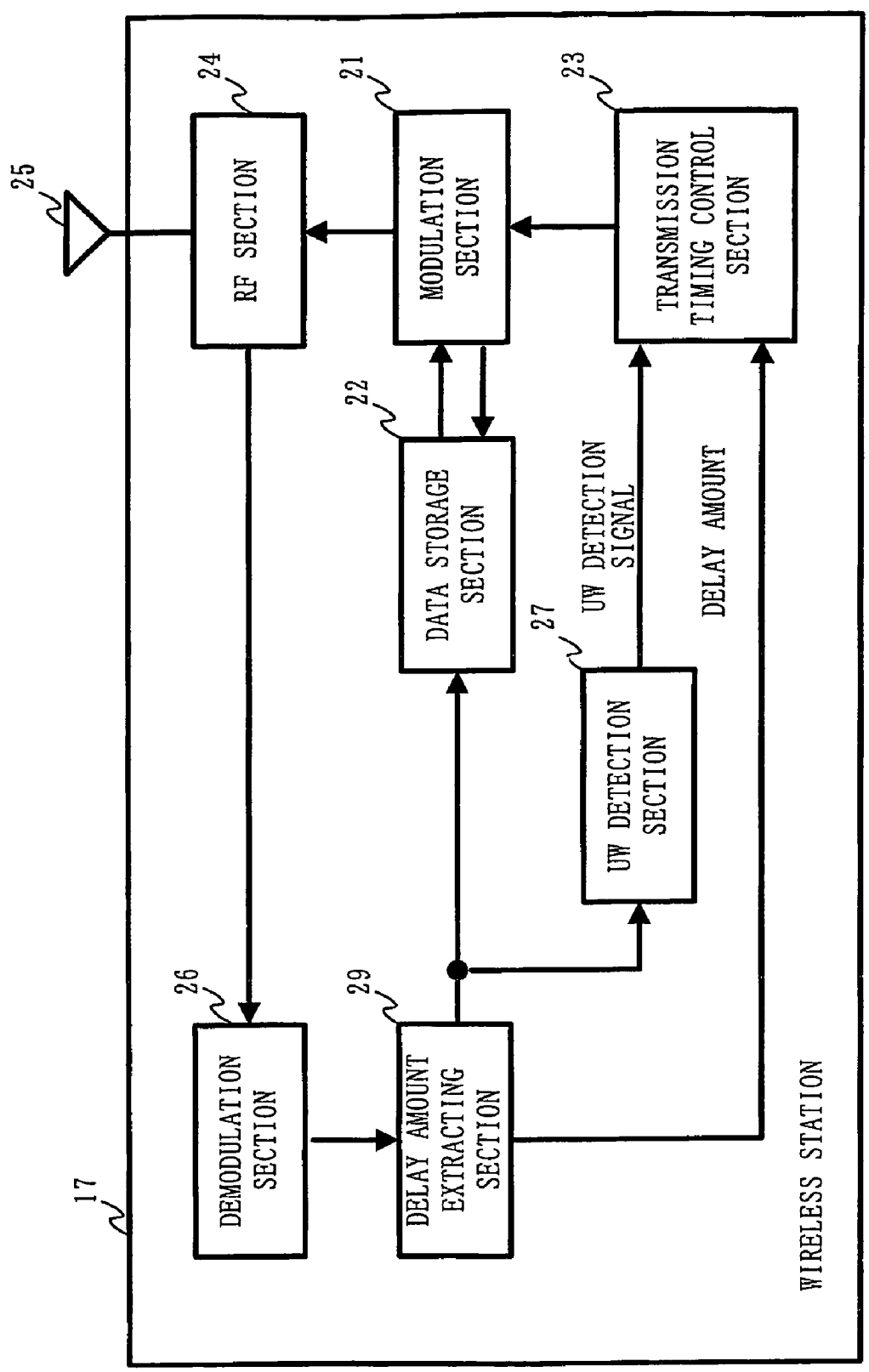
FIG. 29 is a block diagram showing a configuration of a wireless station 17.

FIG. 29 is a block diagram showing a configuration of the wireless station 17. The wireless station 17 shown in FIG. 29 is similar to the wireless station 14 of the third embodiment shown in FIG. 19 except that the delay amount setting section 28 is replaced by a delay amount extracting section 29. Like components to those shown in FIG. 19 will be denoted by like reference numerals and will not be further described below.

The delay amount extracting section 29 extracts the delay amount from demodulated data and passes it to the transmission timing control section 23 while passing the transmit data, excluding the extracted delay amount, to the data storage section 22. The transmission timing control section 23 determines the transmission timing by adding the delay amount to the reference timing. The timings at which signals are transmitted by the transmitting station 16 and the wireless station 17 are similar to those of the third embodiment (see FIG. 21).

Figure 30:
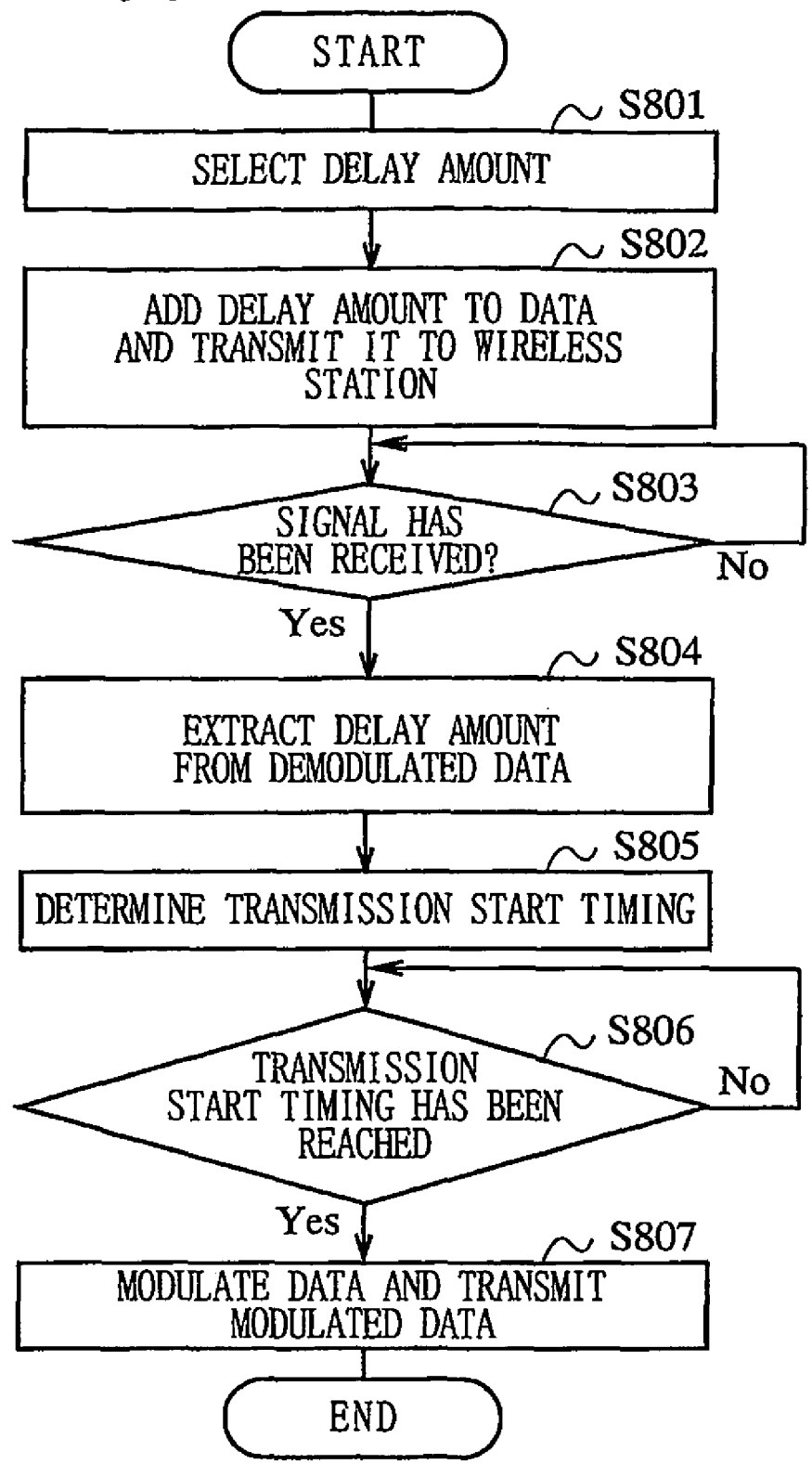
FIG. 30 is a flow chart showing an operation of the transmitting station 16 and the wireless station 17.

FIG. 30 is a flow chart showing an operation of the transmitting station 16 and the wireless station 17 having such a configuration. First, in the transmitting station 16, the delay amount determining section 161 determines each of the delay amounts tA to tD that should be given to signals transmitted to the wireless stations A2 to D2, respectively, by selecting one of a plurality of candidate values (step S801). The delay amount determining section 161 passes the determined delay amounts tA to tD to the delay amount adding sections 162A to 162D, respectively.

Then, the transmitting station 16 transmits data while adding the delay amount (step S802). Each of the delay amount adding sections 162A to 162D adds a value indicating the corresponding one of the determined delay amounts tA to tD at the end of transmit data being in a frame format, and passes it to the modulation section (not shown). The signal modulated by the modulation section is transmitted to the corresponding one of the wireless stations A2 to D2 via the RF section and the antenna.

The wireless station 17 determines whether or not a signal transmitted from the transmitting station 16 has been received (step S803). If the signal has been received correctly, the demodulation section 26 demodulates the signal outputted from the RF section 24 to obtain demodulated data.

The transmission timing control section 23 extracts a delay amount from the demodulated data (step S804). Then, the transmission timing control section 23 adds the delay amount to the reference timing to determine the transmission timing (step S805).

When the transmission start timing is reached (Yes in step S806), the transmission timing control section 23 passes the transmission start signal to the modulation section 21. The transmit data is modulated by the modulation section 21, and then transmitted to the receiving station 12 via the RF section 24 and the antenna 25 (step S807).

As described above, according to the present embodiment, the transmitting station can control the timing of the signal transmitted by each wireless station.

Variation of Sixth Embodiment

In the sixth embodiment, the transmitting station specifies the delay amount that should be given to a signal by the wireless station. In contrast, according to this variation, the transmitting station gives a predetermined delay amount to a signal transmitted to each wireless station before the signal is transmitted. The transmitting station of this variation will be referred to as a transmitting station 18 distinguished from the transmitting station 16 of the sixth embodiment. Moreover, the wireless station of this variation will be referred to as a wireless station 19 distinguished from the wireless station 17 of the sixth embodiment.

The configuration of the transmitting station 18 is similar to that of the wireless station 11 of the first embodiment (see FIG. 1). In the transmitting station 18, a delay amount to be given to each wireless station is determined in advance. The transmission timing control section 23 determines the transmission start timing based on the delay amount to be given to the signal transmitted to each wireless station and the reference timing. When the transmission start timing is reached, the transmission start signal is outputted to start the signal transmission. Moreover, the operation of the transmitting station 18 is similar to that of the wireless station of the first embodiment except that the transmitting station 18 transmits signals to a plurality of wireless stations, and will not be further described below (see FIG. 2).

The configuration of the wireless station 19 is not limited to any particular configuration as long as a signal transmitted from the transmitting station 18 can be transmitted to the receiving station 12. For example, the wireless station 19 may be of any configuration including an antenna, an RF section, a modulation section and a demodulation section.

Figure 31:
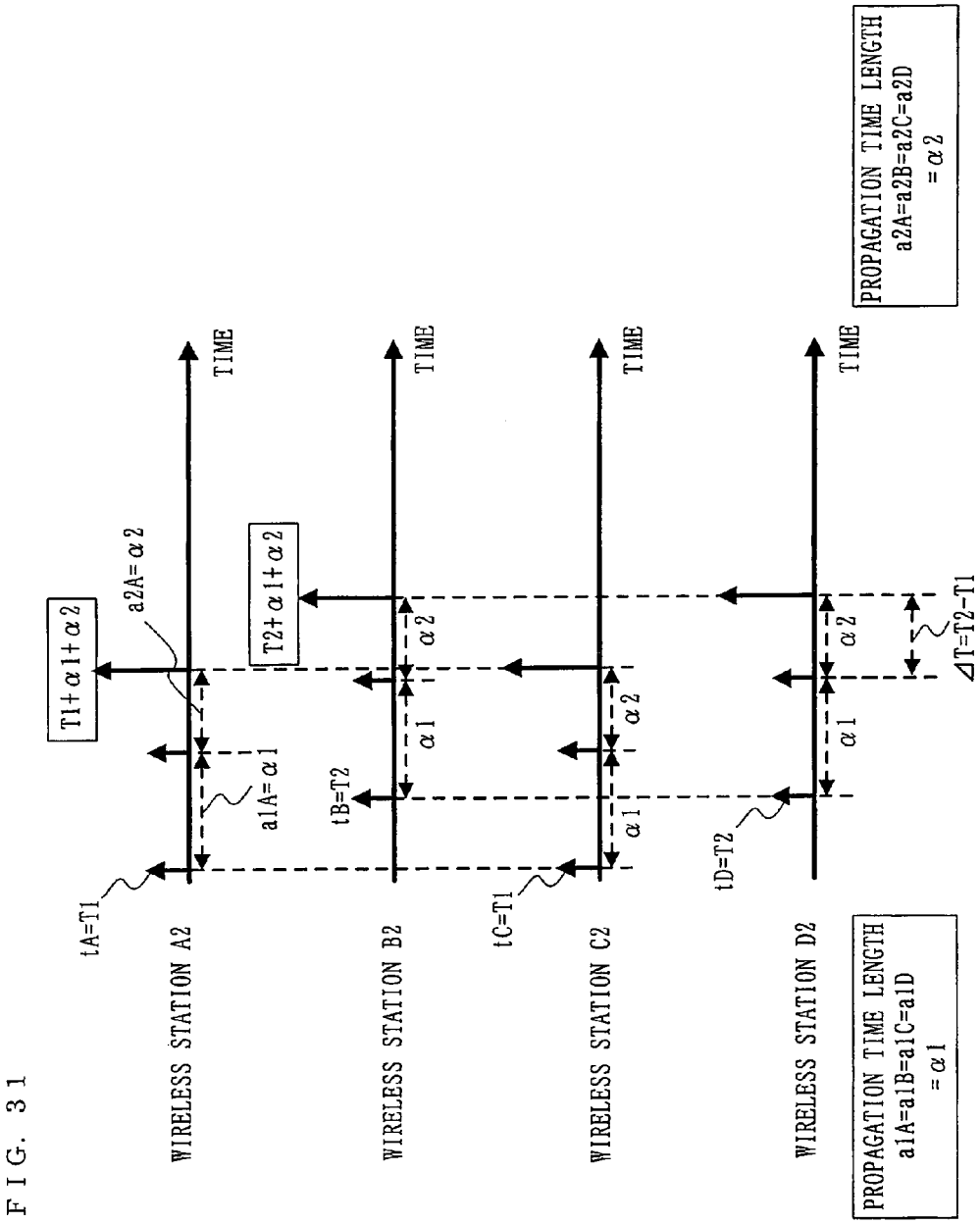
FIG. 31 is a timing diagram showing signals transmitted by wireless stations 19 according to a variation of the sixth embodiment.

FIG. 31 is a timing diagram showing signals transmitted by the wireless stations 19 according to the variation of the sixth embodiment. Wherever the four wireless stations 19 need to be distinguished from one another, they will be referred to as wireless stations A2 to D2.

The delay amounts tA and tC given by the transmitting station 18 to signals transmitted to the wireless stations A2 and C2 are T1. The delay amounts tB and tD given by the transmitting station 18 to signals transmitted to the wireless stations B2 and D2 is T2. The transmitting station 18 transmits a signal to each wireless station while giving the delay amount T1 or T2 to a predetermined timing.

It is assumed herein that the propagation time lengths a1A to a1D between the transmitting station and the wireless stations A2 to D2, respectively, are all negligible or equal to one another, and are denoted as α1. Therefore, the timing at which the wireless stations A2 and C2 receive a signal from the transmitting station 18 is (T1+α1). The timing at which the wireless stations B2 and D2 receive a signal from the transmitting station 18 is (T2+α1).

It is assumed that the difference between the propagation time lengths a2A to a2D between the receiving station 12 and the wireless stations A2 to D2, respectively, is negligible or the propagation time lengths a2A to a2D are equal to one another, and are denoted as α2. Therefore, the receiving station 12 receive the signals A2 to D2 either at (T1+α1+α2) or (T2+α1+α2). There is a time difference (T2−T1) between the two timings. Thus, it is possible to exert a path diversity effect.

As described above, according to this variation, the transmitting station gives a predetermined delay amount to a signal transmitted to each wireless station before the signal is transmitted. Therefore, each wireless station does not have to give a delay amount to the signal transmitted therefrom, whereby the wireless station can be realized with a simple configuration.

Note that in the present embodiment, the transmitting station transmits a transmit signal after giving it a delay amount, which is selected for each transmit signal. The timing at which each wireless station receives a signal may be controlled by adjusting the length of the wired transmission path between the transmitting station and the wireless station.

Note that while the number of wireless stations in the wireless transmission system is four in the first to sixth embodiments, the number of wireless stations may alternatively be two, three, five or more.

The first to sixth embodiments have been described above assuming that the distances between the wireless stations and the receiving station are all negligible or equal to one another. The following embodiments will be described with respect to a case where the distances between the wireless stations and the receiving station are significantly different from one another.

Seventh Embodiment

Figure 32:
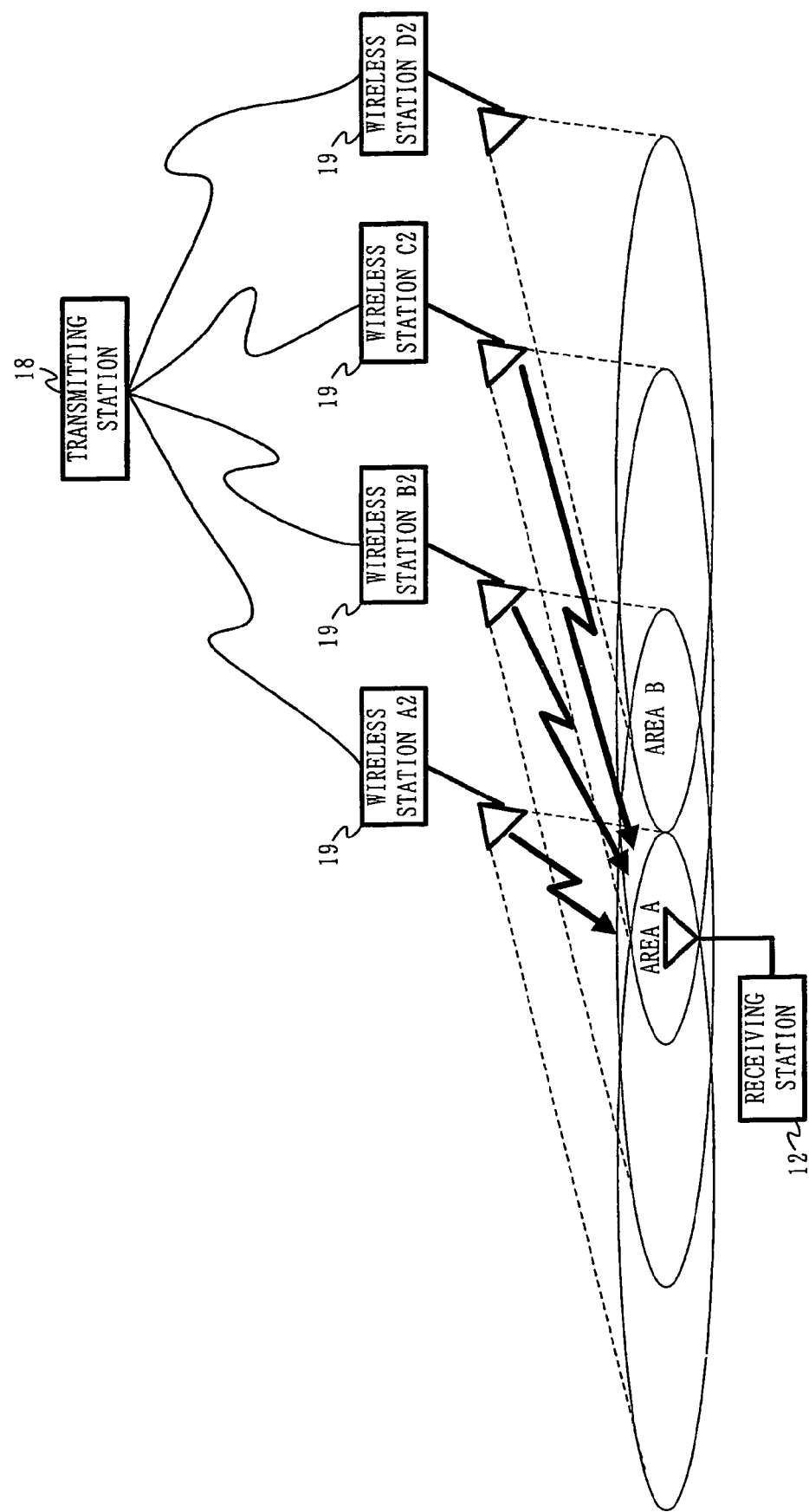
FIG. 32 shows a configuration of a wireless transmission system according to a seventh embodiment of the present invention.

FIG. 32 shows a configuration of a wireless transmission system according to a seventh embodiment of the present invention. In the present embodiment, the configurations of the transmitting station 18, the wireless station 19 and the receiving station 12 are similar to those of the variation of the sixth embodiment, and will not be further described below. Wherever the four wireless stations 19 need to be distinguished from one another, they will be referred to as wireless stations A2 to D2.

The transmitting station 18 gives the delay amounts tA to tD to the signals A2 to D2 to be transmitted to the wireless stations A2 to D2, respectively, before the signals are transmitted. It is assumed herein that the lengths of the wired transmission paths between the transmitting station and the wireless stations A2 to D2 are substantially equal to one another. Therefore, the propagation time lengths a1A to a1D for the signals A2 to D2 transmitted from the transmitting station 18 to the wireless stations A2 to D2, respectively, are assumed to be equal to one another, and are denoted as α1.

One wireless station forms one communication area, and a plurality of wireless stations A2 to D2 are arranged in a row so that a plurality of communication areas are arranged next to one another. For example, the wireless stations A2 to D2 may be arranged in a straight line. Each overlap between communication areas formed by the wireless stations A2 to D2 will be referred to as an overlap area. An overlap between the communication areas of the wireless stations A2, B2 and C2 will be referred to as an overlap area A. An overlap between the communication areas of the wireless stations B2, C2 and D2 will be referred to as an overlap area B. Wherever signals transmitted from the wireless stations A2 to D2 need to be distinguished from one another, they will be referred to as signals A to D.

If the receiving station 12 is located within the overlap area A, the receiving station 12 receives the signals A, B and C. If the receiving station 12 is located within the overlap area B, the receiving station 12 receives the signals B, C and D. Thus, in the overlap area A or B, signals from three wireless stations 19 arrive. Note that while an overlap area is formed by three wireless stations in the present embodiment, an overlap area may alternatively be formed by four or more wireless stations.

Figure 33:
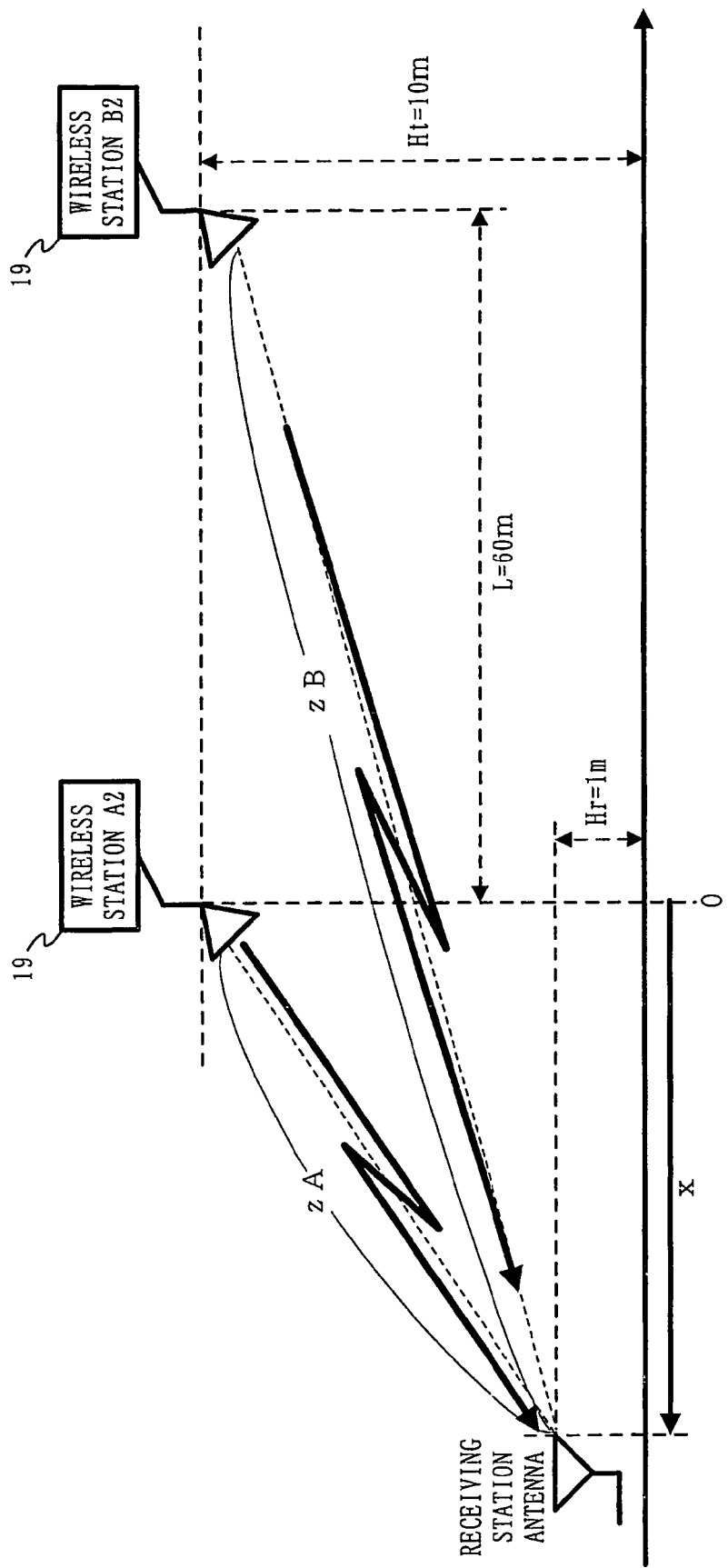
FIG. 33 is a schematic diagram showing the positional relationship between the receiving station 12 and two wireless stations A2 and B2.

FIG. 33 is a schematic diagram showing the positional relationship between the receiving station 12 and two wireless stations A2 and B2. Assume that the antenna of the receiving station 12 has a height of Hr, and the antennas of the wireless stations A2 and B2 have a height of Ht. Also assume that the distance between the wireless station A2 and the wireless station B2 is L, and the distance between the receiving station 12 and the wireless station A2 is x.

The path length (propagation distance) zA between the wireless station A2 and the receiving station 12, and the path length zB between the wireless station B2 and the receiving station 12 can be expressed as follows.

$$zA = \sqrt{x^2 + (Ht - Hr)^2}$$ [Expression 1]

$$zB = \sqrt{(x+L)^2 + (Ht - Hr)^2}$$ [Expression 2]

The path length difference $\Delta z$ between zB and zA is expressed as follows.

$$\Delta z = zB - zA$$ [Expression 3]

$$= \sqrt{(x+L)^2 + (Ht - Hr)^2} - \sqrt{x^2 + (Ht - Hr)^2}$$

Assume a case where a vehicle running on a road communicates wirelessly with a wireless device provided on the road, where L=60 m, Ht=10 m and Hr=1 m.

Figure 34:
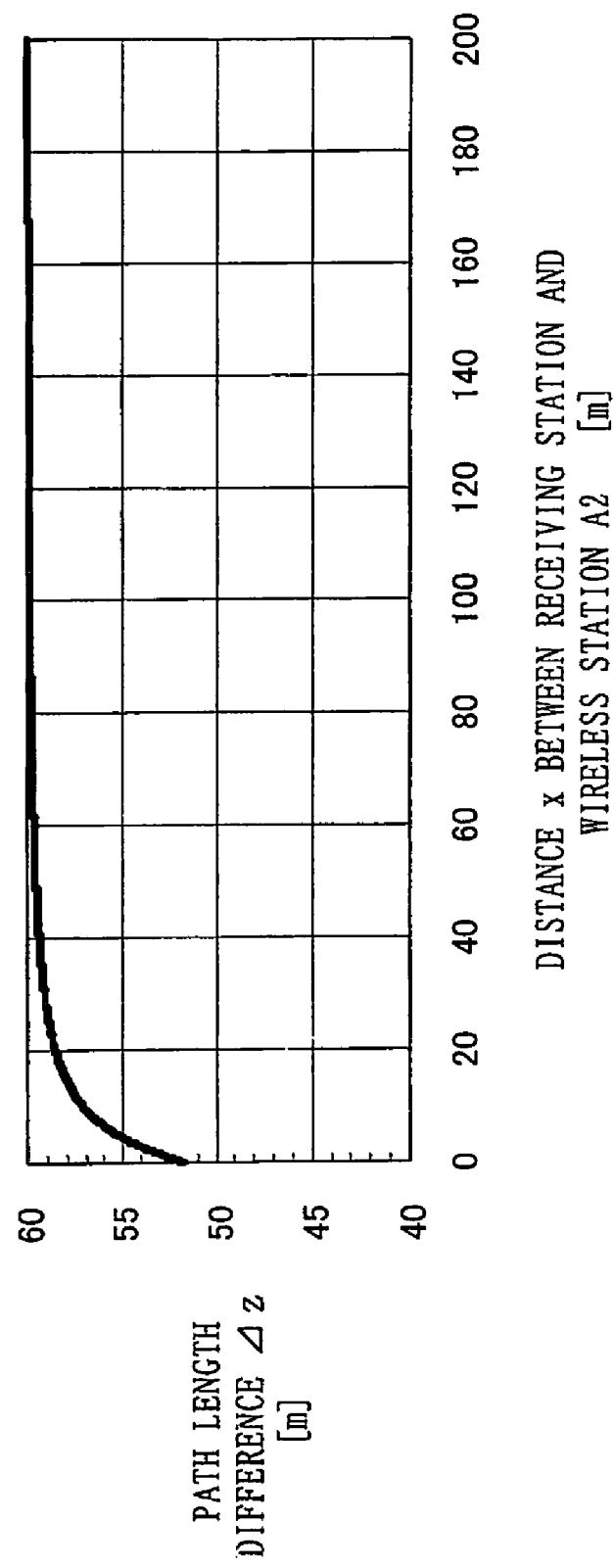
FIG. 34 shows the relationship between the path length difference Δz and the distance x between the receiving station 12 and a wireless station.

FIG. 34 shows the relationship between the path length difference $\Delta z$ and the distance x between the receiving station 12 and a wireless station. In FIG. 34, the vertical axis represents the path length difference $\Delta z$, and the horizontal axis represents the distance x between the receiving station 12 and the wireless station 19.

As shown in FIG. 34, the path length difference $\Delta z$ can be made close to the distance between the antennas of the wireless stations A2 and B2 if the distance between the wireless station A2 and the receiving station 12 is several meters or more. Thus, the path length difference $\Delta z$ is substantially equal to the antenna interval L, and can be expressed as:

$$\Delta z = zB - zA \approx L$$

irrespective of the position of the receiving station 12. Therefore, the difference $\Delta p$ between the propagation time length pA from the transmitting station A2 and the propagation time length pB from the transmitting station B2 can be expressed as:

$$\Delta p = pB - pA \approx P \quad (1)$$

where P is the propagation time length corresponding to the distance L.

A signal is transmitted at a timing tA to the wireless station A2, at a timing tB to the wireless station B2, at a timing tC to the wireless station C2, and at a timing tD to the wireless station D2. Herein, the time difference between tA and tB is expressed as tAB=tB−tA. Other delay amounts are similarly expressed according to the same rule.

Next, a method for setting the delay amounts tA and tC, and the signal-receiving timing where the receiving station 12 is located in the overlap area A (where the wireless station A2 is in the foremost position) will be described.

Figure 35:
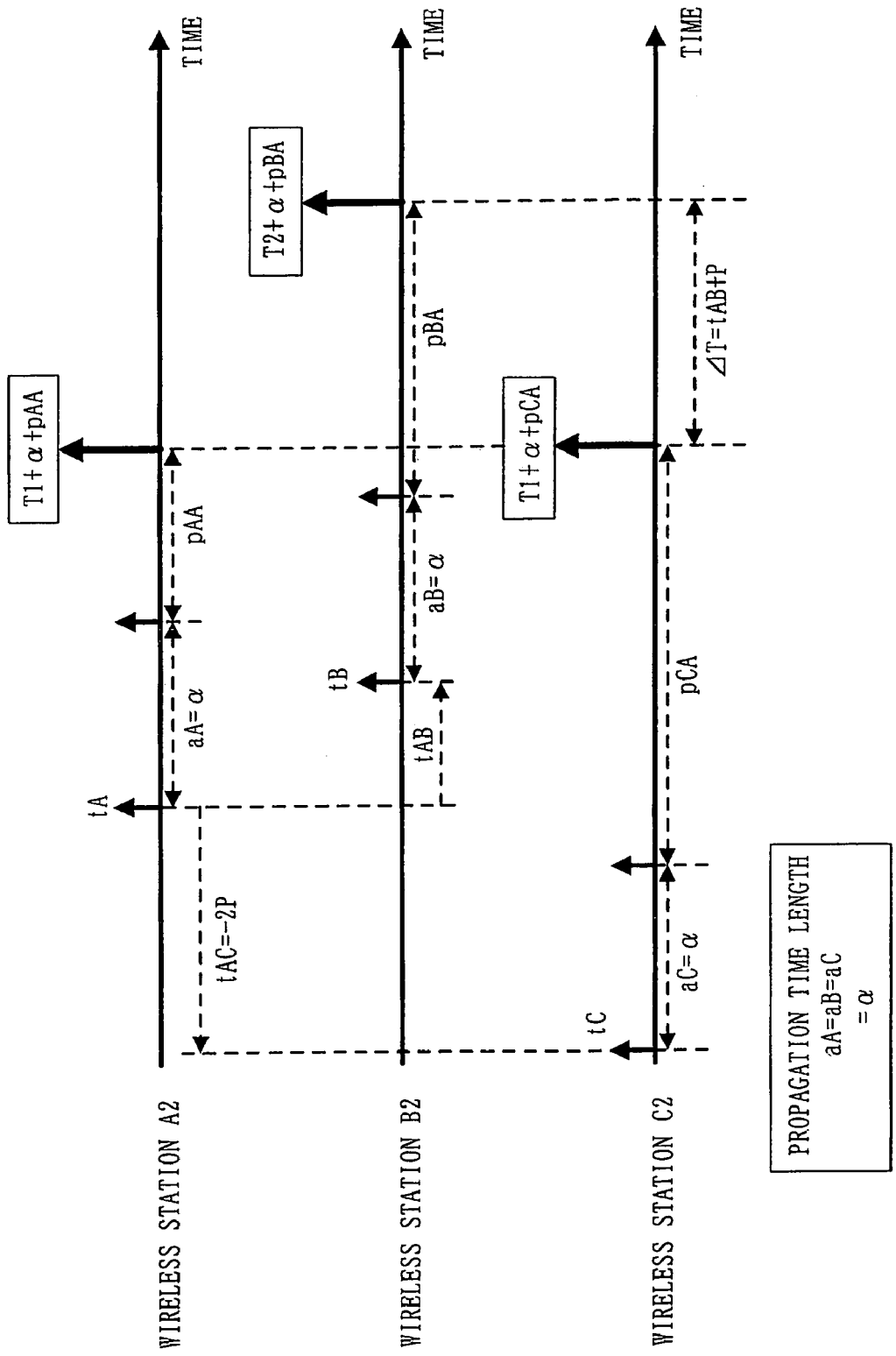
FIG. 35 is a timing diagram showing signal transmission in a case where the receiving station 12 shown in FIG. 32 is located within an overlap area A.

FIG. 35 is a timing diagram showing signal transmission in a case where the receiving station 12 is located within the overlap area A. The receiving station 12 always receives radio waves from the three foremost wireless stations. The three propagation time lengths will be denoted as pAA, pBA and pCA, starting from the foremost wireless station. Based on the approximation of Expression (1), these values can be expressed as:

$$pBA - pAA = P(>0) \text{ and } pCA - pAA = 2P$$

irrespective of the position of the receiving-station 12 in the overlap area A. Note that the timings at which the receiving station 12 receives signals from the wireless stations A2 to C2 are as follows.

Signal A2 from wireless station A2: tA+α+pAA
Signal B2 from wireless station B2: tB+α+pBA
Signal C2 from wireless station C2: tC+α+pCA The TDOAs between these signals are as follows.
TDOA between signals A2 and B2:

$$\tau AB = (tB - tA) + (pBA - pAA)$$

$$= tAB + P$$

TDOA between signals A2 and C2:

$$\tau AC = (tC - tA) + (pCA - pAA)$$

$$= tAC + 2P$$

Now, if the delay amount tC is determined so that tAC=−2P (=tC−tA<0) is satisfied, $\tau AC$=0 will hold. Thus, the receiving station 12 receives the signal A2 and the signal C2 at the same timing. Herein, tAC being a negative value indicates that tC is earlier than tA. Then, the receiving station 12 receives the signal B after passage of (tAB+P) since the signal-receiving timing for the signals A and C. Thus, the receiving station 12 receives signals transmitted from three wireless stations at two timings.

Similarly, a method for setting the delay amounts tB and tD, and the signal-receiving timing where the receiving station 12 is located in the overlap area B (where the wireless station B2 is in the foremost position) will be described.

Figure 36:
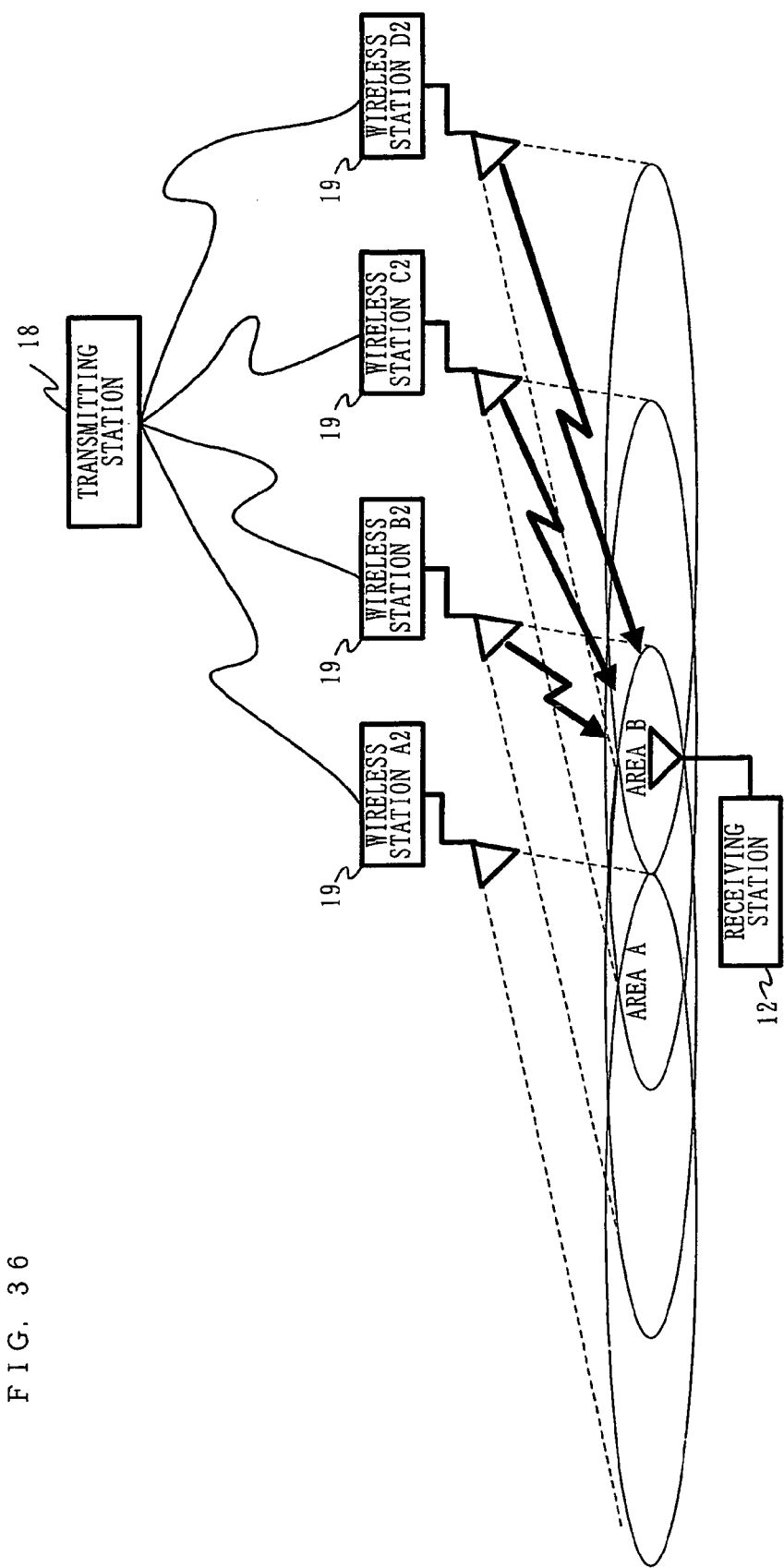
FIG. 36 shows a configuration of a wireless transmission system in a case where the receiving station 12 shown in FIG. 32 is located within an overlap area B.
Figure 37:
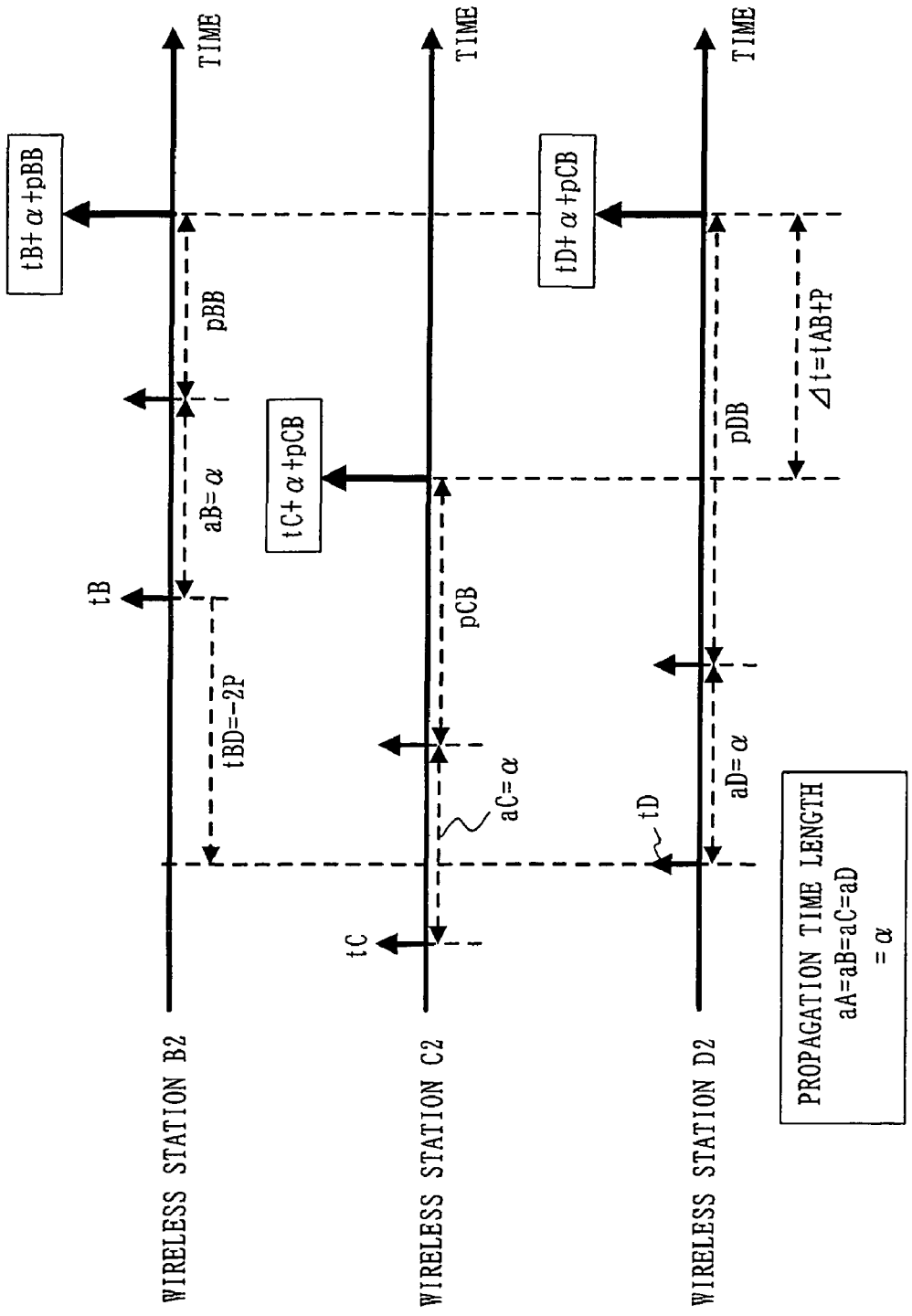
FIG. 37 is a timing diagram showing signal transmission in a case where the receiving station 12 shown in FIG. 32 is located within the overlap area B.

FIG. 36 shows a configuration of a wireless transmission system in a case where the receiving station 12 is located within the overlap area B, and FIG. 37 is a timing diagram showing signal transmission in a case where the receiving station 12 is located within the overlap area B.

The receiving station 12 can always receive signals from the three foremost wireless stations, i.e., the wireless stations B2 to D2. The propagation time lengths of the wireless stations B2 to D2 will be denoted as pBB, pCB and pDB, starting from the foremost wireless station. Based on the approximation of Expression (1), these values can be expressed as:

$$pCB - pBB = P(>0) \text{ and } pDB - pBB = 2P$$

irrespective of the position of the receiving station 12 in the overlap area B.

The timings at which wave signals from the wireless stations 11 arrive at the receiving end are as follows.
Signal B2 from wireless station 11B: tB+α+pBB
Signal C2 from wireless station 11C: tC+α+pCB
Signal D2 from wireless station 11D: tD+α+pDB The TDOAs between these signals are as follows.
TDOA between signals B2 and C2:

$$\tau BC = (tC - tB) + pCB - pBB)$$

$$= (tAC + tA) - (tAB + tA) + P$$

$$= -2P - tAB + P$$

$$= -(tAB + P)(<0)$$

TDOA between signals D2 and B2:

$$\tau BD = (tD - tB) + (pDB - pBB)$$
$$= tBD + 2P$$

Now, if the delay amounts tB and tD are determined so that tBD=−2P(=tD−tB<0) is satisfied, τBD=0 will hold. Thus, the receiving station 12 receives the signal B and the signal D at the same timing.

Therefore, the receiving station 12 first receives the signal C, and then receives the signals B and D at the same timing after passage of (tAB+P). Thus, the receiving station 12 receives signals transmitted from three wireless stations at two timings.

As described above, in the overlap area A and the overlap area B, the receiving end always receives signals from the three foremost wireless stations 19 at two timings. At each of the two timings, the receiving station 12 receives signals from two wireless stations that are next but one to each other, i.e., the wireless stations A2 and C2 or the wireless stations B2 and D2 in the present embodiment. Therefore, the receiving station 12 can receive signals from two adjacent wireless stations at different timings, irrespective of the overlap area in which the receiving station 12 is located.

Note that if tA and tB are determined so as to satisfy Tmin≦(tB−tA+P)≦Tmax, the difference between the signal-receiving timings at the receiving station 12 will be a TDOA with which the path diversity is effectively exerted, thus improving the transmission characteristics.

As described above, according to the present embodiment, even if the propagation time lengths between the receiving station and a plurality of wireless stations are significantly different from one another, the transmitting station adjusts the delay amount given to a signal to be transmitted to each wireless station so that the number of timings at which the receiving station receives signals is equal to the number of effective branches that contribute to the path diversity effect (two in the illustrated example). Therefore, it is possible to obtain a maximum path diversity effect at the receiving station. Moreover, a signal from a wireless station far away from the receiving station does not cause interference for the receiving station, but can contribute to the path diversity effect.

In FIG. 36, in areas adjacent to the overlap areas A and B (gray portions in the figure), the signal B2 and the signal C2 are received. Since the TDOA between the signals is tBC=−(tAB+P)=−(tB−tA+P), it is possible to obtain a path diversity effect.

Note that the present embodiment has been described above with respect to a case where there are four wireless stations forming two overlap areas, the number of wireless stations can be increased, to increase the number of areas, while determining the delay amounts as described above, thus expanding the areas.

Eighth Embodiment

An eighth embodiment of the present invention is characteristic in that a group of consecutive areas arranged in a linear pattern as shown in the seventh embodiment is repeated in the lateral direction to form a larger group of areas arranged in a planar pattern, wherein signals are received at two timings in each overlap area.

Figure 38:
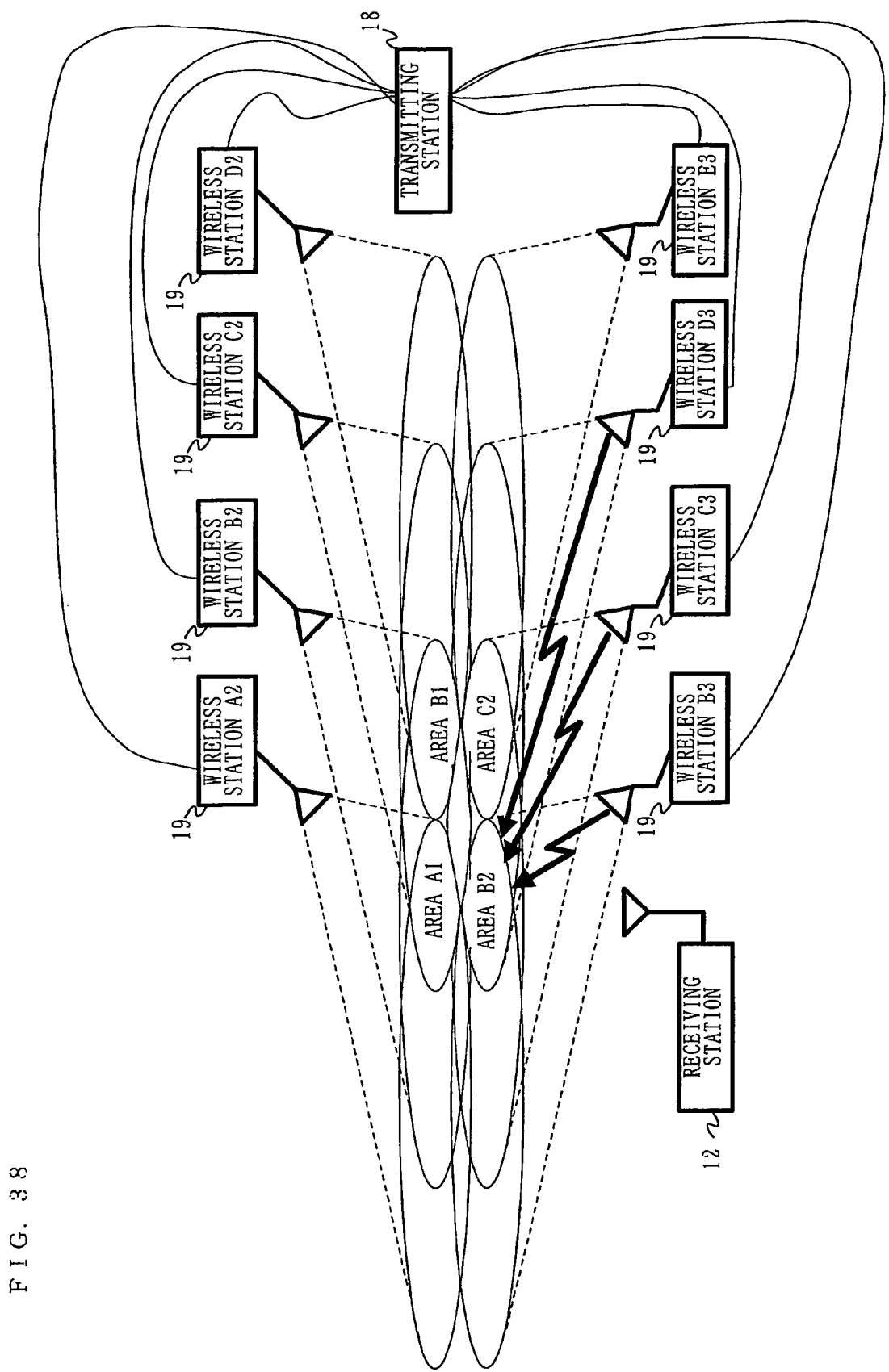
FIG. 38 shows a configuration of a wireless transmission system according to an eighth embodiment of the present invention.

FIG. 38 shows a configuration of a wireless transmission system according to the eighth embodiment of the present invention. The configurations of the transmitting station 18, the wireless station 19 and the receiving station 12 of the present embodiment are similar to those of the seventh embodiment, and will not be further described below.

In the present embodiment, the wireless transmission system includes eight wireless stations 19. In the present embodiment, two groups of wireless stations 19 form a planar-shaped communication area, each group including four wireless stations 19 arranged in a row in the order from A2 to D2. Wherever the eight wireless stations need to be distinguished from one another, the wireless stations 19 included in one group will be referred to as wireless stations A2 to D2 and those included in the other group as wireless stations B3 to E3.

The overlap area formed by the wireless stations A2 to C2 will be referred to as an overlap area A1, and the overlap area formed by the wireless stations B2 to D2 will be referred to as an overlap area B1. The overlap area formed by the wireless stations B3 to D3 will be referred to as an overlap area B2, and the overlap area formed by the wireless stations C3 to E3 will be referred to as an overlap area C2.

If the receiving station 12 is located within the overlap area A1, the signals A2 and C2 transmitted from the wireless stations A2 and C2, respectively, are received at the same timing. If the receiving station 12 is located within the overlap area B1, the signals B2 and D2 transmitted from the wireless stations B2 and D2, respectively, are received at the same timing. As shown in FIG. 38, the receiving station 12 always receives signals from the three foremost wireless stations.

Next, the signal-receiving timings in a case where the receiving station 12 is located within the overlap area B2 (where the wireless station B3 is in the foremost position) will be described.

As in the seventh embodiment, the propagation time lengths from the receiving station to the wireless stations forming the overlap area B1 will be denoted as pBB, pCB and pDB, starting from the wireless station with the shortest propagation time length. Based on the approximation shown in FIG. 33, these values can be expressed as:

$$pCB-pBB=P(>0), pDB-pBB=2P, pDC-pCC=P \text{ and}$$
$$pEC-pCC=P$$

irrespective of the position of the receiving station 12 in the overlap area. Moreover, as in the seventh embodiment, tA, tB, tC and tD are determined so as to satisfy the following relationships.

$$tAC=-2P(=tC-tA<0)$$

$$tBD=-2P(=tD-tB<0)$$

The wireless station B3 transmits a signal with the delay amount tB as does the wireless station B2, the wireless station C3 transmits a signal with the delay amount tC as does the wireless station C2, the wireless station D3 transmits a signal with the delay amount tD as does the wireless station D2, and the wireless station E3 transmits a signal with the delay amount tE. The timings at which the receiving station 12 receives signals from the wireless stations B3 to D3 are as follows.

Signal B3 from wireless station B3: tB+α+pBB
Signal C3 from wireless station C3: tC+α+pCB
Signal D3 from wireless station D3: tD+α+pDB The TDOAs between these signals are as follows.
TDOA between signals B3 and C2:

$$\tau BC2=(tC-tB)+(pCB-pBB)$$

Since this is equal to the TDOA between signals B2 and C2 as described above, the following holds true.

$$\tau BC2 = \tau BC$$
$$= -(tAB + P)(<0)$$

TDOA between signals B3 and D3:

$$\tau BD2=(tD-tB)+(pDB-pBB)$$

Since this is equal to the TDOA between signals D2 and B2 as described above, the following holds true.

$$\tau BD2 = \tau BD = 0$$

The receiving station 12 first receives the signal C3, and then receives the signals B3 and D3 at the same timing after passage of (tAB+P). Thus, the receiving station 12 receives signals transmitted from three wireless stations at two timings.

Next, a method for setting the delay amount tE, and the signal-receiving timing where the receiving station 12 is located in the overlap area C2 (where the wireless station C3 is in the foremost position) will be described. FIG. 37 is a timing diagram showing signal transmission in a case where the receiving station 12 is located within the overlap area C2. The timings at which the receiving station 12 receives signals from the wireless stations C3 to E3 are as follows.

Signal C3 from wireless station C3: $tC+\alpha+pCC$
Signal D3 from wireless station D3: $tD+\alpha+pDC$
Signal E3 from wireless station E3: $tE+\alpha+pEC$ The TDOAs between these signals are as follows.
TDOA between signals C3 and D3:

$$\tau CD = (tD - tC) + (pDC - pCC)$$
$$= (tBD + tB) - (tBC + tB) + P$$
$$= 2P - tBC + P$$
$$= -(tBC + P)(>0)$$
$$= -(tC - tB + P)(>0)$$
$$= -((tAC + tA) - (tAB + tA) + P)$$
$$= -(-2P - tAB + P)$$
$$= tAB + P(>0)$$

TDOA between signals C3 and E3:

$$\tau CE2 = (tE - tC) + (pEC - pCC)$$
$$= tCE + 2P$$

Now, if the delay amount tE is determined so that tCE=−2P is satisfied, τCE2=0 will hold. Thus, the receiving station 12 receives the signals C3 and E3 at the same timing.

Therefore, the receiving station 12 first receives the signals C3 and E3, and then receives the signal D2 after passage of (tAB+P). Thus, the receiving station 12 receives signals transmitted from three wireless stations at two timings.

As described above, the receiving station located in the overlap area B2 or C2 always receives signals from three wireless stations at two timings. Specifically, signals from the wireless stations B3 and D3 are received at the same timing, and signals from the wireless stations C3 and E3 are received at the same timing. Therefore, the receiving station 12 can receive signals from two adjacent wireless stations at different timings, irrespective of the area in which the receiving station 12 is located.

Thus, if tA and tB are determined so as to satisfy Tmin≦(tB−tA)+P≦Tmax, the difference between the signal-receiving timings at the receiving station 12 will be a TDOA with which the path diversity is effectively exerted, thus improving the transmission characteristics.

Moreover, since the overlap area B1 and the overlap area B2 share the same transmission timing, the relationship between the overlap area A1 and the overlap area B1 in terms of the timings at which signals are received by the receiving station is the same as that between the overlap area A1 and the overlap area B2.

As described above, according to the present embodiment, groups of wireless stations are arranged in a planar pattern, each group including wireless stations arranged in a row, whereby it is possible to cover a larger communication area while exerting a path diversity effect. Moreover, a signal from a wireless station far away from the receiving station does not cause interference for the receiving station, but can contribute to the path diversity effect.

The present embodiment has been described above with respect to a case where there are eight wireless stations forming four overlap areas, the number of wireless stations can be increased successively, while determining the delay amounts as described above, to increase the number of areas.

Figure 39:
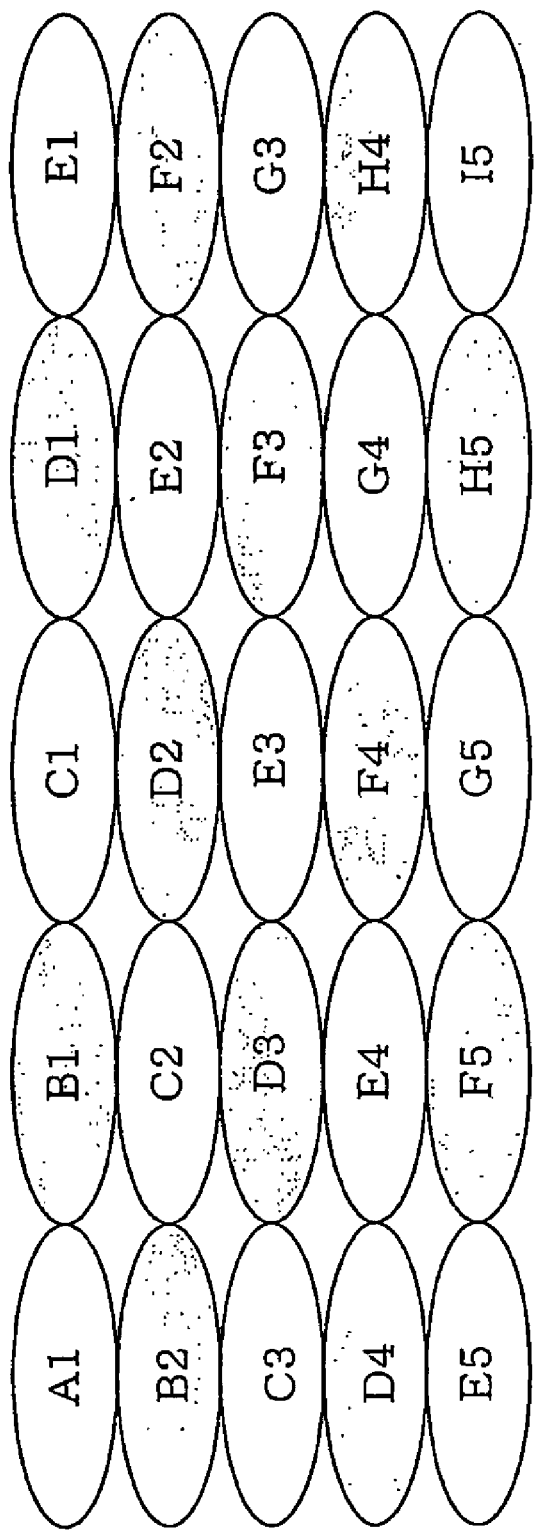
FIG. 39 shows an example of an arrangement of overlap areas formed by a plurality of wireless stations.
Figure 40:
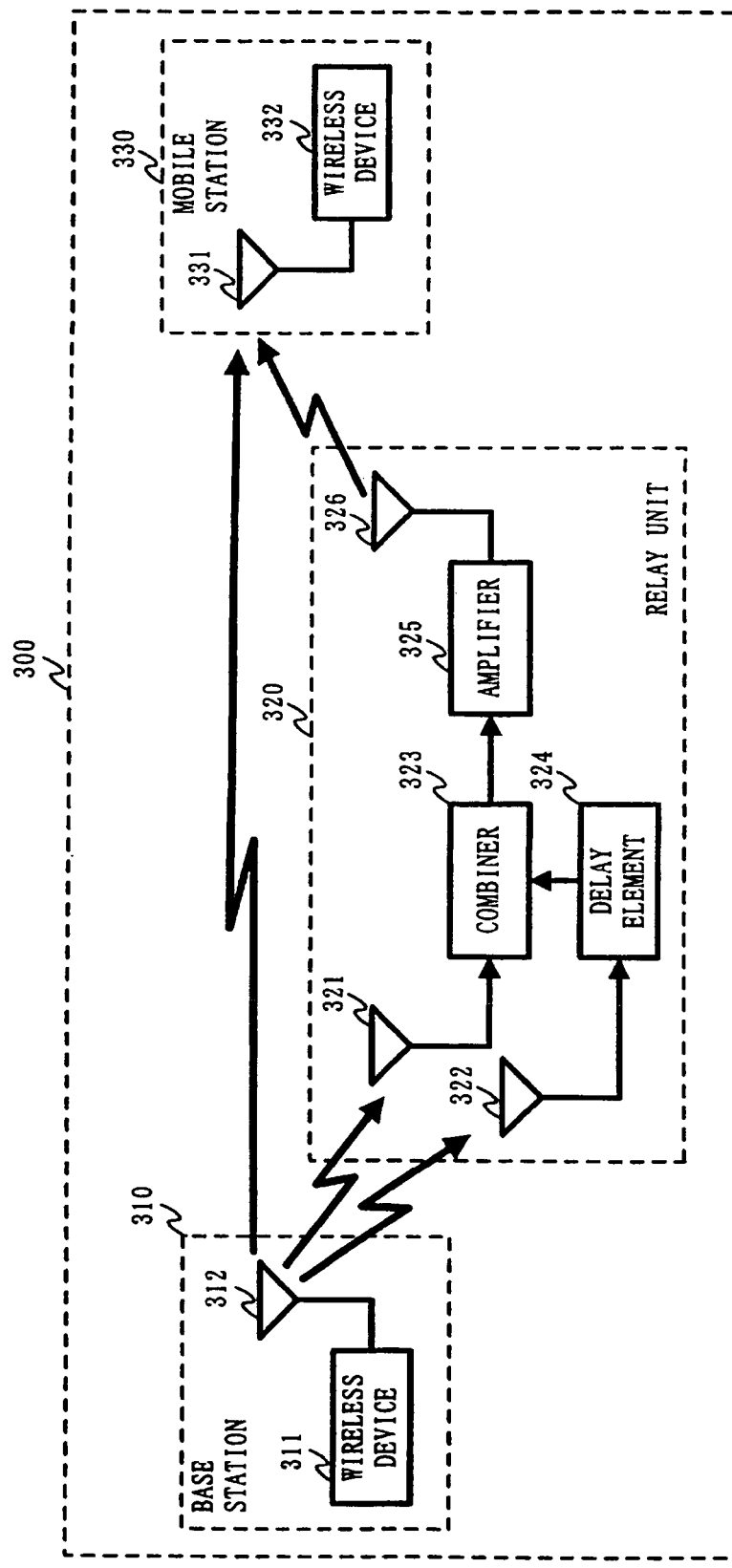
FIG. 40 is a block diagram showing a wireless communication system disclosed in Patent Document 1.

FIG. 39 shows an example of an arrangement of overlap areas formed by a plurality of wireless stations. In the wireless transmission system of the seventh embodiment, a plurality of overlap areas, such as the overlap areas A1 to E1, are arranged in a linear pattern as shown in FIG. 39. In FIG. 39, a plurality of groups of overlap areas are combined together, wherein each group of overlap areas are arranged in a linear pattern. The overlap areas A1 to E1 are adjacent to the overlap areas B2 to F2, and the overlap areas B2 to F2 are adjacent to the overlap areas C3 to G3. Where each overlap area is formed by communication areas of three wireless stations, signals transmitted from the foremost and rearmost wireless stations will be the first arriving waves, in a white overlap area such as A1 or C1. In contrast, in a gray overlap area such as B1 or D1, signals transmitted from the foremost and rearmost wireless stations will be the second arriving waves. By combining overlap areas as described above, it is possible to cover a wider communication area while exerting a path diversity effect.

Note that while the seventh and eighth embodiments have been described above with respect to a case where the wireless stations are arranged at regular intervals with an equal propagation time difference P between each pair of adjacent wireless stations, even if there are differences between the propagation time lengths, the receiving station 12 can receive signals at two timings, irrespective of the area in which the receiving station 12 is located, by having the transmitting station adjust the transmission timings. While the seventh and eighth embodiments have been described above with respect to a case where the receiving station receives signals from three wireless stations, the receiving station may alternatively receive signals from four or more wireless stations while setting the delay amounts so that the number of signal-receiving timings reduced down to two.

Moreover, in the seventh and eighth embodiments, the delay amounts given to signals to be transmitted to the wireless stations may be varied by adjusting the lengths of the wired transmission paths between the transmitting station and the wireless stations, instead of giving the delay amounts tA, tB, tC and tD to the signals. Then, it is not necessary to give a delay to a signal at each wireless station.

In the seventh and eighth embodiments, the transmitting station transmits signals to the wireless stations after giving delay amounts to the signals. Alternatively, the transmitting station may specify, to the wireless stations, the delay amounts to be given by the wireless stations to the signals to be transmitted, as in the sixth embodiment. In such a case, the transmitting station transmits signals to the wireless stations at the same timing. Then, each wireless station transmits a signal to the receiving station while giving the signal a delay amount specified by the transmitting station.

While the fifth to eighth embodiments have bee described above with respect to a case where the transmitting station and each wireless station are connected to each other via a wired transmission path, the transmitting station and each wireless station may alternatively be connected to each other via a wireless connection.

Moreover, modulation/demodulation schemes other than those specifically mentioned in the first to eighth embodiments may be used for communication. The modulation/demodulation scheme is not limited to any particular scheme as long as the modulation scheme combined with the demodulation scheme can exert an anti-multipath property.

The various functional blocks provided in the wireless station, such as the delay amount determining section or the transmission timing control section, as described above in the embodiments are typically each implemented in the form of an LSI being an integrated circuit. These functional blocks may be individually formed into a separate chip or some or all of them may be formed together into a single chip.

The wireless transmission system of the present invention can be used as a multi-station simultaneous transmission system in which wireless stations simultaneously transmit signals in a relay transmission operation. Particularly, the present invention can be used in a system for connecting electric appliances together via a wireless connection in a house, where it is expected that the plurality of wireless stations will be so close to one another and the propagation distance is so short that it is difficult to obtain a path diversity effect, or in a dedicated short range communication (DSRC) system or a road-vehicle communication system, where the communication areas are limited and the transmitter-receiver propagation time length can be intentionally adjusted during the design phase.

The present invention is useful as a wireless transmission system and a wireless transmission method, with which it is possible to obtain a maximum path diversity effect even if the maximum number of effective branches that contribute to the path diversity effect is limited to a small number, and as a wireless station, a transmitting station, etc., for use therein.

The invention claimed is:

1. A wireless transmission system in which a plurality of wireless stations are each capable of signal transmission to a receiving station, wherein a path diversity system is formed by at least one of the wireless stations that is capable of signal transmission, a multi-path channel and the receiving station, the wireless transmission system comprising:
    a transmission timing control section for determining a transmission start timing at which to start transmission of a signal from each of the wireless stations, the transmission start timing being a timing obtained by delaying a reference timing for the transmission of the signal by a predetermined delay amount for each of the wireless stations;
    a transmitting section for transmitting signals at the transmission start timing determined by said transmission timing control section; and
    a receiving section provided in the receiving station for receiving the transmitted signals,
    wherein the predetermined delay amount is determined so that: 1) the signals are received by said receiving section at a plurality of signal-receiving timings; 2) a number of signal-receiving timings is less than or equal to a predetermined maximum number of effective branches; 3) a difference between the plurality of signal-receiving timings is greater than or equal to a predetermined delay resolution; 4) and a difference between a maximum value and a minimum value of the plurality of signal-receiving timings is less than or equal to a predetermined maximum delay, and
    when a number of wireless stations transmitting the signals is larger than the predetermined maximum number of effective branches, the number of signal-receiving timings at which the receiving station receives signals is made equal to the predetermined maximum number of effective branches.

2. The wireless transmission system according to claim 1, wherein the predetermined maximum number of effective branches, the predetermined delay resolution and the predetermined maximum delay are set to values such that a plurality of delayed waves are received with path diversity.

3. The wireless transmission system according to claim 1, wherein:
    said transmission timing control section and said transmitting section are provided in each wireless station; and
    the reference timing stored in each wireless station is a predetermined timing, and the plurality of wireless stations store the same reference timing.

4. The wireless transmission system according to claim 1, further comprising:
    a transmitting station for transmitting, to the plurality of wireless stations, a signal to be transmitted to the receiving station;
    said transmitting station including a transmitter signal transmitting section for transmitting, to the plurality of wireless stations, the signal to be transmitted to the receiving station;
    said transmission timing control section and said transmitting section are provided in each wireless station;
    each wireless station includes:
        a relay receiving section for receiving the signal transmitted by said transmitter signal transmitting section; and
        a timing detection section for detecting a timing at which the signal is received by said relay receiving section;
    said transmission timing control section determines the reference timing to be the timing detected by said timing detection section; and
    said transmitting section transmits a signal received by said relay receiving section to the receiving station.

5. The wireless transmission system according to claim 4, wherein said timing detection section detects a unique word contained in the signal.

6. The wireless transmission system according to claim 4, wherein the number of predetermined delay amounts is equal to the maximum number of effective branches.

7. The wireless transmission system according to claim 1, further comprising:
a transmitting station for transmitting, to the plurality of wireless stations, a signal to be transmitted to the receiving station;
said transmitting station includes:
a transmitter signal transmitting section for transmitting, to the plurality of wireless stations, the signal to be transmitted to the receiving station;
a delay amount selecting section for selecting the predetermined delay amount from among a plurality of candidate values;
a re-transmission start timing determining section for determining a re-transmission start timing, at which to transmit the signal to the receiving station, the re-transmission start timing being a timing obtained by delaying the reference timing by the predetermined delay amount selected by said delay amount selecting section; and
a re-transmit signal transmitting section for transmitting the signal to the receiving station at the re-transmission start timing determined by said re-transmission start timing determining section;
said transmission timing control section and said transmitting section are provided in each wireless station;
each wireless station includes a relay receiving section for receiving a signal transmitted by said transmitter signal transmitting section; and
said transmitting section transmits a signal received by said relay receiving section to the receiving station.

8. The wireless transmission system according to claim 1, further comprising:
a transmitting station for transmitting, to the plurality of wireless stations, a signal to be transmitted to the receiving station;
said transmitting station includes:
a delay amount selecting section for selecting, from among a plurality of candidate values, the predetermined delay amount to be given to the signal to be transmitted by each wireless station;
a delay amount adding section for adding the predetermined delay amount selected by said delay amount selecting section to the signal; and
a transmitter signal transmitting section for transmitting, to each wireless station, the signal to which the predetermined delay amount has been added by said delay amount adding section;
said transmission timing control section is provided in each wireless station;
each wireless station includes:
a relay receiving section for receiving the signal to which the predetermined delay amount has been added, transmitted by said transmitter signal transmitting section;
a delay amount extracting section for extracting the predetermined delay amount from the signal received from said relay receiving section;
said transmission timing control section determines the transmission start timing to be a timing obtained by delaying the reference timing by the predetermined delay amount extracted by said delay amount extracting section; and
said transmitting section transmits a signal received by said relay receiving section to the receiving station.

9. The wireless transmission system according to claim 8, wherein:
the plurality of wireless stations are arranged so that wireless stations located within a predetermined distance from each other have communication ranges partially overlapping with each other;
said transmitting station further includes a delay amount adjusting section for adjusting the predetermined delay amount so that signals to be transmitted from wireless stations that are assigned the same delay amount as the predetermined delay amount selected by said delay amount selecting section arrive at the receiving station at the same timing;
said delay amount adding section produces a delay signal indicating the predetermined delay amount adjusted by said delay amount adjusting section; and
said receiving section receives signals transmitted from wireless stations that are adjacent to each other at different timings.

10. The wireless transmission system according to claim 9, wherein the plurality of wireless stations are arranged in a linear pattern.

11. The wireless transmission system according to claim 10, wherein the plurality of wireless stations are formed into a plurality of groups of wireless stations, each group of wireless stations is arranged in the linear pattern, and each group of wireless stations are arranged parallel to each other.

12. The wireless transmission system according to claim 1, further comprising:
a transmitting station for transmitting, to the plurality of wireless stations, the signals to be transmitted to the receiving station;
said transmission timing control section and said transmitting section are provided in said transmitting station;
said transmitting station includes a delay amount selecting section for selecting, from among a plurality of candidate values, the predetermined delay amount to be given to the signals to be transmitted to each of the wireless stations;
said transmission timing control section determines the transmission start timing to be a timing obtained by delaying the reference timing by the predetermined delay amount selected by said delay amount selecting section;
said transmitting section transmits the signals to each of the wireless stations at the transmission timing; and
each of the wireless stations includes:
a relay receiving section for receiving the signals transmitted from said transmitting station; and
a relay transmitting section for transmitting the signals received by said relay receiving section to the receiving station.

13. The wireless transmission system according to claim 12, wherein:
the plurality of wireless stations are arranged so that wireless stations located within a predetermined distance from each other have communication ranges partially overlapping with each other;
said transmitting station further includes a delay amount adjusting section for adjusting the delay amount so that signals to be transmitted from wireless stations that are assigned the same predetermined delay amount as the predetermined delay amount selected by said delay amount selecting section arrive at the receiving station at the same timing;

said transmission timing control section determines the transmission start timing to be a timing obtained by delaying the reference timing by the predetermined delay amount adjusted by said delay amount adjusting section; and said receiving section receives signals transmitted from wireless stations that are adjacent to each other at different timings.

14. The wireless transmission system according to claim 13, wherein the plurality of wireless stations are arranged in a linear pattern.

15. The wireless transmission system according to claim 14, wherein the plurality of wireless stations are formed into a plurality of groups of wireless stations, each group of wireless stations is arranged in the linear pattern, and the groups of wireless stations are arranged parallel to each other.

16. The wireless transmission system according to claim 1, wherein the number of predetermined delay amounts is two.

17. The wireless transmission system according to claim 1, further comprising a delay amount selecting section for selecting the predetermined delay amount from among a plurality of candidate values;

the predetermined delay amount to be selected by said predetermined delay amount selecting section is determined in advance; and said transmission timing control section determines the transmission start timing based on the predetermined delay amount selected by said delay amount selecting section.

18. The wireless transmission system according to claim 1, further comprising:

a delay amount selecting section for randomly selecting the predetermined delay amount from among a plurality of candidate values; and said transmission timing control section determines the transmission start timing based on the predetermined delay amount selected by said delay amount selecting section.

19. The wireless transmission system according to claim 1, wherein an orthogonal frequency division multiplexing scheme is used as the modulation scheme and the demodulation scheme.

20. The wireless transmission system according to claim 1, wherein a phase shift keying with varied phrase (PSK-VP) scheme is used as the modulation scheme.

21. A transmitting station for use in a wireless transmission system for transmitting a signal to a receiving station via a plurality of wireless stations capable of signal transmission, wherein a path diversity system is formed by at least one of the wireless stations that is capable of signal transmission, a multi-path channel and the receiving station, the transmitting station comprising:

a delay amount selecting section for selecting, from among a plurality of predetermined delay amounts, a predetermined delay amount to be given to signals to be transmitted to each of the wireless stations;

a transmission timing control section for determining a transmission start timing at which to start the transmission of the signals from the wireless stations, the transmission of the signals being a timing obtained by delaying a reference timing for transmission of the signals by the predetermined delay amount selected by said delay amount selecting section; and a transmitting section for transmitting the signals to each of the wireless stations at the transmission start timing, wherein the predetermined delay amount is determined so that: 1) the signals are received by the receiver side at a plurality of signal-receiving timings; 2) a number of signal-receiving timings is less than or equal to a predetermined maximum number of effective branches; 3) a difference between the plurality of signal-receiving timings is greater than or equal to a predetermined delay resolution; and 4) a difference between a maximum value and a minimum value of the signal-receiving timings is less than or equal to a predetermined maximum delay, and when the number of wireless stations transmitting the signals is larger than the predetermined maximum number of effective branches, the number of signal-receiving timings at which the receiving station receives signals is made equal to the predetermined maximum number of effective branches.

22. A method for use in a wireless transmission system that includes a plurality of wireless stations, each wireless station is capable of signal transmission to a receiving station, wherein a path diversity system is formed by at least one of the wireless stations, a multipath channel and the receiving station, the method comprising:

determining a transmission start timing at which to start transmission of signals from the wireless stations, the transmission start timing being a timing obtained by delaying a reference timing for the transmission of the signals by a predetermined delay amount;

transmitting the signals at the transmission start timing determined; and receiving the transmitted signals at the receiving station, wherein the predetermined delay amount is determined so that: 1) the signals are received at the receiving station at a plurality of signal-receiving timings; 2) a number of signal-receiving timings is less than or equal to a predetermined maximum number of effective branches; 3) a difference between the plurality of signal-receiving timings is greater than or equal to a predetermined delay resolution; and 4) a difference between a maximum value and a minimum value of the plurality of signal-receiving timings is less than or equal to a predetermined maximum delay, and when the number of wireless stations transmitting the signals is larger than the predetermined maximum number of effective branches, the number of signal-receiving timings at which the receiving station receives signals is made equal to the predetermined maximum number of effective branches.

23. A method for use in a wireless transmission including a plurality of wireless stations wherein each wireless station is capable of signal transmission to a receiving station, wherein a path diversity system is formed by at least one of the wireless stations, a multipath channel and the receiving station, the method comprising:

determining a transmission start timing at which to start the transmission of signals from the wireless stations, the transmission start timing being a timing obtained by delaying a reference timing for the transmission of the signals by a predetermined delay amount; and transmitting the signals at the transmission start timing determined, wherein the predetermined delay amount is determined so that: 1) the signals are received by the receiver side at a plurality of signal-receiving timings; 2) a number of signal-receiving timings is less than or equal to a predetermined maximum number of effective branches; 3) a difference between the plurality of signal-receiving timings is greater than or equal to a predetermined delay resolution; and 4) a difference between a maximum value and a minimum value of the plurality of signal-receiving timings is less than or equal to a predetermined maximum delay, and when the number of wireless stations transmitting the signals is larger than the predetermined maximum number of effective branches, the number of signal-receiving timings at which the receiving station receives signals is made equal to the predetermined maximum number of effective branches.

24. A method for transmitting a signal from a transmitting station to a receiving station via a plurality of wireless stations capable of signal transmission, wherein a path diversity system is formed by at least one of the wireless stations that is capable of signal transmission, a multi-path channel and the receiving station, the method comprising:

selecting, from among a plurality of predetermined delay amounts, a predetermined delay amount to be given to signals to be transmitted to each of the wireless stations;

determining a transmission start timing at which to start the transmission of a signal, the transmission start timing being a timing obtained by delaying a reference timing for the transmission of the signals by the predetermined delay amount selected; and transmitting the signals to each of the wireless stations at the transmission start timing, wherein the predetermined delay amount is determined so that: 1) the signals are received by the receiver side at a plurality of signal-receiving timings; 2) a number of signal-receiving timings is less than or equal to a predetermined maximum number of effective branches; 3) a difference between the plurality of signal-receiving timings is greater than or equal to a predetermined delay resolution; and 4) a difference between a maximum value and a minimum value of the plurality of signal-receiving timings is less than or equal to a predetermined maximum delay, and when the number of wireless stations transmitting the signals is larger than the predetermined maximum number of effective branches, the number of signal-receiving timings at which the receiving station receives signals is made equal to the predetermined maximum number of effective branches.

* * * * *